(12) United States Patent
Kim et al.

(10) Patent No.: US 12,267,789 B2
(45) Date of Patent: Apr. 1, 2025

(54) PHR TRIGGERING METHOD ACCOMMODATING DORMANT PORTION OF BANDWIDTH IN NEXT-GENERATION MOBILE COMMUNICATION SYSTEM, AND PHR CONFIGURATION METHOD AND DEVICE

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 17/913,980

(22) PCT Filed: Apr. 19, 2021

(86) PCT No.: PCT/KR2021/004894
§ 371 (c)(1),
(2) Date: Sep. 23, 2022

(87) PCT Pub. No.: WO2021/215770
PCT Pub. Date: Oct. 28, 2021

(65) Prior Publication Data
US 2023/0122848 A1    Apr. 20, 2023

(30) Foreign Application Priority Data

Apr. 20, 2020 (KR) .................. 10-2020-0047666
May 15, 2020 (KR) .................. 10-2020-0058595
May 29, 2020 (KR) .................. 10-2020-0065465

(51) Int. Cl.
*H04W 52/36* (2009.01)
*H04L 5/00* (2006.01)
*H04W 72/231* (2023.01)

(52) U.S. Cl.
CPC ......... *H04W 52/365* (2013.01); *H04L 5/0098* (2013.01); *H04W 72/231* (2023.01)

(58) Field of Classification Search
CPC ............. H04W 52/365; H04W 72/231; H04W 52/242; H04W 76/15; H04W 72/0453;
(Continued)

(56) References Cited

U.S. PATENT DOCUMENTS 9,020,556 B2   4/2015  Haim et al.
9,185,665 B2   11/2015 Kim et al.
(Continued)

FOREIGN PATENT DOCUMENTS

EP        4 024 967 A1    7/2022
KR    10-2014-0039152 A   4/2014
(Continued)

OTHER PUBLICATIONS

3GPP; TSG RAN; NR; Medium Access Control (MAC) protocol specification (Release 16)', 3GPP TS 38.321 V16.0.0, Apr. 9, 2020.
(Continued)

*Primary Examiner* — Dominic E Rego
(74) *Attorney, Agent, or Firm* — Jefferson IP Law, LLP

(57) ABSTRACT

Disclosed are a communication technique which merges, with IoT technology, a 5G communication system for supporting a data transmission rate higher than that of a 4G system, and a system therefor. The present disclosure can be applied to intelligent services (for example, smart homes, smart buildings, smart cities, smart cars or connected cars, healthcare, digital education, retail businesses, security-and safety-related services, and the like) on the basis of 5G communication technology and IoT-related technology.

15 Claims, 20 Drawing Sheets

(58) Field of Classification Search
CPC .......... H04W 24/10; H04W 52/0216; H04L 5/0098; H04L 5/001; Y02D 30/70
See application file for complete search history.

(56) References Cited

U.S. PATENT DOCUMENTS

| | | | | |
|---|---|---|---|---|
| 9,363,782 | B2* | 6/2016 | Tenny | H04W 64/00 |
| 9,544,804 | B2* | 1/2017 | Park | H04W 24/10 |
| 11,178,645 | B2* | 11/2021 | Yokomakura | H04W 72/04 |
| 11,843,563 | B2* | 12/2023 | Loehr | H04W 80/02 |
| 2013/0176953 | A1* | 7/2013 | Stern-Berkowitz | H04W 52/365 370/329 |
| 2014/0146907 | A1* | 5/2014 | Kim | H04W 72/23 375/267 |
| 2014/0357275 | A1* | 12/2014 | Quan | H04W 36/0094 455/436 |
| 2015/0087296 | A1* | 3/2015 | Kim | H04W 52/04 455/422.1 |
| 2015/0099501 | A1* | 4/2015 | Kim | H04W 48/16 455/418 |
| 2015/0334637 | A1* | 11/2015 | Kim | H04W 48/12 370/312 |
| 2016/0309423 | A1* | 10/2016 | Lee | H04B 7/26 |
| 2016/0374032 | A1* | 12/2016 | Kim | H04B 17/24 |
| 2017/0195999 | A1* | 7/2017 | Feng | H04W 76/27 |
| 2018/0048498 | A1* | 2/2018 | Stern-Berkowitz | H04L 5/0091 |
| 2018/0146440 | A1* | 5/2018 | Hosseini | H04W 72/12 |
| 2019/0053170 | A1* | 2/2019 | Lee | H04W 72/23 |
| 2019/0149421 | A1 | 5/2019 | Jin et al. | |
| 2019/0313348 | A1* | 10/2019 | MolavianJazi | H04W 52/281 |
| 2019/0349983 | A1 | 11/2019 | Loehr et al. | |
| 2019/0394732 | A1* | 12/2019 | Loehr | H04L 5/001 |
| 2020/0029316 | A1 | 1/2020 | Zhou et al. | |
| 2020/0100193 | A1* | 3/2020 | Cheng | H04W 52/146 |
| 2020/0100194 | A1* | 3/2020 | Nangia | H04W 72/0453 |
| 2020/0145936 | A1* | 5/2020 | Lee | H04W 52/42 |
| 2020/0163031 | A1* | 5/2020 | Loehr | H04W 52/365 |
| 2020/0245184 | A1 | 7/2020 | Jin et al. | |
| 2020/0267667 | A1* | 8/2020 | MolavianJazi | H04W 52/48 |
| 2020/0275391 | A1* | 8/2020 | Guo | H04W 72/23 |
| 2020/0288412 | A1* | 9/2020 | Ajdakple | H04W 52/365 |
| 2020/0329437 | A1* | 10/2020 | MolavianJazi | H04W 76/15 |
| 2020/0351127 | A1* | 11/2020 | Yokomakura | H04L 5/0055 |
| 2021/0176029 | A1* | 6/2021 | Tsai | H04B 7/0626 |
| 2021/0204227 | A1* | 7/2021 | Bergljung | H04W 52/38 |
| 2021/0227477 | A1* | 7/2021 | Lee | H04W 72/04 |
| 2021/0250156 | A1 | 8/2021 | Kim et al. | |
| 2021/0297959 | A1* | 9/2021 | Zhou | H04W 52/365 |
| 2021/0377876 | A1* | 12/2021 | Jeon | H04W 24/08 |

FOREIGN PATENT DOCUMENTS

| | | |
|---|---|---|
| KR | 10-2019-0021303 A | 3/2019 |
| KR | 10-2019-0132818 A | 11/2019 |
| KR | 10-2021-0101985 A | 8/2021 |
| WO | 2021/110124 A1 | 6/2021 |

OTHER PUBLICATIONS

European Office Action dated Feb. 29, 2024, issued in European Application No. 21792887.8.

OPPO, Corrections on PHR generation due to dormant Bwp, R2-2002674, 3GPP TSG-RAN WG2 Meeting #109bis electronic, 3rd Generation Partnership Project (3GPP), Mobile Competence Centre; 650, Route Des Lucioles; F-06921 Sophia-Antipolis Cedex; France, vol. RAN WG2, No. electronic; Apr. 20, 2020-Apr. 30, 2020, Apr. 10, 2020, XP051870911.

European Search Report dated Jul. 4, 2023, issued in European Application No. 21792887.8.

European Office Action dated Oct. 24, 2024, issued in European Application No. 21792887.8.

\* cited by examiner

FIG. 15

RRCReconfiguration message
(1o-10) - 1 > radioBearerConfig
(1o-11) - 1 > CellGroupConfig
   (1o-21) - 2 > mac-CellGroupConfig
   (1o-22) - 2 > SpCellConfig
   (1o-23) - 2 > sCellToAddModList
     (1o-30) - 3 > SCellConfig
       (1o-40) - 4 > sCellindex
       (1o-41) - 4 > sCellConfigCommon
       (1o-42) - 4 > sCellConfigDedicated
   (1o-24) - 2 > sCellToReleaseList
   (1o-25) - 2 > PhysicalCellGroupConfig

FIG. 17

| | | | | | | | | |
|---|---|---|---|---|---|---|---|---|
| 1q-05 | $C_7$ | $C_6$ | $C_5$ | $C_4$ | $C_3$ | $C_2$ | $C_1$ | R | Oct 1

| | | | | | | | | |
|---|---|---|---|---|---|---|---|---|
| 1q-10 | $C_7$ | $C_6$ | $C_5$ | $C_4$ | $C_3$ | $C_2$ | $C_1$ | R | Oct 1
| | $C_{15}$ | $C_{14}$ | $C_{13}$ | $C_{12}$ | $C_{11}$ | $C_{10}$ | $C_9$ | $C_8$ | Oct 2
| | $C_{23}$ | $C_{22}$ | $C_{21}$ | $C_{20}$ | $C_{19}$ | $C_{18}$ | $C_{17}$ | $C_{16}$ | Oct 3
| | $C_{31}$ | $C_{30}$ | $C_{29}$ | $C_{28}$ | $C_{27}$ | $C_{26}$ | $C_{25}$ | $C_{24}$ | Oct 4

| | | | | |
|---|---|---|---|---|
| 1q-15 | Cell ID | DL/UL | BWP ID | State |

PHR TRIGGERING METHOD ACCOMMODATING DORMANT PORTION OF BANDWIDTH IN NEXT-GENERATION MOBILE COMMUNICATION SYSTEM, AND PHR CONFIGURATION METHOD AND DEVICE

TECHNICAL FIELD

The disclosure relates to a method and an apparatus for efficiently managing a dormant bandwidth part in a next-generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G Network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

Recently, a carrier aggregation technology is used in a next-generation mobile communication system in order to provide a service having a high data transmission rate and low transmission latency to a UE. At this time, a method of preventing processing latency that may be generated when carrier aggregation is configured and activated in a UE having a connection with a network or when carrier aggregation is deactivated after being used is needed.

DISCLOSURE

Technical Problem

In a next-generation mobile communication system, carrier aggregation may be used to provide a service having a high data transmission rate and low transmission latency to a UE. However, a method of preventing processing latency that may be generated when carrier aggregation is configured in a UE having a connection with a network and is activated or when carrier aggregation is deactivated after being used is needed.

Particularly, if the UE maintains a plurality of cells in an activated state in order to use the carrier aggregation, the UE is required to monitor a PDCCH for each cell, so that battery consumption of the UE may increase. On the other hand, if the plurality of cells remain in a deactivated state in order to reduce battery consumption of the UE, data transmission/reception latency may occur due to latency generated when the plurality of cells are activated through the use of carrier aggregation.

Technical Solution

A method performed by a terminal in a wireless communication system according to an embodiment of the disclosure to solve the problem includes receiving, from a base station, a message including information for configuring a plurality of serving cells for the terminal, identifying whether a predetermined event for triggering a power headroom report (PHR) is occurred, in case that the predetermined event is occurred, obtaining a power headroom (PH) value for an uplink carrier corresponding to an activated serving cell of the plurality of serving cells, and transmitting, to the base station, the PHR including the obtained PH value, wherein an activated downlink bandwidth part (BWP) of the activated serving cell is not a dormant BWP.

A terminal in a wireless communication system according to an embodiment of the disclosure includes a transceiver, and a controller configured to control the transceiver to receive, from a base station, a message including information for configuring a plurality of serving cells for the terminal, identify whether a predetermined event for triggering a power headroom report (PHR) is occurred, in case that the predetermined event is occurred, obtain a power headroom (PH) value for an uplink carrier corresponding to an activated serving cell of the plurality of serving cells, and control the transceiver to transmit, to the base station, the PHR including the obtained PH value, wherein an activated downlink bandwidth part (BWP) of the activated serving cell is not a dormant BWP.

A method performed by a base station in a wireless communication system according to an embodiment of the disclosure includes transmitting, to a terminal, a message including information for configuring a plurality of serving cells for the terminal and configuration information on a power headroom report (PHR), and receiving, from the terminal, the PHR including a power headroom (HR) value for an uplink carrier corresponding to an activated serving cell of the plurality of serving cells, based on the message, wherein an activated downlink bandwidth part (BWP) of the activated serving cell is not a dormant BWP.

Advantageous Effects

The disclosure proposes a new dormant mode to allow a UE in an RRC-connected mode having a connection with a network to rapidly activate and deactivate carrier aggregation in a next-generation mobile communication system. The disclosure proposes a method of operating a new dormant (or hibernation) mode in units of bandwidth parts (bandwidth part-levels) to rapidly activate the carrier aggregation and save a battery of the UE.

DESCRIPTION OF DRAWINGS

FIG. 15 illustrates a format of an RRC message for configuring configuration information to apply the first embodiment, the second embodiment, the third embodiment, or the fourth embodiment proposed in the disclosure.

FIG. 17 illustrates MAC control information indicating state transition to the active state, the dormant state, or the inactive state proposed in the disclosure.

MODE FOR INVENTION

Figure 1:
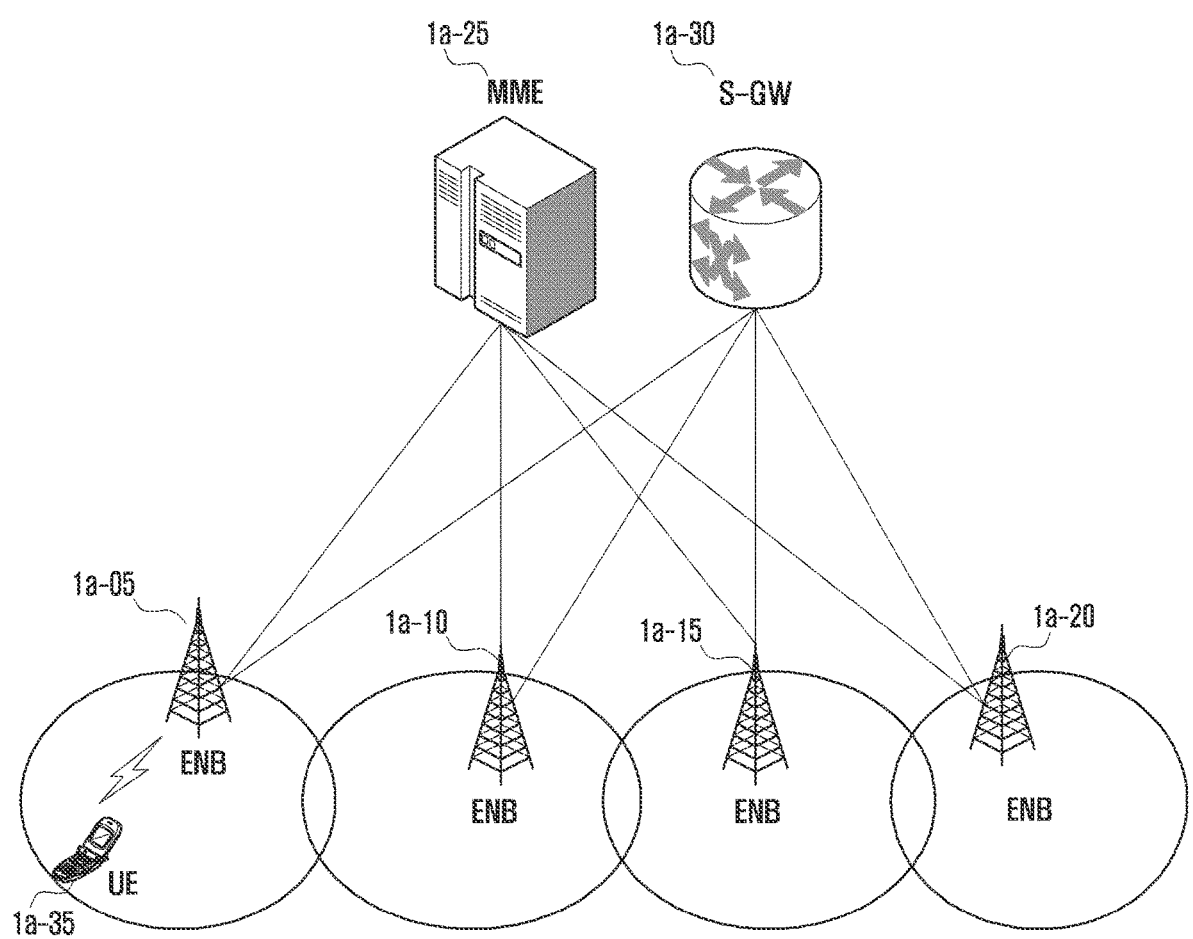
FIG. 1 illustrates a structure of an LTE system to which the present disclosure can be applied.

In describing embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

FIG. 1 illustrates a structure of an LTE system to which the present disclosure can be applied.

Referring to FIG. 1, a radio access network of the LTE system includes next-generation base stations (evolved node Bs) (hereinafter, referred to as ENBs, Node Bs, or base stations) 1a-05, 1a-10, 1a-15, and 1a-20, a mobility management entity (MME) 1a-25, and a serving gateway (S-GW) 1a-30. A user terminal (hereinafter, referred to as a User Equipment (UE) or a terminal) 1a-35 accesses an external network through the ENBs 1a-05 to 1a-20 and the S-GW 1a-30.

In FIG. 1, the ENBs 1a-05 to 1a-20 correspond to the existing node Bs of the UMTS system. The ENB is connected to the UE 1a-35 through a radio channel, and performs a more complicated role than that of the conventional node B. In the LTE system, since all user traffic including a real-time service such as voice over IP (VoIP) via an Internet protocol is served through a shared channel, an apparatus for collecting and scheduling status information on buffer statuses of UEs, available transmission power status, and channel statuses is required, and the ENBs 1a-05 to 1a-20 may serve as this apparatus. One ENB generally controls a plurality of cells. For, example, in order to implement a transmission rate of 100 Mbps, the LTE system uses an orthogonal frequency division multiplexing (OFDM) as a radio access technology in a bandwidth of 20 MHz. Further, an adaptive modulation and coding (AMC) scheme of determining a modulation scheme and a channel coding rate is applied depending on the channel status of the UE. The S-GW 1a-30 is a device for providing a data bearer, and generates or removes the data bearer under a control of the MME 1a-25. The MME is a device for performing not only a function of managing mobility of the UE but also various control functions and is connected to a plurality of eNBs.

Figure 2:
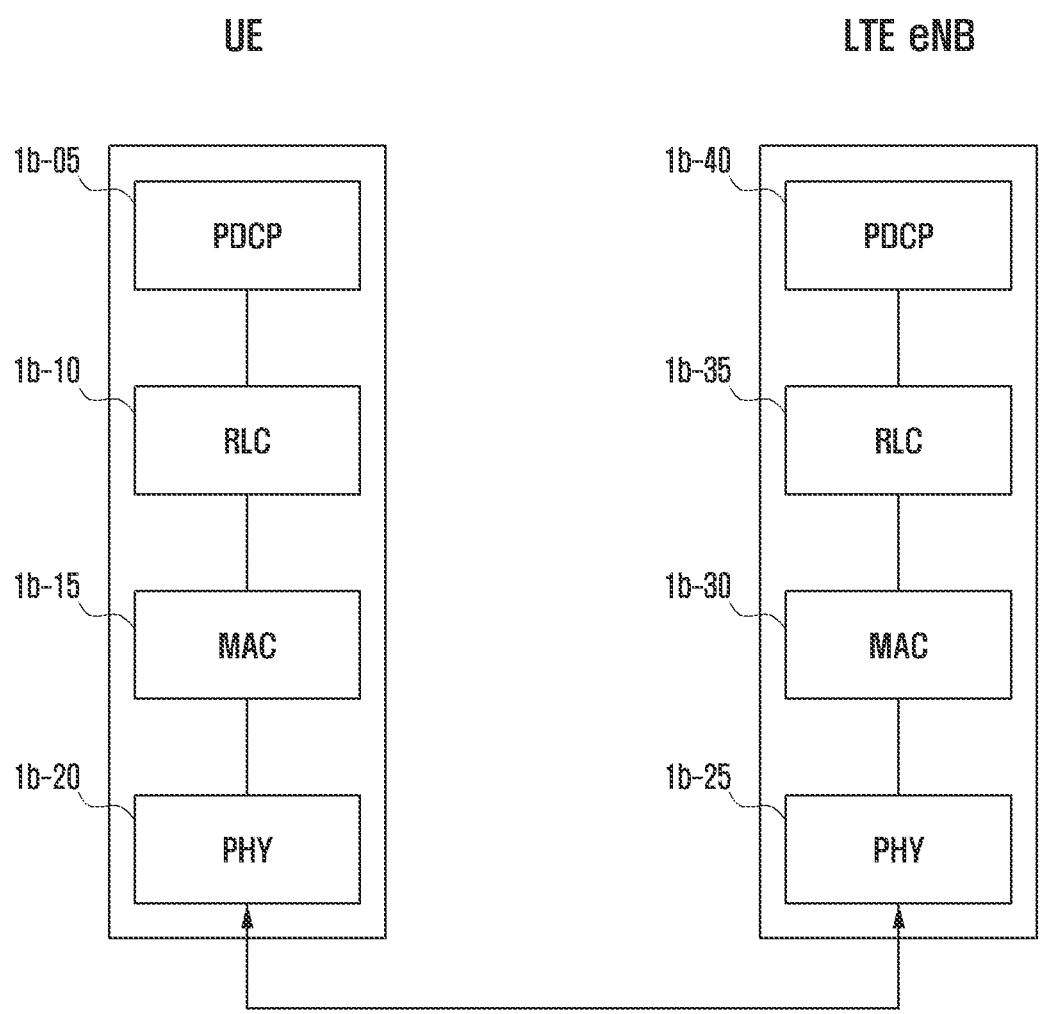
FIG. 2 illustrates a wireless protocol structure in the LTE system to which the disclosure can be applied.

FIG. 2 illustrates a radio protocol structure in the LTE system to which the present disclosure can be applied.

Referring to FIG. 2, the UE and the ENB include packet data convergence protocols (PDCPs) 1b-05 and 1b-40, radio link controls (RLCs) 1b-10 and 1b-35, and medium access controls (MACs) 1b-15 and 1b-30, respectively, in the wireless protocol of the LTE system. The packet data convergence protocols (PDCPs) 1b-05 and 1b-40 perform an operation of compressing/reconstructing an IP header. Main functions of the PDCP are described below.

Header compression and decompression function ((Header compression and decompression: ROHC only)

User data transmission function (Transfer of user data)

Sequential delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU removal function (Timer-based SDU discard in uplink)

Radio link control (RLC) 1*b*-10 and 1*b*-35 reconfigure the PDCP packet data unit (PDU) to be the proper size and perform an automatic repeat request (ARQ) operation. Main functions of the RLC are described below.

Data transmission function (Transfer of upper layer PDUs)

ARQ function (Error Correction through ARQ (only for AM data transfer))

Concatenation, segmentation, and reassembly function (Concatenation, segmentation, and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplication detection function (only for UM and AM data transfer))

Error detection function (Protocol error detection (only for AM data transfer))

RLC SDU deletion function (RLC SDU discard (only for UM and AM data transfer))

RLC re-establishment function (RLC re-establishment)

The MACs 1*b*-15 and 1*b*-30 are connected with various RLC layer devices included in one UE, and perform an operation for multiplexing RLC PDUs to the MAC PDU and demultiplexing the RLC PDUs from the MAC PDU. Main functions of the MAC are described below.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The PHY layers 1*b*-20 and 1*b*-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
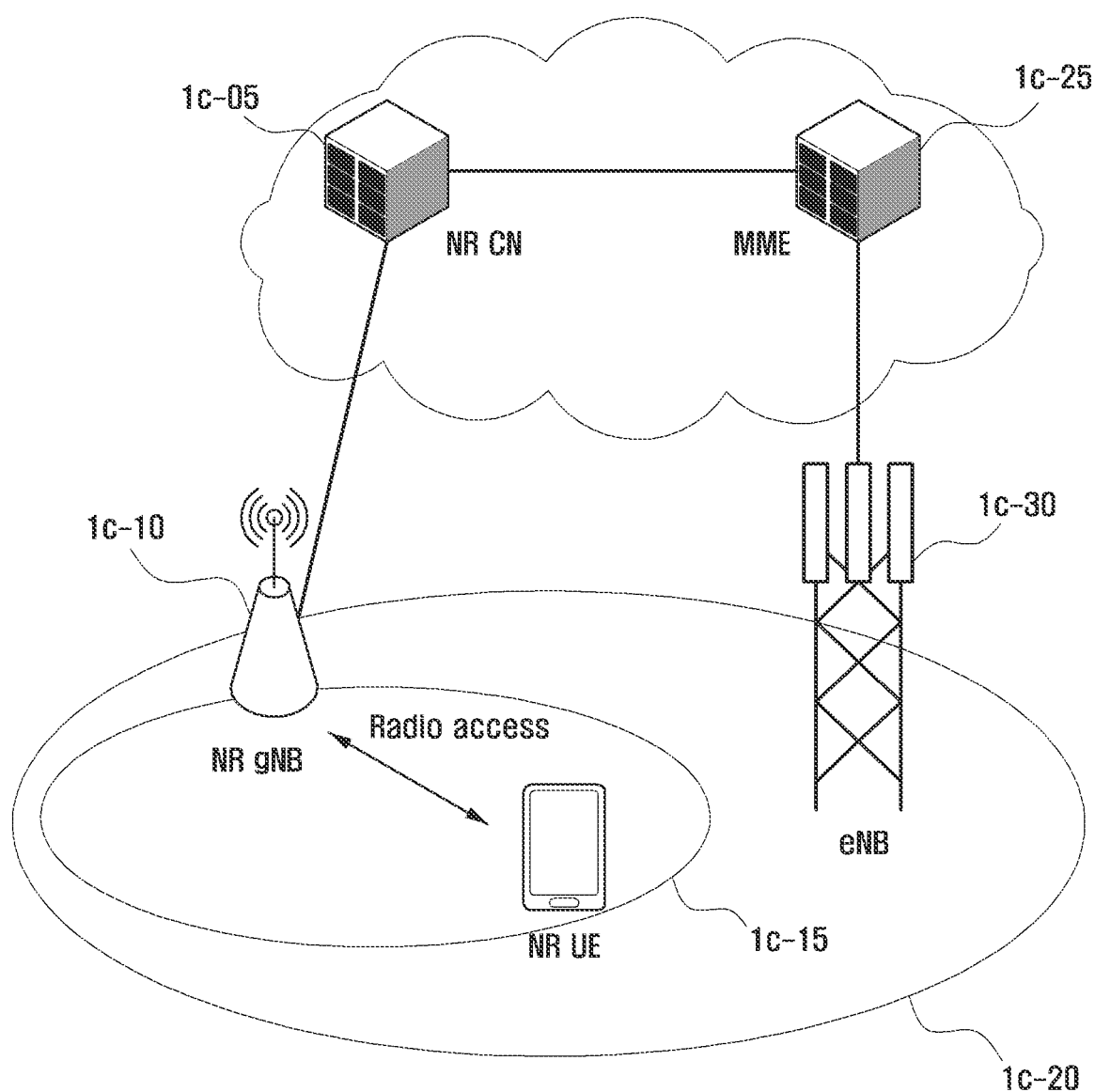
FIG. 3 illustrates a structure of a next-generation mobile communication system to which the disclosure can be applied.

FIG. 3 illustrates a structure of a next-generation mobile communication system to which the disclosure can be applied.

Referring to FIG. 3, a radio access network of a next-generation mobile communication system (hereinafter, NR or 5G) includes a next-generation base station 1*c*-10 (new-radio node B) (hereinafter, referred to as an NR gNB, or an NR base station) and a new-radio core network (NR CN) 1*c*-05. A user terminal 1*c*-15 (hereinafter, referred to as a new radio user equipment (NR UE) or a terminal) accesses an external network through the NR gNB 1*c*-10 and the NR CN 1*c*-05.

In FIG. 3, the NR gNB 1*c*-10 corresponds to an evolved Node B (eNB) of the conventional LTE system. The NR gNB may be connected to an NR UE 1*c*-15 through a radio channel and may provide better service than the conventional node B. Since all user traffic is served through a shared channel in the next-generation mobile communication system, a device for collecting and scheduling status information such as buffer statuses of UEs, available transmission power statuses, and channel statuses is required, and the NR NB 1*c*-10 serves as the device. One NR gNB generally controls a plurality of cells. The NR gNB may have a bandwidth wider than the conventional maximum bandwidth in order to implement super-high-speed data transmission compared to conventional LTE and may apply orthogonal frequency division multiplexing (OFDM) through radio access technology and further apply beam-forming technology. Further, an adaptive modulation and coding (AMC) scheme of determining a modulation scheme and a channel coding rate is applied depending on the channel status of the UE. The NR CN 1*c*-05 performs a function of supporting mobility, configuring a bearer, and configuring a QoS. The NR CN is a device for performing a function of managing the mobility of the UE and various control functions, and is connected to a plurality of base stations. Further, the next-generation mobile communication system may interwork with the conventional LTE system, and the NR CN is connected to an MME 1*c*-25 through a network interface. The MME is connected to an eNB 1*c*-30, which is a conventional base station.

Figure 4:
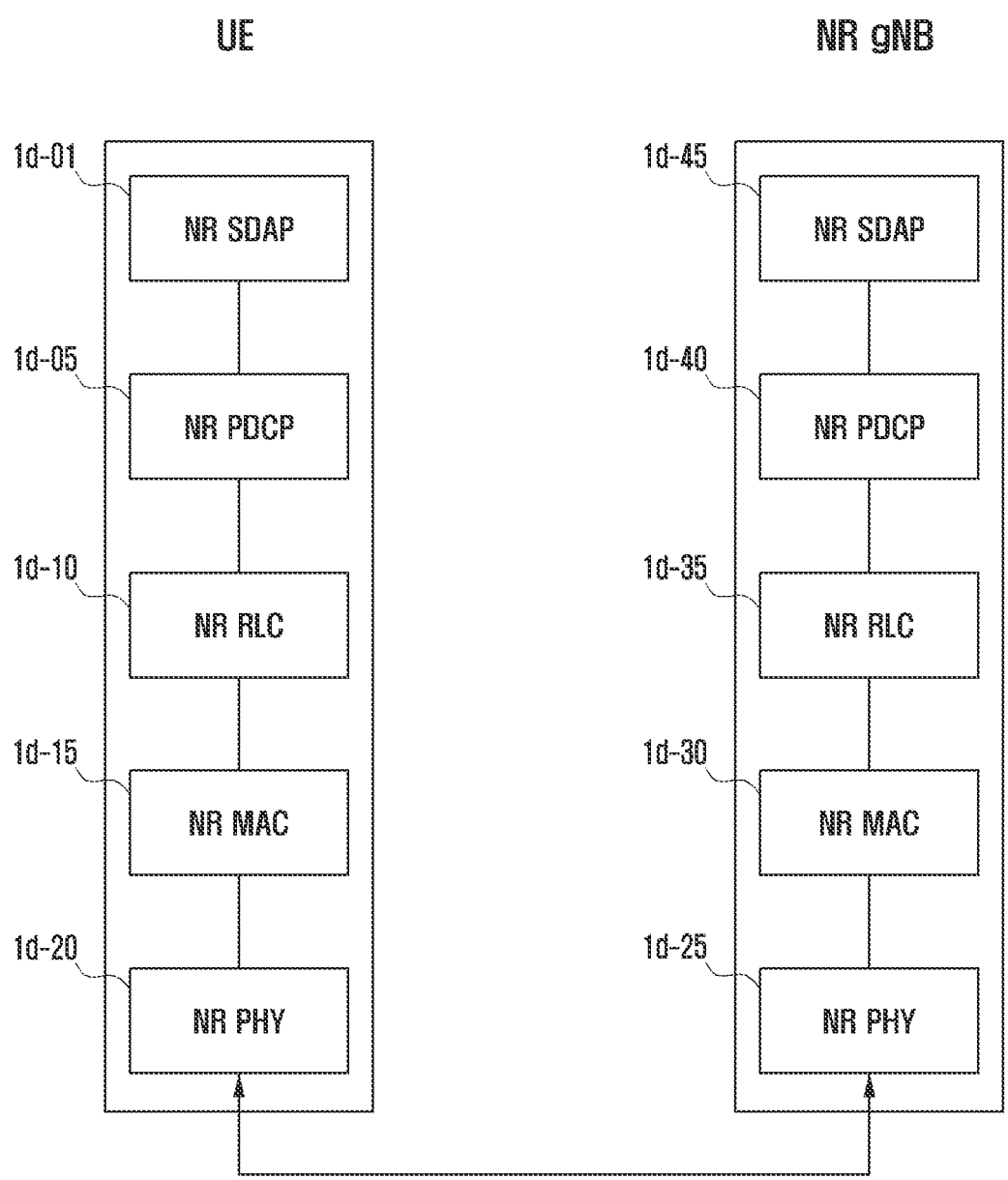
FIG. 4 illustrates a wireless protocol structure of the next-generation mobile communication system to which the disclosure can be applied.

FIG. 4 illustrates a wireless protocol structure of the next-generation mobile communication system to which the disclosure can be applied.

Referring to FIG. 4, the wireless protocol of the next-generation mobile communication system includes NR SDAPs 1*d*-01 and 1*d*-45, NR PDCPs 1*d*-05 and 1*d*-40, NR RLCs 1*d*-10 and 1*d*-35, and NR MACs 1*d*-15 and 1*d*-30 in the UE and the NR gNB.

The main functions of the NR SDAPs 1*d*-01 and 1*d*-45 may include some of the following functions.

User data transmission function (transfer of user-plane data)

Function of mapping QoS flow and a data bearer for uplink and downlink (mapping between a QoS flow and a DRB for both DL and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 1d-05 and 1d-40 may include some of the following functions.

- Header compression and decompression function (Header compression and decompression: ROHC only)
- User data transmission function (Transfer of user data)
- Sequential delivery function (In-sequence delivery of upper layer PDUs)
- Non-sequential delivery function (Out-of-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU removal function (Timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the recorded data regardless of the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 1d-10 or 1d-35 may include some of the following functions.

- Data transmission function (Transfer of upper layer PDUs)
- Sequential delivery function (In-sequence delivery of upper layer PDUs)
- Non-sequential delivery function (Out-of-sequence delivery of upper layer PDUs)
- ARQ function (Error correction through ARQ)
- Concatenation, segmentation, and reassembly function (Concatenation, segmentation, and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU deletion function (RLC SDU discard)
- RLC re-establishment function (RLC re-establishment)

The sequential delivery function (In-sequence delivery) of the NR RLC device is a function of sequentially transferring RLC SDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording PDCP PDUs lost due to the reordering, a function of reporting statuses of the lost PDCP PDUs to a transmitting side, a function of making a request for retransmitting the lost PDCP PDUs, a function of, if there is a lost RLC SDU, sequentially transferring only RLC SDUs preceding the lost RLC SDU to the higher layer, a function of, if a predetermined timer expires even though there is a lost RLC SDU, sequentially transferring all RLC SDUs received before the timer starts to the higher layer, or a function of, if a predetermined timer expires even though there is a lost RLC SDU, sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1d-15 and 1d-30 may be connected to a plurality of NR RLC layer devices configured in one UE, and the main functions of the NR MACs may include some of the following functions.

- Mapping function (Mapping between logical channels and transport channels)
- Multiplexing and demultiplexing function (Multiplexing/demultiplexing of MAC SDUs)
- Scheduling information report function (Scheduling information reporting)
- HARQ function (Error correction through HARQ)
- Logical channel priority control function (Priority handling between logical channels of one UE)
- UE priority control function (Priority handling between UEs by means of dynamic scheduling)
- MBMS service identification function (MBMS service identification)
- Transport format selection function (Transport format selection)
- Padding function (Padding)

The NR PHY layers 1d-20 and 1d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Since a frequency in a notably high band can be used in the next-generation mobile communication system, a frequency bandwidth may also be very wide. However, in UE implementation, completely supporting the very wide bandwidth requires high implementation complexity, which incurs high costs. Accordingly, the next-generation mobile communication system may introduce the concept of a bandwidth part (BWP), and thus a plurality of BWPs may be configured in one cell (SpCell or SCell) and data may be transmitted and received in one or a plurality of BWPs according to an indication of the NR gNB.

The disclosure proposes a state transition method or a bandwidth part switching method and a detailed operation considering a state of an SCell and a plurality of bandwidth parts configured in the SCell when a dormant bandwidth part proposed in the disclosure is introduced. Further, the disclosure proposes a method of managing a dormant mode in units of BWPs (BWP-levels) and transitioning a state or a BWP switching method, and also proposes a detailed operation in a BWP according to a state of each SCell or a state or a mode (active, inactive, or dormant) of each BWP.

In addition, the disclosure configures a plurality of bandwidth parts for each downlink or uplink in one cell (SpCell, PCell, PScell, or SCell) and configures and operates active bandwidth part (active DL or UL BWP,) a dormant BWP (or dormant DL BWP), or an inactive bandwidth part (inactive or deactivated DL/UL BWP) through bandwidth part switching. That is, it is possible to increase a data transmission rate through a method similar to the carrier aggregation by transitioning a downlink or uplink BWP to an activated state for one cell and the UE does not monitor a PDCCH to save a battery by transitioning or switching the downlink BWP to a dormant BWP. Further, the UE may measure a channel for the downlink BWP and report a channel measurement result, thereby supporting rapid activation of a cell or a BWP in the future. In addition, it is possible to save the battery life of the UE by transitioning the downlink (or uplink) BWP to a deactivated state in one cell. An indication of the state transition between BWPs for each cell or a BWP switching indication may be configured and indicated through a radio resource control (RRC) message, a medium access control (MAC) control element (CE), or downlink control information (DCI) of a physical downlink control channel (PDCCH).

In the disclosure, the BWP may be used without distinction between the uplink and the downlink, and the meaning thereof may be each of an uplink BWP and a downlink BWP according to the context.

In the disclosure, the link may be used without any distinction between the uplink and the downlink, and the meaning thereof may indicate each of the uplink and the downlink.

The disclosure configures and introduces a dormant BWP for the SCell of the UE performing carrier aggregation and not monitor a PDCCH in the dormant BWP so as to reduce battery consumption of the UE, and measures a channel (for example, measures or reports channel state information (CSI) or channel quality information (CQI)) or perform beam measurement, beam tracking, or beam operation, thereby performing switching or activation to a normal BWP and thus rapidly starting data transmission in the normal BWP in the case in which data transmission is needed. The dormant BWP may not be configured or applied to the SpCell (the PCell of the MCG or the PCell of the SCG (or the PSCell)) in which a signal should be continuously monitored, feedback should be transmitted or received, or synchronization should be identified and maintained or the SCell in which a PUCCH is configured.

The disclosure proposes various embodiments realized on the basis of PDCCH DCI, a MAC CE, or an RRC message in order to operate the dormant BWP proposed above for the SCell of the UE.

The network or the base station may configure a SpCell (PCell and PSCell) and a plurality of SCells in the UE. The SpCell refers to a PCell when the UE communicates with one base station, and refers to a PCell of a master base station or a PSCell of a secondary base station when the UE communicates with two base stations (the master base station and the secondary base station). The PCell or the PSCell are primary cells used by each MAC layer device for communication between the UE and the base station, and correspond to cells for synchronizing timing, performing random access, transmitting HARQ ACK/NACK feedback through PUCCH transmission resources, and exchanging most control signals. A technology in which the base station operates a plurality of SCells as well as the SpCell to increase uplink or downlink transmission resources is referred to as a carrier aggregation technology.

When the UE receives a configuration of a SpCell and a plurality of SCells through an RRC message, the UE may receive a configuration of a state or mode for each SCell or a BWP of the SCell through the RRC message and/or the MAC CE and/or the PDCCH DCI. The state or mode of the SCell may be configured as an active mode, activated state, a deactivated mode, or a deactivated state. The active mode or the activated state of the SCell may mean that the UE may exchange uplink or downlink data with the base station in a BWP other than an activated BWP of the SCell, an activated normal BWP, or an activated dormant BWP in the active mode or the activated SCell, monitors a PDCCH to identify an indication of the base station, measures a channel for a downlink of the SCell in the active mode or the activated state (or a BWP other than an activated BWP, an activated normal BWP, or an activated dormant BWP of the SCell), periodically reports measurement information, and periodically transmits a pilot signal (sounding reference signal (SRS)) to the base station so that the base station can measure an uplink channel.

However, the deactivated mode or the deactivated state of the SCell may mean that the UE cannot exchange data with the base station, does not monitor a PDCCH to identify an indication of the base station, does not measure a channel, does not transmit a measurement report, and does not transmit a pilot signal since BWPs configured in the SCell is in the deactivated state, the configured BWPs are not activated, or there is no activated BWP among the configured BWPs.

Accordingly, in order to activate SCells in the deactivated mode, the base station first configures frequency measurement configuration information in the UE through an RRC message, and the UE measures a cell or a frequency on the basis of the frequency measurement configuration information. The base station may activate the deactivated SCells on the basis of frequency/channel measurement information after receiving the cell or frequency measurement report of the UE. Therefore, the base station activates the carrier aggregation technology for the UE and generates many delays to start data transmission or reception.

The disclosure proposes a dormant mode or a dormant state for a BWP of each activated SCell (or active SCell) or proposes a configuration or introduction of a dormant bandwidth part (BWP) for each activated SCell in order to reduce a battery of the UE and rapidly start data transmission or reception.

In a BWP in a dormant mode of the activated SCell or a dormant BWP (dormant BWP in the activated SCell) or when the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated.

Accordingly, since the UE does not monitor the PDCCH and does not transmit the pilot signal in the dormant BWP in the activated SCell, the UE may save a battery life compared to a normal BWP (or a BWP which is not the dormant BWP) of the activated SCell or compared to the case in which a normal BWP (or a BWP which is not the dormant BWP) of the activated SCell is activated, and does not transmit the pilot signal may reduce a transmission delay by rapidly activating the normal BWP of the activated SCell based on the measurement report or the measurement report of the dormant BWP of the activated SCell to promptly use the carrier aggregation since the channel measurement report is transmitted unlike the case in which the SCell is deactivated.

The active mode or the activated state of the SCell may mean that the UE may exchange uplink or downlink data with the base station in a BWP other than an activated BWP of the SCell, an activated normal BWP, or an activated dormant BWP in the active mode or the activated SCell, monitors a PDCCH to identify an indication of the base station, measures a channel for a downlink of the SCell in the active mode or the activated state (or a BWP other than an activated BWP, an activated normal BWP, or an activated dormant BWP of the SCell), periodically reports measurement information, and periodically transmits a pilot signal (sounding reference signal (SRS)) to the base station so that the base station can measure an uplink channel.

In the disclosure, the active mode or the activated state of the SCell may mean that the UE cannot exchange uplink or downlink data with the base station in an activated dormant BWP of the SCell, does not monitor a PDCCH to identify an indication of the base station but measures a channel for the downlink of the activated dormant BWP of the SCell in the active mode or the activated state, and periodically reports measurement information to the base station in the active mode or the activated SCell.

In the disclosure, the dormant BWP may indicate a state of the BWP or may be used as a name of the logical concept indicating a specific BWP. Accordingly, the dormant BWP may be activated, deactivated, or switched. For example, an indication indicating switching of a second BWP activated in a first SCell to a dormant BWP, an indication indicating transition of the first SCell to a dormant state or a dormant mode, or an indication indicating activation of the dormant BWP of the first SCell may be interpreted as the same meaning.

In the disclosure, the normal BWP may indicate a BWP other than a dormant BWP among a BWP configured in each SCell of the UE through an RRC message. In the normal BWP, the UE may exchange uplink or downlink data with the base station, monitors a PDCCH to identify an indication of the base station, measures a channel for the downlink, periodically reports measurement information to the base station, and periodically transmits a pilot signal (sounding reference signal (SRS)) to the base station to allow the base station to measure an uplink channel. The normal BWP may indicate a first active BWP, a default BWP, a first active BWP from dormant, or an initial active BWP from dormant.

Among BWPs configured in each SCell of the UE, only one dormant BWP may be configured for the downlink. In another method, among BWPs configured in each SCell of the UE, one dormant BWP may be configured for the uplink or the downlink.

Figure 5:
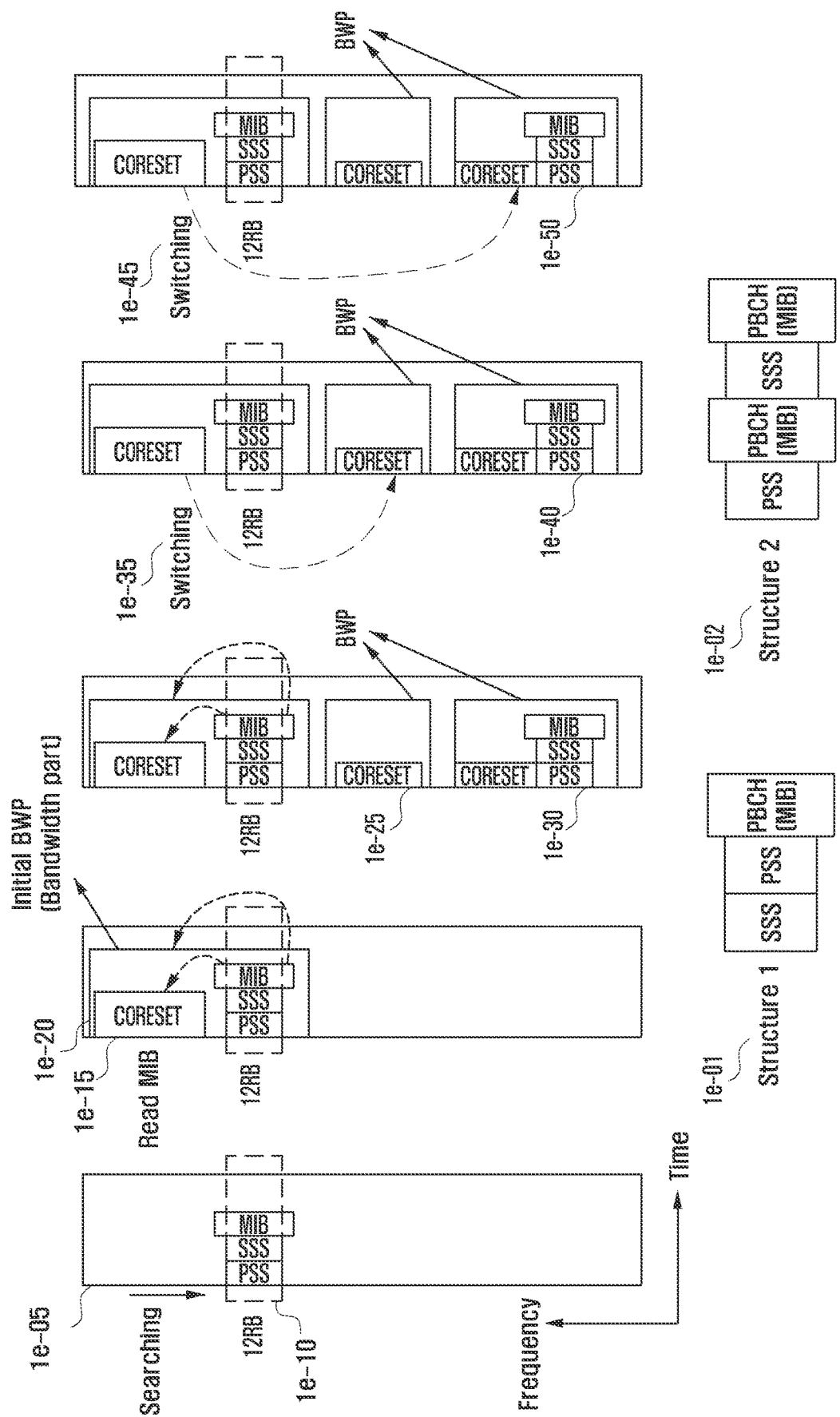
FIG. 5 illustrates a procedure of serving the UE through the efficient use of a very wide frequency bandwidth in the next-generation mobile communication system of the disclosure.

FIG. 5 illustrates a procedure of serving the UE through the efficient use of a very wide frequency bandwidth in the next-generation mobile communication system of the disclosure.

In FIG. 5, a method of providing a service to UEs having different capabilities (or categories) by efficiently using a significantly wide frequency bandwidth and saving a battery in the next-generation mobile communication system is described.

One cell in which the NR gNB provides service may serve a very wide frequency BWP as indicated by reference numeral 1$e$-05. However, in order to provide a service to UEs having different capabilities, the wide frequency bandwidth may be divided into a plurality of BWPs to manage one cell.

First, the UE of which power is initially turned on may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks as indicated by reference numeral 1$e$-10. If the UE searches for the PSS/SSS 1$e$-01 or 1$e$-02 in units of resource blocks and then detects the signals, the UE may read the signals, analyze (decode) the signals, and identify a boundary between a subframe and a radio transmission resource frame (radio frame). Accordingly, the UE may identify subframes in units of 1 ms and synchronize a downlink signal with the NR gNB.

The resource block (RB) is the size of a predetermined frequency resource and a predetermined time resource, and may be defined as a two-dimensional unit. For example, the RB may be defined as a unit of 1 ms in time resources and as 12 subcarriers (1 carrier×15 kHz=180 kHz) in frequency resources. If the UE completes synchronization, the UE may identify information on a control resource set (CORESET) by checking a master system information block (MIB) or minimum system information (MSI) and identify initial access bandwidth part (BWP) information, as indicated by reference numerals 1$e$-15 and 1$e$-20. CORESET information refers to the location of time/frequency transmission resources through which a control signal is transmitted from the base station, and may be, for example, the location of resources through which a PDCCH channel is transmitted. That is, the CORESET information is information indicating resources through which first system information (system information block 1: SIB 1) is transmitted and indicates frequency/time resources through which a PDCCH is transmitted. The UE may identify information on an initial BWP by reading the first system information. As described above, if the UE completes synchronization of the downlink signal with the NR gNB and is able to receive a control signal, the UE may perform a random-access procedure in an initial BWP of a cell on which the UE camps, make a request for configuring an RRC connection, receive an RRC message, and make an RRC connection configuration.

In the RRC connection configuration, a plurality of BWPs may be configured in every cell (PCell, PSCell, SpCell, or SCell). A plurality of BWPs may be configured for the downlink within one cell, and separately, a plurality of BWPs may be configured for the uplink.

The plurality of BWPs may be indicated and configured by a bandwidth part identifier (BWP identifier) to be used as an initial BWP, a default BWP, a first active BWP, a dormant BWP, or a first active BWP (first active BWP from dormant) that is activated from a dormant state.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The gNB may configure an initial downlink BWP to be used in downlink and an initial uplink BWP to be used in uplink for each cell.

Configuration information of the initial BWP may be broadcasted through first system information (system information 1: SIB 1) indicated by the CORESET, and may be configured again in the UE to which the NR gNB is connected through an RRC message. The initial BWP may be designated and used as a BWP identifier no. 0 in each of the uplink and the downlink. That is, all UEs accessing the same cell may equally designate the same initial BWP to BWP identifier no. 0 use the initial BWP. This confers an advantage of easily performing a contention-based random-access procedure because the NR gNB can transmit a random-access response (RAR) message in the initial BWP, which all UEs can read, during the random-access procedure.

The first active BWP may be configured to be UE specific and may be designated and indicated by a BWP identifier among a plurality of BWPs. The first active BWP may be configured for each of the downlink and the uplink, and include a first active downlink BWP and a first active uplink BWP configured as respective BWP identifiers.

When a plurality of BWPs is configured in one cell, the first active BWP may be used to indicate which BWP is to be activated and used first. For example, when a PCell or PSCell and a plurality of SCells are configured in the UE and a plurality of BWPs is configured in each PCell or PSCell or each SCell, if the PCell, the PSCell, or the SCell is activated, the UE may activate and use a first active BWP among the plurality of BWPs configured in the PCell, PSCell, or SCell. That is, the first active downlink BWP may be activated and used for the downlink, and the first active uplink BWP may be activated and used for the uplink.

Upon receiving information indicating activation of the SCell or the BWP in a deactivated state through an RRC message, MAC control information, or DCI, the UE may perform an operation of switching the current or activated downlink BWP of the SCell to activate the same to the first active downlink BWP (or a BWP configured or indicated by an RRC message) or switching the current or activated uplink BWP to activate the same to the first active uplink BWP (or a BWP configured or indicated by an RRC message). Further, the operation may be performed when an indication indicating transition of the SCell or the BWP to the dormant state is received through an RRC message, MAC control information, or DCI. This is because the base station can effectively use carrier aggregation only by measuring and reporting a frequency/channel for the first active downlink/uplink BWP even when a channel measurement report is transmitted in the dormant state since the current or activated downlink BWP is switched and activated to activate the first active downlink BWP (or the BWP configured or indicated by the RRC message) or the uplink BWP is switched and activated to the first active uplink BWP (or the BWP configured or indicated by the RRC message) when the SCell or the BWP is activated.

The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP or start or restart when the activated BWP is switched to another BWP. If the timer expires, the UE may fall back or switch from the downlink BWP activated in the cell to the default BWP.

The switching may be a procedure of deactivating the currently activated BWP and activating the BWP to be switched to, and may be triggered through an RRC message, MAC control information (MAC control element), or L1 signaling (downlink control information (DCI) of a PDCCH). The switching may be triggered by an indication of the BWP to be switched or activated, and the BWP may be indicated by a BWP identifier (for example, 0, 1, 2, 3, or 4).

The reason why the default BWP is used only for the downlink is to make it easy to perform NR gNB scheduling because the NR gNB allows the UE to receive an indication of the NR gNB (for example, DCI of a PDCCH) by falling back to the default BWP for each cell after a predetermined time. For example, if the NR gNB configures the default BWP of the UEs accessing one cell as the initial BWP, the NR gNB may continuously transmit a scheduling indication only in the initial BWP after a predetermined time. If the default BWP is not configured through the RRC message, the default BWP may be fall back to the initial BWP by considering the initial BWP as the default BWP when the BWP inactivity timer expires.

In another method, in order to increase implementation freedom of the NR gNB, the default BWP may be defined and configured for the uplink and thus used like the default BWP of the downlink.

The dormant BWP refers to a BWP in a dormant mode of the activated SCell or a dormant BWP (dormant BWP in the activated SCell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated.

Accordingly, since the UE does not monitor the PDCCH and does not transmit the pilot signal in the dormant BWP in the activated SCell, the UE may save a battery life compared to a normal BWP (or a BWP which is not the dormant BWP) of the activated SCell or compared to the case in which a normal BWP (or a BWP which is not the dormant BWP) of the activated SCell is activated, and does not transmit the pilot signal may reduce a transmission delay by rapidly activating the normal BWP of the activated SCell based on the measurement report or the measurement report of the dormant BWP of the activated SCell to promptly use the carrier aggregation since the channel measurement report is transmitted unlike the case in which the SCell is deactivated.

A first active BWP activated from a dormant state after switching from a dormant state or a dormant BWP (or a first active non-dormant BWP or a BWP configured or indicated through an RRC message) may be a BWP which should be activated by switching the current or activated BWP of the activated SCell by the UE or a BWP which should be activated from a dormant state configured in the RRC message according to an indication in the case in which the UE receives an indication of switching a BWP of the activated SCell from a dormant BWP to a normal BWP (or a BWP which is not the dormant BWP) from the base station through PDCCH DCI, a MAC CE, or an RRC message, receives an indication of switching or transitioning an active BWP from a dormant BWP to a normal BWP, or receives an indication indicating switching or transitioning the active BWP from the dormant BWP to the normal BWP (for example, a first active BWP activated from a dormant state) when the UE operates a BWP of one activated SCell as a dormant BWP or when an activated BWP of the activated SCell is a dormant BWP or is switched to a dormant BWP in the SCell.

Figure 6:
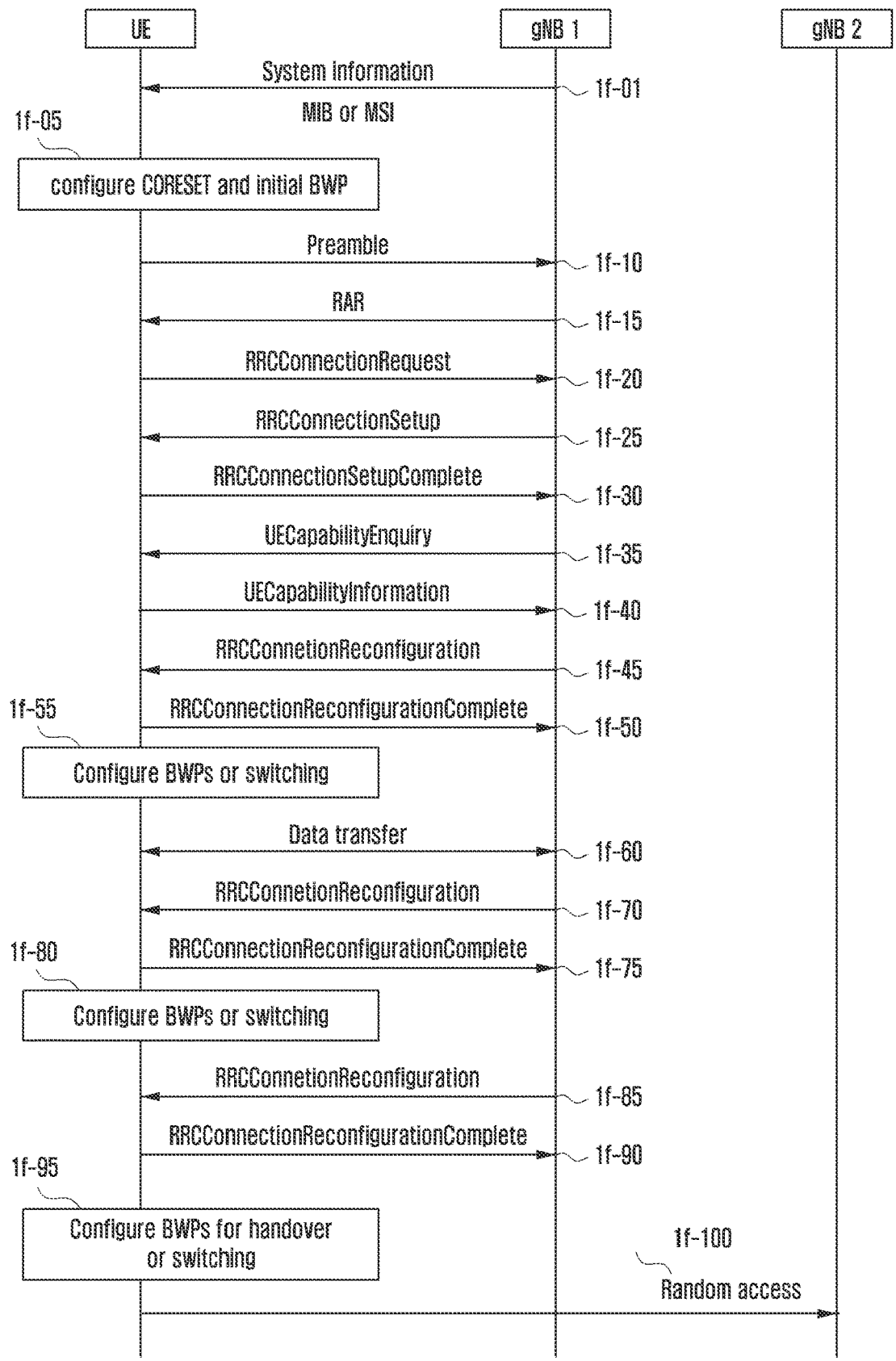
FIG. 6 illustrates a procedure in which the UE switches from an RRC-idle mode to an RRC-connected mode in the next-generation mobile communication system of the disclosure and proposes a method of configuring a plurality of bandwidth parts (BWPs) and configuring a default BWP or a first active BWP.

FIG. 6 illustrates a procedure in which the UE switches from an RRC-idle mode to an RRC-connected mode in the next-generation mobile communication system of the disclosure and proposes a method of configuring a plurality of bandwidth parts (BWPs) and configuring a default BWP or a first active BWP.

One cell in which the gNB provides service may serve a very wide frequency band. First, the UE may search the entire frequency band provided by a service provider (public land mobile network (PLMN)) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks. If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by checking a master system information block (MIB) or minimum system information (MSI) and identify initial access bandwidth part (BWP) information by reading system information in steps 1*f*-01 and 1*f*-05. CORESET information refers to the location of time/frequency transmission resources through which a control signal is transmitted from the base station, and may be, for example, the location of resources through which a PDCCH channel is transmitted.

As described above, if the UE completes synchronization of the downlink signal with the gNB and is able to receive a control signal, the UE may perform a random-access procedure in the initial BWP, receive a random-access response, make a request for configuring an RRC connection, receive an RRC message, and configure the RRC connection in steps 1*f*-10, 1*f*-15, 1*f*-20, 1*f*-25, and 1*f*-30.

If the basic RRC connection is completely configured, the gNB may transmit an RRC message which asks about a UE capability to the UE (UECapabilityEnquire) in order to identify the UE capability in 1*f*-35. In another method, the gNB may ask a mobility management entity (MME) or an access and mobility function (AMF) about the UE capability in order to identify the UE capability. This is because the MME or the AMF may have UE capability information if the UE previously accessed the UE. If there is no UE capability information required by the gNB, the gNB may make a request for UE capability to the UE.

The reason why the gNB transmits the RRC message to identify the UE capability to the UE is to identify the UE capability, for example, to determine how many frequency bands can be read by the UE or detect areas of frequency bands which can be read. After identifying the UE capability, the gNB may configure an appropriate BWP in the UE. If the UE receives the RRC message which enquires about the UE capability, the UE may transmit information containing information indicating the range of bandwidth that the UE supports, indicate an offset from a reference center frequency to indicate a range of bandwidth supported in the current system bandwidth, information directly indicating a start point and an end point of the supported frequency bandwidth, or information indicating a center frequency and a bandwidth in step 1*f*-40.

The BWP may be configured through an RRCSetup message or an RRCResume message of the RRC connection configuration in step 1*f*-25 or an RRCReconfiguration message in step 1*f*-45, the RRC message may include configuration information of a PCell, a PSCell, or a plurality of SCells, and a plurality of BWPs may be configured for each cell (PCell, PSCell, or SCell). When the plurality of BWPs are configured for each cell, a plurality of BWPs to be used in the downlink of each cell may be configured. In the case of an frequency division duplex (FDD) system, a plurality of BWPs to be used in the uplink of each cell may be configured to be distinguished from downlink BWPs. In the case of a time division duplex (TDD) system, a plurality of BWPs to be used in common in the downlink and the uplink of each cell may be configured.

Information for configuring the BWP of each cell (PCell, PSCell, or SCell) may include some of the following information.

Downlink BWP configuration information of the cell
        Initial downlink BWP configuration information
        A plurality of pieces of BWP configuration information and BWP IDs corresponding to the respective BWPs
        Initial configuration information of the downlink BWP of the cell (for example, activated state, dormant state, or deactivated state)
        A BWP ID indicating a first active downlink BWP
        A BWP ID indicating a default BWP
        Configuration information for monitoring a PDCCH for each BWP. For example, the configuration information includes CORESET information, search space resource information, PDCCH transmission resources, periodicity, and subframe number information
        A BWP indicator indicating a dormant BWP or a 1-bit indicator indicating a dormant BWP for each BWP in the BWP configuration information
        A BWP identifier indicating a first active BWP from dormant or a 1-bit indicator indicating a first active BWP from dormant for each BWP in the BWP configuration information
        BWP inactivity timer configuration and a timer value
    Uplink BWP configuration information of the cell
        Initial uplink BWP configuration information
        A plurality of pieces of BWP configuration information and BWP IDs corresponding to the respective BWPs
        Initial configuration information of the downlink BWP of the cell (for example, activated state, dormant state, or deactivated state)
        A BWP indicator indicating a dormant BWP or a 1-bit indicator indicating a dormant BWP for each BWP in the BWP configuration information
        A BWP ID indicating a first active uplink BWP The configured initial BWP, default BWP, or first active BWP may be used for the following purpose, and may be operated so as to suit the purpose.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The gNB may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the UE which accesses the gNB through an RRC message. The initial BWP may be used while being designated with BWP identifier number 0 in each of the uplink and the downlink. That is, all UEs accessing the same cell may equally designate the same initial BWP to BWP identifier no. 0 use the initial BWP. This confers an advantage of easily performing a contention-based random-access procedure because the NR gNB can transmit a random-access response (RAR) message in the initial BWP, which all UEs can read, during the random-access procedure.

The first active BWP may be configured to be UE specific and may be designated and indicated by a BWP identifier among a plurality of BWPs. The first active BWP may be configured for each of the downlink and the uplink, and a first active downlink BWP and a first active uplink BWP may be configured by respective BWP identifiers. When a plurality of BWPs is configured in one cell, the first active BWP may be used to indicate which BWP is to be activated and used first. For example, when a PCell or PSCell and a plurality of SCells are configured in the UE and a plurality of BWPs is configured in each PCell or PSCell or each SCell, if the PCell, the PSCell, or the SCell is activated, the UE may activate and use a first active BWP among the plurality of BWPs configured in the PCell, PSCell, or SCell. That is, the first active downlink BWP may be activated and used for the downlink, and the first active uplink BWP may be activated and used for the uplink.

Upon receiving an indication indicating activation of any SCell or a BWP of any activated SCell in a deactivated state or a dormant state or switching or activation from an inactive or dormant bandwidth to a normal BWP through an RRC message, MAC control information, or DCI of a PDCCH, the UE may perform an operation of switching the current or activated downlink BWP of the SCell to activate the first active downlink BWP (or a BWP configured or indicated by an RRC message) or switching the current or activated uplink BWP to activate the first active uplink BWP (or a BWP configured or indicated by an RRC message). Further, upon receiving an indication indicating transition of the activated SCell or the BWP to the dormant state or an indication indicating switching or activation to the dormant BWP through the RRC message, MAC control information, or the DCI of the PDCCH, the UE may switch the BWP to the dormant BWP, activate the BWP, or make the BWP be the dormant state.

The switching to the dormant state or the dormant BWP or the activation of the dormant BWP may be the performance of an operation proposed in the dormant state in the disclosure. That is, an operation of measuring a channel in a downlink BWP (or a dormant BWP) and transmitting a report to the base station without monitoring a PDCCH may be performed. In another method, when the activated SCell or BWP is activated or switched to the normal BWP, a downlink BWP is switched and activated to a first active downlink BWP and an uplink BWP is switched and activated to a first active uplink BWP, and thus the dormant BWP may be configured as the first active downlink, the uplink BWP, or the default BWP. The default BWP may be configured to be UE-specific, and may be designated to and indicated by the identifier of a BWP among a plurality of BWPs.

The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP or start or restart when the activated BWP is switched to another BWP. If the timer expires, the UE may fall back or switch the downlink BWP activated in the cell to the default BWP. The switching may be a procedure of deactivating the currently activated BWP and activating the BWP to be switched, and may be triggered through an RRC message, MAC control information (MAC control element), or L1 signaling (downlink control information (DCI) of a PDCCH). The switching may be triggered by an indication of a BWP to be switched or activated, and the BWP may be indicated by a BWP identifier (for example, 0, 1, 2, 3, or 4).

The reason why the default BWP is used only for the downlink is to make it easy to perform gNB scheduling because the gNB allows the UE to receive an indication of the gNB (for example, DCI of a PDCCH) by falling back to the default BWP for each cell after a predetermined time. For example, if the gNB configures the default BWP of the UEs accessing one cell as the initial BWP, the gNB may continuously transmit a scheduling indication only in the initial BWP after a predetermined time. If the default BWP is not configured through the RRC message, the default BWP may be fall back to the initial BWP by considering the initial BWP as the default BWP when the BWP inactivity timer expires.

In another method, in order to increase implementation freedom of the gNB, the default BWP may be defined and configured for the uplink and thus used like the default BWP of the downlink.

The dormant BWP refers to a BWP in a dormant mode of the activated cell or a dormant BWP (dormant BWP in the activated SCell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH and does not transmit the pilot signal in the dormant BWP in the activated SCell, the UE may save a battery life compared to a normal BWP (or a BWP which is not the dormant BWP) of the activated SCell or compared to the case in which a normal BWP (or a BWP which is not the dormant BWP) of the activated SCell is activated, and does not transmit the pilot signal may reduce a transmission delay by rapidly activating the normal BWP of the activated SCell based on the measurement report or the measurement report of the dormant BWP of the activated SCell to promptly use the carrier aggregation since the channel measurement report is transmitted unlike the case in which the SCell is deactivated.

The first active BWP activated from a dormant state (or a first active non-dormant BWP) may be a first active BWP activated from a dormant state, that is, a BWP which the UE should switch or activate in the activated SCell, configured in the RRC message according to an indication in the case in which the UE receives an indication indicating switching of the BWP of the activated SCell from a dormant BWP to a normal BWP (or a BWP which is not the dormant BWP) through PDCCH DCI, a MAC CE, or an RRC message from the gNB, receives an indication indicating switching or transmission of the active BWP from a dormant BWP to a normal BWP, and receives an information indicating switching, transition, or activation of the active BWP from a dormant BWP to a normal BWP (for example, a first active BWP activated from a dormant state) when the BWP of one activated SCell of the UE is operated as the dormant BWP, when the activated BWP of the activated SCell is the dormant BWP, or when switching to the dormant BWP in the SCell is performed.

In the disclosure, switching a first BWP to a second BWP may mean activating the second BWP or deactivating the activated first BWP and activating the second BWP.

In an RRCSetup message of the RRC connection configuration, an RRCResume message of step 1f-25, or an RRCReconfiguration message of step 1f-45, a state transition timer may be configured to allow the UE to transition the state by itself even though the UE does not receive an indication through an RRC message from the base station, MAC control information, or DCI of a PDCCH. For example, when a cell inactivity timer (SCellDeactivationTimer) is configured for each SCell and the cell inactivity timer expires, the SCell may transition to the deactivated state. Alternatively, when a downlink (or uplink) BWP hibernation timer (DLBWPHibernationTimer or ULBWPHibernationTimer) is configured for each SCell or each SCell BWP, a cell hibernation timer (SCellHibernationTimer) may be configured for each SCell, and the cell hibernation timer or the downlink (or uplink) BWP hibernation timer expires, the SCell or the downlink (or uplink) BWP may be transitioned to a dormant state or switched to a dormant BWP.

For example, when the cell hibernation timer or the downlink (uplink) BWP hibernation timer expires, the SCell or downlink (uplink) BWP in an activated state may be transitioned or switched to a dormant BWP, and the SCell or downlink (or uplink) BWP in a deactivated state or the dormant state may not be transitioned to a dormant state or a dormant BWP.

The BWP hibernation timer may start when an indication indicating switching or activating of a BWP is received through an RRC message, a MAC CE, or PDCCH DCI, or may stop when an indication indicating switching to a dormant BWP, an indication hibernation of the BWP, or an indication indicating activation of a dormant BWP is received through an RRC message, a MAC CE, or PDCCH DCI.

Further, a dormant cell inactivity timer (dormantSCellDeactivationTimer) or a dormant or downlink (or uplink) dormant BWP inactivity timer (dormantDLDeactivationTimer or dormantULDeactivationTimer) may be configured for each SCell or downlink (uplink) BWP, and an SCell or downlink (uplink) dormant BWP in a dormant state may be transitioned to a deactivated state. When the dormant cell inactivity timer or the dormant or downlink (uplink) BWP inactivity timer expires, only the SCell or downlink (or uplink) dormant BWP in a dormant state is transitioned to a deactivated state, but the SCell or downlink (or uplink) BWP in an activated state or a deactivated state is not transitioned to the deactivated state.

Further, the dormant BWP hibernation timer may start when an indication indicating switching, hibernation, or activation of the dormant BWP is received through an RRC message, a MAC CE, or PDCCH DCI or may stop when an indication indicating deactivation or activation of the BWP or the SCell or an indication indicating activation of a normal BWP (for example, a BWP which is not a dormant BWP configured through RRC) is received through an RRC message, a MAC CE, or PDCCH DCI. If the cell inactivity timer (SCellDeactivationTimer) (or the downlink (or uplink) BWP hibernation timer) and the cell hibernation timer (SCellHibernationTimer) (or the downlink (or uplink) dormant BWP inactivity timer) are configured together, the cell hibernation timer (SCellHibernationTimer) (or the downlink (or uplink) dormant BWP hibernation timer) is prioritized. That is, if the cell hibernation timer (SCellHibernationTimer) (or the downlink (or uplink) BWP hibernation timer) is configured, the corresponding SCell or downlink (or uplink) BWP is not deactivated even though the cell inactivity timer (SCellDeactivationTimer) (or the downlink (or uplink) dormant BWP inactivity timer) expires. In other words, when the cell hibernation timer (or the downlink (or uplink) BWP hibernation timer) is configured, the SCell or downlink (or uplink) BWP may be first transitioned from an activated state to a dormant state or switched to a dormant BWP due to expiration of the timer, and then the cell or BWP which has been transitioned to the dormant state may be transitioned to the deactivated state due to expiration of the dormant cell or BWP inactivity timer.

Accordingly, when the cell hibernation timer or the BWP hibernation timer is configured, the cell inactivity timer or the dormant BWP inactivity timer does not influence the state transition of the SCell or downlink (or uplink) BWP. The SCell or downlink (or uplink) BWP is not directly transitioned to the deactivated state if the cell hibernation timer or the BWP hibernation timer is configured even though the cell inactivity timer or the dormant BWP inactivity timer expires.

If the cell inactivity timer (or the downlink (or uplink) BWP hibernation timer) is not configured in the RRC message, the UE may consider the cell inactivity timer (or the downlink (or uplink) BWP hibernation timer) to be set to an infinite value.

Further, the gNB may configure frequency measurement configuration information and frequency measurement gap information through an RRC setup message of the RRC connection configuration, the RRCResume message of step 1f-25, or the RRCReconfiguration message of step 1f-45, and the message may include information on a target for which a frequency is to be measured (measurement object). Further, in the RRCSetup message of the RRC connection configuration, the RRCResume message of operation 1f-25, or the RRCReconfiguration message of operation 1f-45, a function for reducing power consumption of the UE (power saving mode) may be configured, or configuration information such as a discontinuous reception (DRX) cycle, an offset, an on-duration interval (an interval in which the UE should monitor a PDCCH), or time information, time information indicating when the UE should monitor or search for a PDCCH from the base station before the on-duration interval during the DRX cycle, or short time period information may be configured together with the function for reducing power consumption.

If the function for reducing power consumption of the UE is configured, the UE may configure a DRX cycle and search for a Wake-Up Signal (WUS) in an interval configured to monitor the PDCCH by the base station before the on-duration interval, and the base station may indicate whether to skip (or not perform) or perform monitoring of the PDCCH in the on-duration interval to the UE through DCI of the PDCCH of the WUS. The UE should always monitor the PDCCH in the on-duration interval, but the base station may allow the UE to reduce battery consumption by making the UE not monitor the PDCCH in the on-duration interval through the WUS.

As described above, when the RRC connection configuration is completed, the UE may configure a plurality of BWPs according to the indication configured through the RRC message. Further, in order to save a battery, the UE may activate one or a small number of BWPs among the plurality of configured BWPs. For example, the gNB may indicate one BWP to be activated. The gNB may indicate activation of the BWP through the RRC message, MAC control information (MAC CE), or L1 signaling (PHY layer control signal such as DCI of the PDCCH) to indicate switching of the initial access BWP to a new BWP.

In another method, the UE may define new bitmap information through DCI of the PDCCH and indicate activation, hibernation, or deactivation. In another method, whether to activate the normal BWP (for example, the first active BWP that is activated from the dormant state), activate the dormant BWP, switch the dormant BWP, or switch the BWP may be indicated by the bitmap. Since there are many users who newly access in the initial access BWP, it may be more advantageous for scheduling to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information in order to reduce signaling overhead.

Hereinafter, the disclosure newly proposes the dormant BWP in the next-generation mobile communication system and proposes in detail the UE operation in each BWP when each BWP is transitioned or switched.

Figure 7:
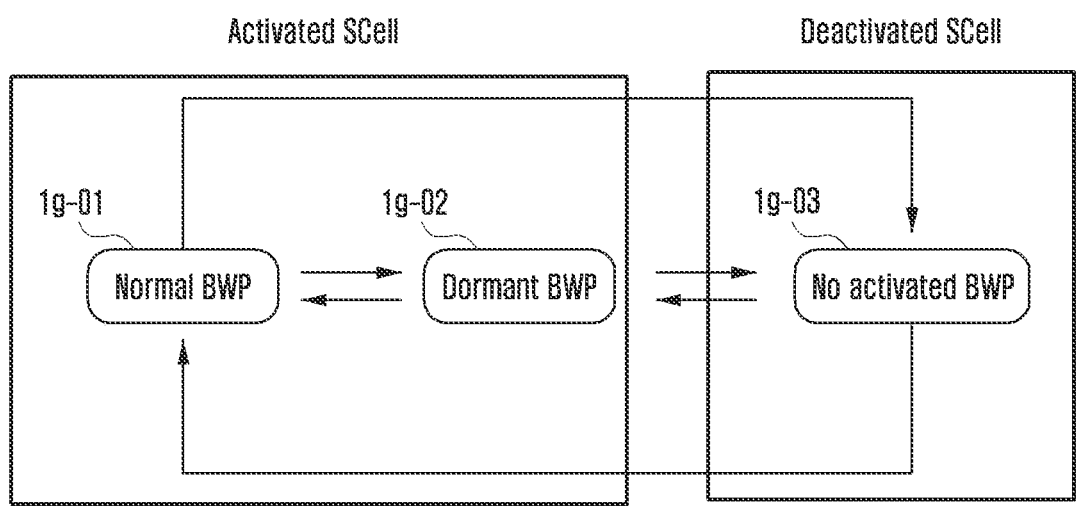
FIG. 7 illustrates a procedure of transitioning a state for each BWP or switching a BWP proposed in the disclosure.

FIG. 7 illustrates a procedure of transitioning a state for each BWP or switching a BWP proposed in the disclosure.

As illustrated in FIG. 7, a BWP of each cell (for example, SCell) may be activated to a normal BWP in operation 1g-01, activated to a dormant BWP in operation 1g-02, or deactivated in operation 1g-03. The normal BWP or the dormant BWP may be activated or deactivated by the indication of configuration information of the RRC message, MAC control information, or PDCCH DCI. In another method, the BWP of each cell of the UE may have an activated state 1g-01, a deactivated state 1g-03, or a dormant state 1g-02, and may perform state transition due to an indication by configuration information of the RRC message, MAC control information, or PDCCH DCI.

The state transition operation for each BWP of the SCell (activation, deactivation, or hibernation) or the operation of activating the normal BWP, activating the dormant BWP, activating the first active BWP activated from the dormant state, or deactivating the normal BWP or the dormant BWP proposed in the disclosure may be performed by one indication or configuration among the following cases.

- When the state of the BWP of the SCell is configured through the RRC message, the BWP of each SCell is configured through RRC message, the dormant BWP is configured in the SCell, or the first active BWP is configured as the dormant BWP, the UE may start the SCell starts through switching or activation to the dormant BWP and perform the operation in the dormant BWP.
- The case in which SCell activation or deactivation, or dormant MAC CEs are received,
- The case in which a MAC CE indicating activation or deactivation of the normal BWP or the first active BWP or the dormant BWP from the dormant state is received,
- The case in which DCI of a PDCCH indicating activation, deactivation, or switching of the normal BWP or the first active BWP from dormant, or the dormant BWP is received,
- The case in which a cell hibernation timer is not configured in an activated SCell and a configured cell inactivity timer expires,
- The case in which a BWP hibernation timer is not configured in the active BWP and a configured BWP inactivity timer (for example, a bwpDeactivatedTimer) expires,
- The case in which a cell hibernation timer configured in an activated SCell expires,
- The case in which a BWP hibernation timer configured in an active BWP expires,
- The case in which a dormant state SCell inactivity timer configured in a dormant state SCell expires,
- The case in which a dormant BWP inactivity timer (dormantBWPDeactivatedTimer) configured in the dormant BWP expires, Further, the state transition operation or the dormant BWP operation method proposed in the disclosure have the following features.

- A dormant BWP cannot be configured in the SpCell (PCell or PSCell) (or downlink BWP or uplink BWP of the cell) but only a normal BWP is configured therein and is always in an activated state. The SpCell performs synchronization and transmits/receives a primary control signal, and thus if the BWP of the SpCell is dormant or inactive or operated as the dormant BWP, the connection with the gNB is released, so that the SCell should be always maintained in the activated state.
- If a PUCCH is configured in spite of the SCell or the BWP of the SCell, a dormant state or a dormant BWP cannot be configured. The SCell should be in the activated state or use a normal BWP after activating the same since there may be another cell which should transmit a feedback of HARQ ACK/NACK through the PUCCH.
- Due to such a characteristic, the cell inactivity timer (SCellDeactivationTimer) or the BWP hibernation timer may not be applied to the SpCell or the BWP of the SpCell and the SCell or the BWP of the SCell in which the PUCCH is configured, and may be driven only for the other SCells.
- The cell or BWP hibernation timer (SCellHibernationTimer) is prioritized than the cell or BWP inactivity timer (SCellDeactivationTimer). If one value is set as a timer value through the RRC message, the same value may be applied to all cells. In another method, the base station may apply different timer values for SCells or BWPs in consideration of a characteristic of each SCell or BWP.
- If the SCell or BWP is not indicated as being active or dormant through the RRC message, the SCell or BWP may fundamentally operate in the deactivated state initially.

In the disclosure, the uplink may indicate an uplink BWP and the downlink may indicate a downlink BWP. This is because only one activated or hibernated BWP can be operated for each uplink or downlink.

Hereinafter, the disclosure proposes in detail a method of operating the state transition in units of BWPs (bandwidth part-level) proposed in the disclosure to rapidly activate the carrier aggregation and save the battery of the UE.

In the disclosure, the BWP may be configured for each cell in the RRCSetup message, the RRCReconfiguration message, or the RRCResume message as described with reference to FIG. 6. The RRC message may include configuration information for a PCell, a PSCell, or a plurality of SCells and configure a plurality of BWPs for each cell (PCell, PSCell, or SCell). When the plurality of BWPs are configured for each cell, a plurality of BWPs to be used in the downlink of each cell may be configured in the RRC message. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

In a first method of the information configuration method for configuring the BWP of each cell (PCell, PSCell, or SCell), one or a plurality of pieces of the following information is included and a new indicator is introduced in the BWP and thus whether each BWP is a normal BWP (for example, a BWP that can be operated or configured in an activated state or a deactivated state) or a dormant BWP (for example, a BWP that can be operated or configured in a dormant state) may be indicated. For example, whether the BWP is a dormant BWP or not may be indicated through a BWP identifier.

Downlink BWP configuration information of each cell
  Initial downlink BWP configuration information
  A plurality of pieces of BWP configuration information and BWP IDs corresponding to the respective BWPs
  Downlink initial state configuration information of the cell (for example, activated state, dormant state, or deactivated state)
  A BWP ID indicating a first active downlink BWP
  A BWP ID indicating a default BWP
  A BWP indicator indicating a dormant BWP or a 1-bit indicator indicating a dormant BWP for each BWP in the BWP configuration information
  If the first active downlink BWP is configured as the dormant BWP, the first active uplink BWP also should be configured as the dormant BWP.
  BWP inactivity timer configuration and a timer value
  A BWP ID first activated from a dormant BWP
Uplink BWP configuration information of each cell
  Initial uplink BWP configuration information
  A plurality of pieces of BWP configuration information and BWP IDs corresponding to the respective BWPs
  Uplink initial state configuration information of the cell (for example, activated state, dormant state, or deactivated state)
  A BWP ID indicating a first active uplink BWP
  A BWP indicator indicating a dormant BWP or a 1-bit indicator indicating a dormant BWP for each BWP in the BWP configuration information
  If the first active downlink BWP is configured as the dormant BWP, the first active uplink BWP also should be configured as the dormant BWP.
  A BWP ID first activated from a dormant BWP
  SRS-related configuration information may be configured through the following method
  A first embodiment for configuring an SRS
    First SRS configuration information (SRS configuration information for the normal BWP or the BWP which is not the dormant BWP (for example, SRS transmission resources, period, offset, or indicator indicating whether the SRS configuration information is SRS configuration information for the dormant BWP))
    Second SRS configuration information (SRS configuration information for the dormant BWP (for example, SRS transmission resources, period, offset, or indicator indicating whether the SRS configuration information is SRS configuration information for the dormant BWP))

The first SRS configuration information and the second SRS configuration information may be distinguished by an indicator indicating whether the SRS configuration information is SRS configuration information for the dormant BWP. For example, the first and second SRS configuration information may be distinguished by an indicator value or may be distinguished through the case in which the indicator value is configured or not configured or the case in which the indicator exists or does not exist. In another method, a name of the first SRS configuration information and a name of the second SRS configuration may be differently defined to be distinguished from each other.

In the first embodiment, if the dormant BWP (for example, the dormant BWP ID in downlink BWP configuration information) is configured in a serving cell (SCell), the second SRS configuration information may be always configured. Alternatively, if the dormant BWP (for example, the dormant BWP ID in the downlink BWP configuration information) is configured in the serving cell (SCell), the indicator indicating whether the SRS configuration information is SRS configuration information for the dormant BWP is configured to always indicate the SRS configuration information for the dormant BWP. For example, when the dormant BWP ID is configured in the downlink BWP configuration information, the second SRS configuration information should be configured in each piece of the uplink BWP configuration information. For example, when the dormant BWP ID is configured in the downlink BWP configuration information, the second SRS configuration information should be configured in the uplink BWP configuration information for the uplink dormant BWP (the BWP indicated by the dormant BWP ID) or the uplink BWP having the same BWP ID as the downlink dormant BWP. In another method, when the dormant BWP ID is configured in the downlink BWP configuration information in the case of TDD or unpaired spectrum, the second SRS configuration information should be configured in the uplink BWP configuration information for the uplink BWP having a BWP ID which is the same as the uplink dormant BWP (BWP indicated by the dormant BWP ID) or the downlink dormant BWP.

For example, in the first embodiment, when the downlink BWP is switched or activated to a BWP (or a normal BWP), which is not the dormant BWP, for the activated SCell, the UE may apply the first SRS configuration information in the uplink BWP of the activated SCell and transmit an SRS on the basis of SRS transmission resources, period, or offset corresponding to the first SRS configuration information. However, when the downlink BWP is switched or activated to the dormant BWP for the activated SCell, the UE may apply the second SRS configuration information in the uplink BWP of the activated SCell and transmit an SRS on the basis of SRS transmission resources, period, or offset corresponding to the second SRS configuration information. For example, it is possible to improve a power-saving effect of the UE in the dormant BWP by configuring SRS transmission resources configured in the second SRS configuration information for the dormant BWP to be much smaller than SRS transmission resources configured in the first SRS Configuration information for the normal BWP or configuring the SRS transmission resource period configured in the second SRS configuration information for the dormant BWP to be much longer than the SRS transmission resource period configured in the first SRS configuration information for the normal BWP. For example, the SRS transmission period may be configured to be longer than or equal to 100 ms in the second SRS configuration information. In another method, when the downlink BWP is activated to the dormant BWP, if the second SRS configuration information is not configured, the UE may apply the first SRS configuration information to the uplink BWP and transmit an SRS on the basis of SRS transmission resources, period, or offset corresponding to the first SRS configuration information. In another method, when the downlink BWP is activated to the dormant BWP, if the second SRS configuration information is not configured, the UE may not transmit the SRS.

Second embodiment for configuring an SRS

In the second embodiment, the first SRS configuration information and the second SRS configuration information may be included in one SRS configuration information and may be separately configured for SRS configuration information (for example, SRS transmission resources, period, or offset) for the normal BWP or the BWP which is not the dormant BWP and SRS configuration information (for example, SRS transmission resources, period, or offset) for the dormant BWP.

The first SRS configuration information (SRS configuration information for the normal BWP or the BWP which is not the dormant BWP (for example, SRS transmission resource, period, offset, or indicator indicating whether the SRS configuration information is SRS configuration information for the dormant BWP))

The second SRS configuration information (SRS configuration information for the dormant BWP (for example, SRS transmission resource, period, offset, or indicator indicating whether the SRS configuration information is SRS configuration information for the dormant BWP))

In the second embodiment, if the dormant BWP (for example, the dormant BWP ID in downlink BWP configuration information) is configured in a serving cell (SCell), the second SRS configuration information may be always configured. Alternatively, if the dormant BWP (for example, the dormant BWP ID in the downlink BWP configuration information) is configured in the serving cell (SCell), the indicator indicating whether the SRS configuration information is SRS configuration information for the dormant BWP is configured to always indicate the SRS configuration information for the dormant BWP. For example, when the dormant BWP ID is configured in the downlink BWP configuration information, the second SRS configuration information should be configured in each piece of the uplink BWP configuration information. For example, when the dormant BWP ID is configured in the downlink BWP configuration information, the second SRS configuration information should be configured in the uplink BWP configuration information for an uplink BWP (a BWP indicated by the dormant BWP ID) or an uplink BWP having the same BWP ID as the downlink dormant BWP. In another method, if the dormant BWP ID is configured in the downlink BWP configuration information in the case of TDD or unpaired spectrum, the second SRS configuration information should be configured in the uplink BWP configuration information for the uplink BWP having a BWP ID which is the same as the uplink dormant BWP (BWP indicated by the dormant BWP ID) or the downlink dormant BWP.

For example, in the second embodiment, when the downlink BWP is switched or activated to a BWP (or a normal BWP), which is not the dormant BWP, for the activated SCell, the UE may apply the first SRS configuration information in the uplink BWP of the activated SCell and transmit an SRS on the basis of SRS transmission resources, period, or offset corresponding to the first SRS configuration information. However, when the downlink BWP is switched or activated to the dormant BWP for the activated SCell, the UE may apply the second SRS configuration information in the uplink BWP of the activated SCell and transmit an SRS on the basis of SRS transmission resources, period, or offset corresponding to the second SRS configuration information. For example, it is possible to improve a power-saving effect of the UE in the dormant BWP by configuring SRS transmission resources configured in the second SRS configuration information for the dormant BWP to be much smaller than SRS transmission resources configured in the first SRS configuration information for the normal BWP or configuring the SRS transmission resource period configured in the second SRS configuration information for the dormant BWP to be much longer than the SRS transmission resource period configured in the first SRS configuration information for the normal BWP. For example, the SRS transmission period may be configured to be longer than or equal to 100 ms in the second SRS configuration information. In another method, when the downlink BWP is activated to the dormant BWP, if the second SRS configuration information is not configured, the UE may apply the first SRS configuration information to the uplink BWP and transmit an SRS on the basis of SRS transmission resources, period, or offset corresponding to the first SRS configuration information. In another method, when the downlink BWP is activated to the dormant BWP, if the second SRS configuration information is not configured, the UE may not transmit the SRS.

Third embodiment for configuring an SRS

In the third embodiment, the second SRS configuration information, that is, the SRS configuration information for the dormant BWP (for example, the SRS transmission resources, period, or offset), may be configured only the BWP configured as the uplink dormant BWP (BWP indicated by the dormant BWP identifier) in the uplink BWP configuration information. Alternatively, the first SRS configuration information, that is, SRS configuration information for a BWP, which is not a dormant BWP, or a normal BWP (for example, SRS transmission resources, period, or offset) may be configured only for a BWP configured as a BWP (a BWP which is not indicated by a dormant BWP ID), which is not an uplink dormant BWP in the uplink BWP configuration information. In another method, if the dormant BWP ID is configured in the downlink BWP configuration information in the case of TDD or unpaired spectrum, the second SRS configuration information should be configured in the uplink BWP configuration information for the uplink BWP having a BWP ID which is the same as the uplink dormant BWP (BWP indicated by the dormant BWP ID) or the downlink dormant BWP.

For example, in the third embodiment, when the downlink BWP is switched or activated to a BWP (or a normal BWP), which is not the dormant BWP, for the activated SCell, the UE may apply the first SRS configuration information in the uplink BWP of the activated SCell and transmit an SRS on the basis of SRS transmission resources, period, or offset corresponding to the first SRS configuration information. However, when the downlink BWP is switched or activated to the dormant BWP for the activated SCell, the UE may apply the second SRS configuration information in the uplink BWP of the activated SCell and transmit an SRS on the basis of SRS transmission resources, period, or offset corresponding to the second SRS configuration information. For example, it is possible to improve a power-saving effect of the UE in the dormant BWP by configuring SRS transmission resources configured in the second SRS configuration information for the dormant BWP to be much smaller than SRS transmission resources configured in the first SRS Configuration information for the normal BWP or configuring the SRS transmission resource period configured in the second SRS configuration information for the dormant BWP to be much longer than the SRS transmission resource period configured in the first SRS configuration information for the normal BWP. For example, the SRS transmission period may be configured to be longer than or equal to 100 ms in the second SRS configuration information. In another method, when the downlink BWP is activated to the dormant BWP, if the second SRS configuration information is not configured, the UE may apply the first SRS configuration information to the uplink BWP and transmit an SRS on the basis of SRS transmission resources, period, or offset corresponding to the first SRS configuration information. In another method, when the downlink BWP is activated to the dormant BWP, if the second SRS configuration information is not configured, the UE may not transmit the SRS.

As another method of the information configuration method of configuring the BWP of each cell (PCell, PSCell, or SCell), a second method may separate configuration information by not configuring configuration information (for example, a search space, PDCCH transmission resources, and periodicity) required to read a PDCCH for a BWP corresponding to a dormant BWP may not be configured (in another method, periodicity may be configured to be very long along with other configuration information) and configuring configuration information (for example, a search space, PDCCH transmission resources, and periodicity) required to read a PDCCH for a normal BWP. This is because the dormant BWP is a BWP to reduce battery consumption of the UE by not reading the PDCCH and may perform channel measurement and reporting a channel measurement result to the PCell so as to rapidly activate the BWP or the cell, thereby promptly allocating uplink or downlink transmission resources. Accordingly, in the disclosure, the dormant BWP may be a BWP in which configuration information (for example, a search space, PDCCH transmission resources, and periodicity) for PDCCH monitoring is not configured or indicate a BWP indicated by a dormant BWP identifier or a BWP configured to be monitored with very long periodicity even though configuration information for PDCCH monitoring is configured therein.

In another method, in the disclosure, the dormant BWP may a BWP in which PDCCH transmission resources and periodicity are not configured in configuration information for PDCCH monitoring and thus the PDCCH monitoring is not performed in the cell in which the dormant BWP is configured but search space information or cross-carrier scheduling configuration information is configured and thus switching or an indication for the dormant BWP is received in another cell through cross-carrier scheduling. Since data transmission/reception is not possible in the dormant BWP, only PDCCH configuration information (PDCCH-config) is configured for the dormant BWP (or a first BWP) (for example, only search space information is configured). On the other hand, PDCCH monitoring should be performed in a normal BWP (or a second BWP) which is not the dormant BWP and also data transmission/reception should be possible, and thus PDCCH configuration information (for example, CORESET configuration information, search space configuration information, PDCCH transmission resources, or period) and PDSCH configuration information, PUSCH configuration information, or random access-related configuration information may be further configured.

Accordingly, as described above, the uplink or downlink normal BWP should be configured for each cell, but the dormant BWP may be or may not be configured for each cell, and the configuration thereof may be handled by gNB implementation according to the purpose thereof. Further, a first active BWP, a default BWP, or an initial BWP may be configured as the dormant BWP according to gNB implementation.

In the dormant BWP, the UE cannot exchange data with the gNB, does not monitor a PDCCH to identify an indication of the gNB, does not transmit a pilot signal, but measures a channel, and reports a measurement result for the measured frequency/cell/channel periodically or when an event is generated according to a configuration of the gNB. Accordingly, the UE does not monitor the PDCCH and not transmit the pilot signal in the dormant BWP, thereby reducing a battery compared to the active mode. Unlike the deactivated mode, the UE transmits a channel measurement report, so that the gNB may rapidly activate the cell in which the dormant BWP is configured on the basis of the measurement report of the dormant BWP to use carrier aggregation. In the disclosure, the dormant BWP may be configured in the downlink BWP configuration information and used only for the downlink BWP.

In the disclosure, the UE operation for the dormant BWP or the UE operation for the activated SCell when the dormant BWP is activated is described below.

When the UE receives an indication indicating operation as or activation to a dormant BWP for a serving cell (PCell or SCell) from the PCell or the SpCell, receives an indication indicating hibernating a BWP (for example, a downlink BWP) of a serving cell (for example, SCell) or the serving cell (for example, SCell) or an indication indicating activation of a dormant BWP through PDCCH DCI (L1 control signal), a MAC CE, or an RRC message, receives an indication indicating switching of a BWP (for example, a downlink BWP) to a dormant BWP through PDCCH DCI (L1 control signal), a MAC CE, or an RRC message (when the indication is received through PDCCH L1 control signal, the indication may be received by the PDCCH of its own cell through self-scheduling or received by the PDCCH of the PCell through cross-carrier scheduling), a BWP hibernation timer is configured and expires, an activated BWP of the activated SCell is a dormant BWP, or the activated BWP of the activated SCell is not a normal BWP, one or a plurality of operations among the following operations may be performed.

The uplink BWP or the downlink BWP is switched to the BWP (for example, the dormant BWP) configured in RRC and the BWP is activated or hibernated.

The cell inactivity timer configured or driven in the cell or BWP is stopped.

A BWP hibernation timer is stopped when the BWP hibernation timer is configured in the BWP of the cell.

A dormant BWP inactivity timer starts or restarts in the BWP of the cell.

A BWP inactivity timer configured for the BWP of the cell is stopped. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed and is not used any more. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the active state to the dormant state. This is because there is no information on periodic transmission resources activated or indicated through L1 signaling when the BWP is transitioned from the deactivated state to the dormant state. In another method, the periodic transmission resources may be released only when the periodic downlink transmission resources or the periodic uplink transmission resources are configured or when the transmission resources are configured and used.

The periodic uplink transmission resources (configured uplink grant type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant Type 1), may be performed only when the BWP transitions from the active state to the dormant state. This is because periodic transmission resources are not used when the BWP is transitioned from the deactivated state to the dormant state. In another method, when the periodic downlink transmission resources or the periodic uplink transmission resources are configured, or when the resources are configured and used, the periodic transmission resources can be released.

All HARQ buffers configured in the uplink or downlink BWP are all emptied.

The UE does not transmit an SRS for the uplink BWP of the cell.

In another method, when the first SRS configuration information (SRS configuration information (for example, SRS transmission resources, period, or offset) for a normal BWP (a BWP which is not a dormant BWP)) or the second SRS configuration information (SRS configuration information (for example, SRS transmission resources, period, or offset) for a dormant BWP) is configured in the uplink BWP configuration information, the UE may transmit an SRS in order to facilitate power control or scheduling of the network or rapidly re-activate the uplink BWP of the UE. For example, when the downlink BWP is switched or activated to a BWP (or a normal BWP), which is not the dormant BWP, for the activated SCell (when the activated BWP is not the dormant BWP), the UE may apply the first SRS configuration information in the uplink BWP of the activated SCell and transmit an SRS on the basis of SRS transmission resources, period, or offset corresponding to the first SRS configuration information. However, when the downlink BWP is switched or activated to the dormant BWP for the activated SCell (when the activated BWP is the dormant BWP), the UE may apply the second SRS configuration information in the uplink BWP of the activated SCell and transmit an SRS on the basis of SRS transmission resources, period, or offset corresponding to the second SRS configuration information. For example, it is possible to improve a power-saving effect of the UE in the dormant BWP by configuring SRS transmission resources configured in the second SRS configuration information for the dormant BWP to be much smaller than SRS transmission resources configured in the first SRS configuration information for the normal BWP or configuring the SRS transmission resource period configured in the second SRS configuration information for the dormant BWP to be much longer than the SRS transmission resource period configured in the first SRS configuration information for the normal BWP. For example, the SRS transmission period may be configured to be longer than or equal to 100 ms in the second SRS configuration information. In another method, when the downlink BWP is activated to the dormant BWP, if the second SRS configuration information is not configured, the UE may apply the first SRS configuration information to the uplink BWP and transmit an SRS on the basis of SRS transmission resources, period, or offset corresponding to the first SRS configuration information. In another method, when the downlink BWP is activated to the dormant BWP, if the second SRS configuration information is not configured, the UE may not transmit the SRS.

In another method, when the downlink BWP is switched or activated to the downlink dormant BWP for the activated SCell (when the activated BWP is the dormant BWP), the UE may switch or activate the uplink BWP to the uplink dormant BWP. The uplink dormant BWP may be indicated by a BWP ID in the uplink BWP configuration information configured in the RRC message (for example, in the case of FDD, unpaired spectrum, or TDD), or an uplink BWP having the same BWP ID as the downlink dormant BWP may be the dormant BWP (for example, in the case of unpaired spectrum or TDD) in another method. The UE may apply the second SRS configuration information configured in the uplink dormant BWP and transmit an SRS on the basis of SRS transmission resources, period, or offset corresponding to the second SRS configuration information.

In another method, the current uplink BWP or the last activated uplink BWP may be activated.

In the BWP of the cell, the UE performs channel measurement (channel state information (CSI), channel quality indicator (CQI), precoding matrix indicator (PMI), rank indicator (RI), precoding type indicator (PTI), CSI-RS resource indicator (CSI), or the like) and transmits a measurement report according to a configuration of the gNB for the downlink. For example, the UE may periodically report the channel or frequency measurement.

Uplink data is not transmitted through a UL-SCH in the BWP of the cell.

A random access procedure is not performed for the BWP of the cell.

The UE does not monitor a PDCCH in the BWP of the cell.

The UE does not monitor a PDCCH for the BWP of the cell. However, in the case of cross-scheduling, an indication may be received by monitoring a PDCCH for the cell (for example, SCell) in the scheduled cell (for example, PCell).

PUCCH or SPUCCH transmission is not performed in the BWP of the cell.

The downlink BWP may be hibernated, and channel measurement may be performed and reported. Further, the uplink BWP of the cell may be deactivated and not used. This is because the channel is measured only for the downlink BWP in the dormant state SCell and the measurement result is reported to the uplink BWP of the SpCell (PCell or PSCell) or the SCell in which there is a PUCCH.

If an indication indicating activation or switching to the dormant BWP for the downlink is made or an indication indicating hibernation of the BWP is made, a random access procedure is performed without cancelling the same. This is because a preamble is transmitted through the uplink and a random access response is received through the downlink of the PCell when the random access procedure is performed in the SCell. Accordingly, even though the downlink BWP is hibernated or switched to the dormant BWP, any problem does not occur.

In the disclosure, the UE operation when the normal BWP (active bandwidth part (BWP) of the activated SCell is activated or when a BWP which is not the dormant BWP is activated is described below.

If an indication indicating activation of a normal BWP (for example, a downlink BWP) of the current cell (PCell or SCell) or a normal BWP which is not a dormant BWP or an indication indicating activation of the cell is received through DCI (L1 control signal) of a PDCCH, a MAC CE, or an RRC message, if an indication indicating switching of a BWP (for example, a downlink BWP) to an active BWP (or a BWP which is not the dormant BWP) is received through DCI (L1 control signal) of a PDCCH, a MAC CE, or an RRC message, if the activated BWP of the current activated cell is a normal BWP, or if the activated BWP of the current activated cell is not a dormant BWP (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

Switching and activation to the indicated uplink or downlink BWP is performed. Alternatively, the uplink or downlink BWP is switched to a predetermined BWP (for example, an uplink or uplink first active BWP), and the BWP is activated.

A sounding reference signal (SRS) is transmitted to allow the gNB to measure a channel for the uplink in the activated BWP. For example, the SRS may be periodically transmitted.

In another method, when the first SRS configuration information (SRS configuration information (for example, SRS transmission resources, period, or offset) for a normal BWP (a BWP which is not a dormant BWP)) or the second SRS configuration information (SRS configuration information (for example, SRS transmission resources, period, or offset) for a dormant BWP) is configured in the uplink BWP configuration information, the UE may transmit an SRS in order to facilitate power control or scheduling of the network or rapidly re-activate the uplink BWP of the UE. For example, when the downlink BWP is switched or activated to a BWP (or a normal BWP), which is not the dormant BWP, for the activated SCell (when the first active BWP is not the dormant BWP), the UE may apply the first SRS configuration information in the uplink BWP of the activated SCell and transmit an SRS on the basis of SRS transmission resources, period, or offset corresponding to the first SRS configuration information. However, when the downlink BWP is switched or activated to the dormant BWP for the activated SCell (when the first active BWP is the dormant BWP), the UE may apply the second SRS configuration information in the uplink BWP of the activated SCell and transmit an SRS on the basis of SRS transmission resources, period, or offset corresponding to the second SRS configuration information. For example, it is possible to improve a power-saving effect of the UE in the dormant BWP by configuring SRS transmission resources configured in the second SRS configuration information for the dormant BWP to be much smaller than SRS transmission resources configured in the first SRS configuration information for the normal BWP or configuring the SRS transmission resource period configured in the second SRS configuration information for the dormant BWP to be much longer than the SRS transmission resource period configured in the first SRS configuration information for the normal BWP. For example, the SRS transmission period may be configured to be greater than or equal to 100 ms in the second SRS configuration information. In another method, when the downlink BWP is activated to the dormant BWP, if the second SRS configuration information is not configured, the UE may apply the first SRS configuration information to the uplink BWP and transmit an SRS on the basis of SRS transmission resources, period, or offset corresponding to the first SRS configuration information. In another method, when the downlink BWP is activated to the dormant BWP, if the second SRS configuration information is not configured, the UE may not transmit the SRS.

In another method, when the downlink BWP is switched or activated to a BWP, which is not the downlink dormant BWP, or the normal BWP for the activated SCell (when the first active BWP is the dormant BWP), the UE may switch or activate the uplink BWP to the BWP first activated from the dormant state configured in RRC. The uplink first active BWP from dormant may be indicated by a BWP ID in uplink BWP configuration information configured by the RRC message (for example, in the case of FDD, unpaired spectrum, or TDD) or an uplink BWP ID having the same BWP ID as the downlink BWP may be the dormant BWP in another method (for example, in the case of unpaired spectrum or TDD). The UE may apply the first SRS configuration information configured in the BWP first activated from the dormant state and transmit an SRS on the basis of SRS transmission resources, period, or offset corresponding to the first SRS configuration information.

In another method, the current uplink BWP or the last activated uplink BWP may be activated.

In another method, if the first active downlink BWP is not the dormant BWP,
   if when the SCell is in the inactive state before MAC control information indicating SCell activation or deactivation is received or when the SCell is configured as the active state in SCell configuration or configuration information by the RRC message, the uplink BWP or the downlink BWP may be activated to a BWP indicated by a first active uplink BWP ID or a first active downlink BWP ID in RRC configuration information.

In another method, if the first active downlink BWP is the dormant BWP,
   a BWP inactivity timer may be stopped.
   if when the SCell is in the inactive state before MAC control information indicating SCell activation or deactivation is received or when the SCell is configured as the active state in SCell configuration or configuration information by the RRC message, the uplink BWP or the downlink BWP may be activated to a BWP indicated by a first active uplink BWP ID (or dormant BWP ID) or a first active downlink BWP ID (or dormant BWP ID) in RRC configuration information. For example, when the first active downlink BWP is configured as the dormant BWP, the first active uplink BWP also should be configured as the dormant BWP.

In another method, the downlink BWP may be activated to the BWP indicated by the first active downlink BWP ID (or dormant BWP ID) in RRC configuration information. The uplink BWP may be activated to the BWP indicated by the dormant BWP ID (or first active uplink BWP ID) in RRC configuration information.

If a PUCCH is configured in the activated BWP, the PUCCH is transmitted.

The BWP or cell inactivity timer starts or restarts. In another method, the BWP or cell inactivity timer may start or restart only when a BWP or cell hibernation timer is not configured. If the BWP or cell hibernation timer can be configured through the RRC message, the BWP or the cell may be hibernated when the timer expires. For example, the BWP or cell inactivity timer may start or restart only in the hibernated BWP or cell.

If there are suspended type 1 configuration transmission resources, stored type 1 transmission resources may be initialed as original and used. The type 1 configuration transmission resources are periodic (uplink or downlink) transmission resources pre-allocated through an RRC message, which can be used after being activated through the RRC message.

A PHR for the BWP is triggered.

The UE may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross scheduling in the activated BWP.

The BWP deactivation timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If a link BWP hibernation timer is configured for the BWP,
   the BWP hibernation timer may start or restart for the BWP.

In the disclosure, the UE operation when an inactive BWP (active bandwidth part (BWP)), a BWP, or an SCell is deactivated is described below.

If an indication indicating deactivation of a BWP (for example, a downlink BWP) of the current cell (PCell or SCell) is received through DCI (L1 control signal) of a PDCCH, a MAC CE, or an RRC message, if an indication indicating deactivation of a BWP (for example, a downlink BWP) or an indication indicating switching to an inactive BWP is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), if the BWP or cell deactivation timer expires in the cell, if the activated SCell is deactivated, or if the BWP of the SCell is deactivated, one or a plurality of operations of the following operations may be performed.

The cell or the indicated uplink or downlink BWP is deactivated.

The UE stops the BWP inactivity timer (for example, an inactivity timer for the downlink BWP) configured and run in the cell or the BWP.

Periodic downlink transmission resources (DL SPS or configured downlink assignment) or periodic uplink transmission resources (UL SPS or configured uplink grant type 2) configured in the cell or BPW may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The periodic transmission resources may be called type 2 configuration transmission resources. The operation of releasing the periodic transmission resources may be performed only when the SCell transitions from the activated state to the deactivated state. This is because the releasing (clearing) operation is not needed when the transition is made from the dormant state to the deactivated state because there are no periodic transmission resources in the dormant state. In another method, the periodic transmission resources may be released only when the periodic downlink transmission resources or the periodic uplink transmission resources are configured or when the transmission resources are configured and used.

The periodic uplink transmission resources (configured uplink grant type 1 configured through RRC) configured in the cell or BWP may be suspended. The term "suspend" means that transmission resource configuration information configured through the RRC message is stored in the UE but is not used anymore. The periodic transmission resources may be called type 1 configuration transmission resources. The operation of releasing the periodic transmission resources may be performed only when the SCell transitions from the activated state to the deactivated state. This is because the releasing (clearing) operation is not needed when the transition is made from the dormant state to the deactivated state because there are no periodic transmission resources in the dormant state. In another method, when the periodic downlink transmission resources or the periodic uplink transmission resources are configured, or when the resources are configured and used, the periodic transmission resources can be released.

All HARQ buffers configured for the cell or BWP are emptied.

The periodic transmission resources are released (cleared) if there are PUSCH transmission resources configured for a periodic channel measurement report (semi-persistent CSI reporting) for the cell or BWP.

The UE does not transmit an SRS for the cell or BWP.

The UE neither measures a channel (CSI, CQI, PMI, RI, PTI, or CRI) for the downlink nor reports the channel measurement for the cell or BWP.

The UE does not transmit uplink data through a UL-SCH in the cell or BWP.

A random access procedure is not performed for the cell or BWP.

The UE does not monitor a PDCCH in the cell or BWP.

The UE does not monitor a PDCCH for the cell or BWP. Further, in the case of cross-scheduling, a PDCCH for the cell is not monitored in the scheduled cell.

A PUCCH or SPUCCH is not transmitted in the cell or BWP.

In the disclosure, the active state, the inactive state, or the dormant state are operated and cell or BWP transition or switching is performed in units of BWPs. When state transition or switching is performed in units of BWPs, a BWP indicated to have state transition or switching (a downlink BWP or an uplink BWP) is transitioned or switched according to an indication of state transition or switching. For example, if a BWP (a downlink or uplink BWP) is transitioned from an active state to a dormant state or switched (or activated) to a dormant BWP, the BWP may be transitioned to the dormant state or switched (or activated) to the dormant BWP.

In the disclosure, BWP switching means that, if BWP switching is indicated with a BWP identifier through PDCCH DCI while downlink assignment is allocated, the downlink BWP is switched to a BWP indicated by the BWP identifier, and if BWP switching is indicated with a BWP identifier through PDCCH DCI while a UL grant is allocated, the uplink BWP is switched to a BWP indicated by the BWP identifier. The UE operation follows a DCI format although description for the uplink and the downlink is not separated since PDCCH DCI formats are different for the downlink assignment (format1) and the UL grant (format0).

The method of operating the state transition in units of BWPs (BWP levels) and the operation of the BWP according to each state proposed in the disclosure may be expanded and applied to various embodiments. Hereinafter, the disclosure describes detailed embodiments for expanding and applying the content proposed in the disclosure.

Figure 8:
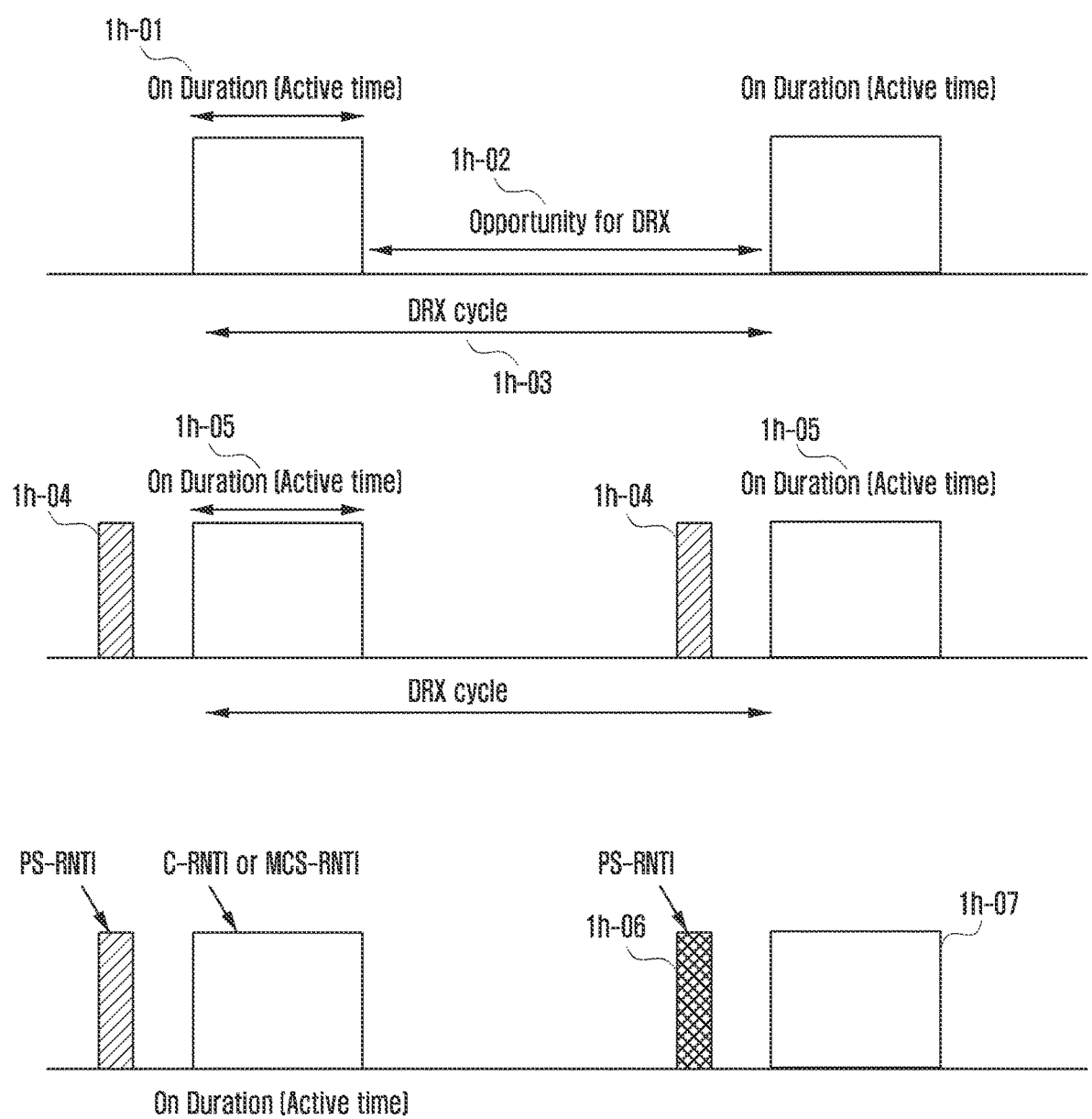
FIG. 8 illustrates a method of configuring DRX or operating DRX for reducing a battery of the UE proposed in the disclosure.

FIG. 8 illustrates a method of configuring DRX or operating DRX to reduce a battery of the UE proposed in the disclosure.

In FIG. 8, the gNB may configure a DRX function such as a DRX cycle, a start point, an offset, or on-duration (active time) in the PCell, the SCell, or the PSCell for the UE through the RRC message as illustrated in FIG. 6. The disclosure considers configuration of the DRX function in the PCell, SpCell, or the PSCell.

As described above, when the DRX function is configured in the PCell (SpCell or PSCell), the UE may consider a DRX cycle 1h-03, a DRX start time, or an offset to apply the DRX function. When the DRX function is applied, the UE may monitor a PDCCH or DCI of the PDCCH which can be received from the gNB in the PCell only within the active time 1h-01 (on-duration) of the DRX. Further, the UE does not need to monitor the PDCCH or the DCI of the PDCCH outside the active time 1h-02 of the DRX function, thereby reducing UE battery consumption.

In FIG. 6, the gNB may configure a power saving function (power saving mode) in the UE through the RRC message in order to further reduce battery consumption of the UE. When the power saving function is configured along with the DRX function, the PDCCH is monitored outside the active time during a short time interval 1h-04 configured through RRC before the active time 1h-01 in which the UE should monitor the PDCCH, and a wake up signal (WUS) is monitored and received outside the active time. The gNB may indicate whether the UE should monitor the PDCCH or not in the next active time 1h-05 or 1h-07 through a bit of the DCI of the PDCCH of the WUS.

That is, the UE in which the power saving function or the DRX function is configured may monitor the WUS during the short time interval 1h-04 configured in the RRC message before the active time 1h-05. If a bit value of the DCI of the PDCCH for the next active time 1h-05 or 1h-07 is 0 (or 1) in the WUS, it may indicate that the UE does not monitor the PDCCH within the next active time 1h-07 or indicate that the UE does not monitor the PDCCH by not driving a timer corresponding to the next active time in the MAC layer device. If the bit value of the DCI of the PDCCH for the next active time 1h-05 or 1h-07 is 1 (or 0) in the received WUS, it may indicate that the UE monitors the PDCCH within the next active time 1h-05 or may indicate that the UE monitors the PDCCH by running a timer corresponding to the next active time in the MAC layer device.

Further, the UE may not monitor the WUS or the PDCCH for searching for the WUS within the active time.

When monitoring the WUS during the short time interval 1h-04 configured in the RRC message before the every active time 1h-05, the UE in which the power saving function or the DRX function is configured may search for a signal by identifying the PDCCH through a first RNTI (for example, a PS-RNTI). The first RNTI (for example, the PS-RNTI) may be configured in a plurality of UEs, and the base station may indicate simultaneously whether to monitor the PDCCH within the next active time to the plurality of UEs through the first RNTI (for example, PS-RNTI).

When monitoring and detecting the PDCCH in the active time 1h-05, the UE in which the power-saving function or the DRX function is configured may detect a signal on the basis of a second RNTI (for example, a C-RNTI), a third RNTI (for example, an MCS-C-RNTI), or a fourth RNTI (SPS-C-RNTI or CS-RNTI) uniquely configured in the UE through the RRC message. The second RNTI (for example, C-RNTI) may be used to indicate general UE scheduling, the third RNTI (for example, MCS-C-RNTI) may be used to indicate a modulation and coding scheme of the UE, and the fourth RNTI (SPS-C-RNTI or CS-RNTI) may be used to indicate periodic transmission resources of the UE.

Figure 9:
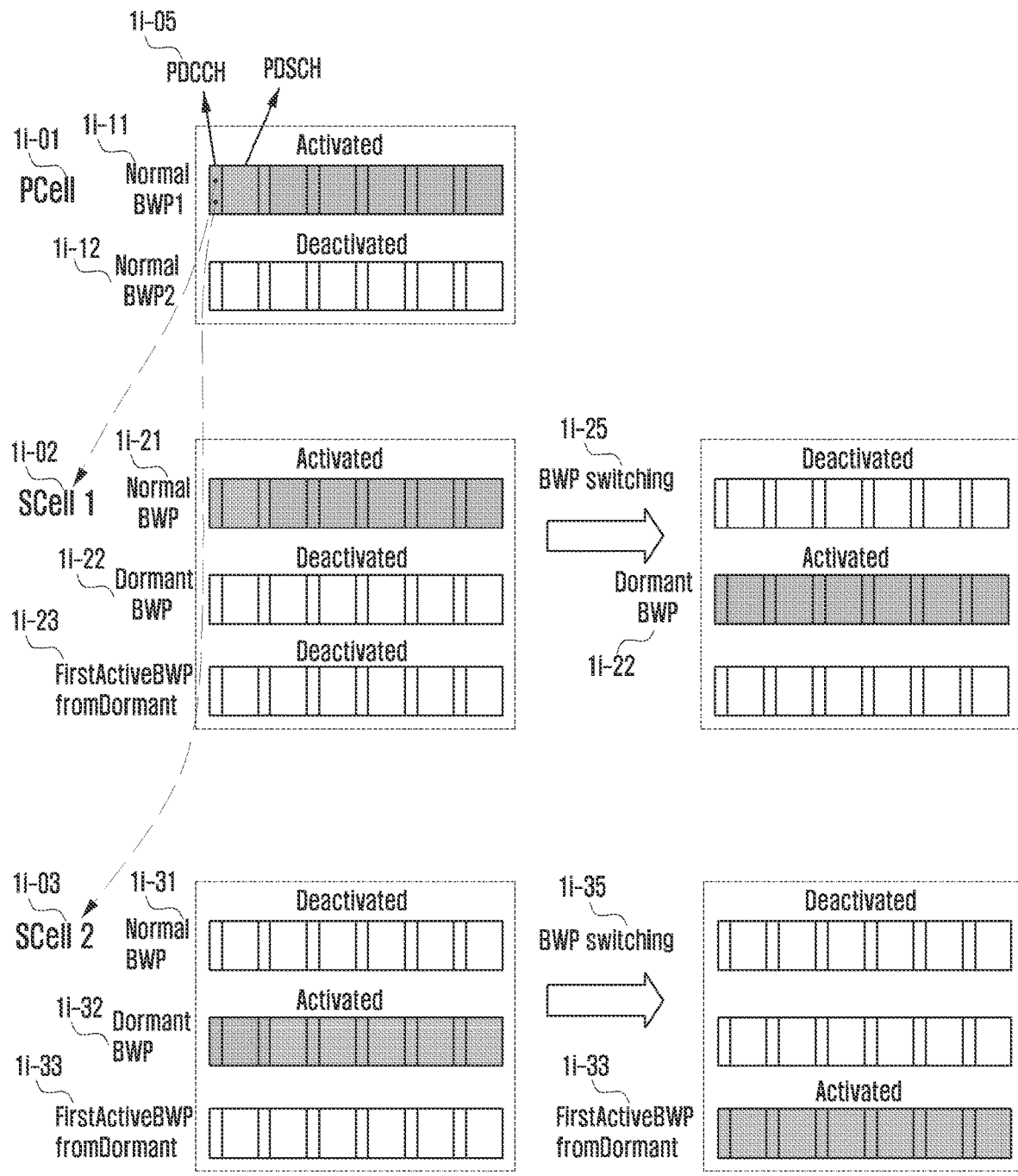
FIG. 9 illustrates the concept of a method of operating a dormant BWP in an activated SCell proposed in the disclosure.

FIG. 9 illustrates the concept of a method of operating a dormant BWP in an activated SCell proposed in the disclosure.

The gNB may configure a plurality of SCells in the UE for carrier aggregation through the RRC message, allocate each SCell identifier, and configure a dormant BWP for each SCell as illustrated in FIG. 6. Further, the plurality of SCells may be included in each SCell, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value).

In FIG. 9, the gNB may define a new bitmap for PDCCH DCI transmitted in the PCell, map bit values such that each bit value of the bitmap indicates each SCell identifier value or each SCell group identifier value, and define each bit value to indicate whether to switch the SCell corresponding to the bit or SCells belonging to the SCell group to a dormant BWP or activate the dormant BWP. Further, the gNB may indicate whether to switch the SCell corresponding to the bit or SCells belonging to the SCell group from a dormant BWP to a normal BWP (for example, a first active BWP activated from a dormant state) or activate the normal BWP (for example, first active BWP activated from a dormant state).

In FIG. 9, the UE may receive PDCCH DCI in a PCell 1i-01, read the DCI, and then identify whether there is a bitmap including an indication for BWPs of SCells or SCell groups (for example, switching or activation to the dormant BWP or switching or activation to the normal BWP) and, if there is the bitmap, switch or activate the BWP according to the bit value for the SCell indicated by each bit of the bitmap or SCells 1i-02 and 1i-03 belonging to the SCell group. For example, if the bit of the bitmap indicates the first SCell 1i-02 (or a first SCell identifier) or an SCell group including the first SCell (or an SCell group identifier) including the first SCell and the bit value is 0 (or 1), the UE may activate a BWP 1i-21 to a dormant BWP 1i-22 for the first SCell 1i-02 and switch the current BWP to the dormant BWP 1i-22 or, if the current BWP is not a dormant BWP, switch or activate the currently activated BWP 1i-21 to the dormant BWP 1i-22 as indicated by reference numeral 1i-25.

In FIG. 9, the UE may receive PDCCH DCI in a PCell 1i-01, read the DCI, and then identify whether there is a bitmap including an indication for BWPs of SCells or SCell groups (for example, switching or activation to the dormant BWP or switching or activation to the normal BWP) and, if there is the bitmap, switch or activate the BWP according to the bit value for the SCell indicated by each bit of the bitmap or SCells 1i-02 and 1i-03 belonging to the SCell group. For example, when the bit of the bitmap indicates the second SCell 1i-03 (or a second SCell identifier) or an SCell group (or an SCell group identifier) including the second SCell, and the bit value is 1 (or 0), the UE may switch or activate a BWP of the second SCell 1i-03 to a BWP configured through an RRC message (for example, a first active BWP 1i-33 activated from a dormant state) as indicated by reference numeral 1i-35 if the current activated BWP for the second SCell 1i-03 is a dormant BWP 1i-32, the current activated BWP is not a normal BWP, or the current BWP (or cell) is activated and is activated to the dormant BWP 1i-32 (or activated to a BWP which is not the normal BWP). When the bit value is 1 (or 0) and thus an SCell or SCells belonging to an SCell group indicated by the bit should be switched or activated to a dormant BWP, the SCell or SCells belonging to the SCell group may not apply the bit value, may ignore the bit value, or may not read the bit value if the state of the SCell is in a deactivated state or the state of the SCell is in an activated state and an activated BWP is not a dormant BWP (or is a normal BWP).

Figure 10:
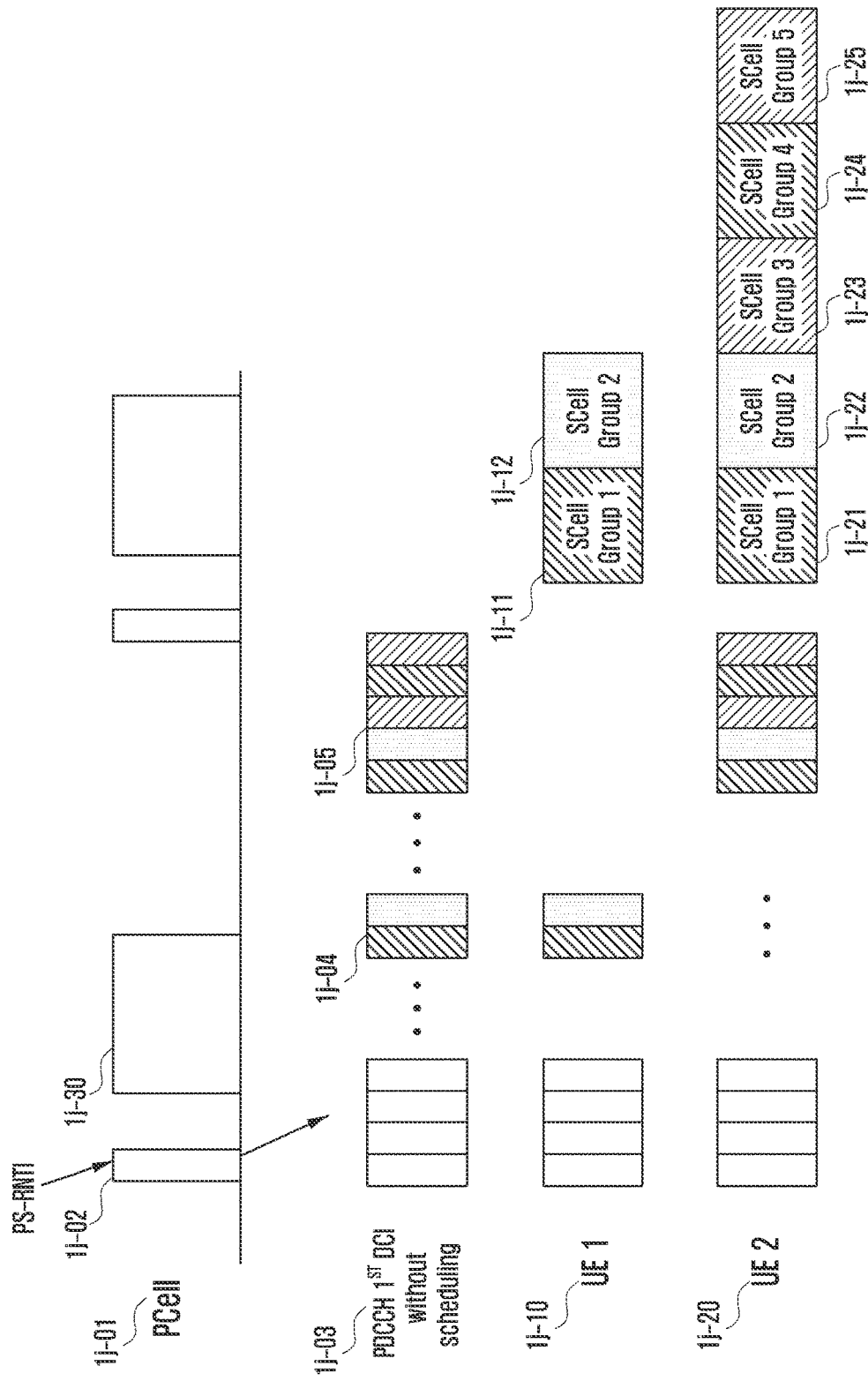
FIG. 10 illustrates a first embodiment obtained by concretizing the concept of the method of operating the dormant BWP in the activated SCell described with reference to FIG. 9 of the disclosure.

FIG. 10 illustrates a first embodiment obtained by concretizing the concept of the method of operating the dormant BWP in the activated SCell described with reference to FIG. 9 of the disclosure.

In the first embodiment, the gNB may configure a plurality of SCells in the UE for carrier aggregation through the RRC message as described in FIG. 6, allocate each SCell, configure a dormant BWP for each SCell, and may not configure a dormant BWP for some SCells. Further, the plurality of SCells may be included in each SCell, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value). SCell groups or SCell group identifier configured for the first embodiment of the disclosure or for applying the same may be referred to as first SCell groups. The first SCell groups may indicate group identifiers to which the operation indicated by a DCI bitmap value received after monitoring of PDCCH DCI by the UE within a short time (out of active time) or a time outside an active time is applied in the first embodiment.

In FIG. 10, the gNB may configure a power saving function or a DRX function in each of a plurality of UEs through the RRC message as illustrated in FIG. 6. The gNB may configure time information of a short time 1*j*-02 within which a first DCI format or a WUS should be found before an active time 1*j*-30 of a DRX cycle in the PCell or SpCell or configuration information of the first DCI format in each UE through the RRC message, and may configure the location of a bitmap including an indication for first SCell groups of each UE in the first DCI format through the RRC message when the UE found the first DCI format within the short time 1*j*-02 in the PCell or SpCell. Further, the base station may configure a search space of PDCCH monitoring or a UE identifier (for example, PS-RNTI) for searching for the first DCI format during the short time 1*j*-02 in the UE through the RRC message. When the SCell is switched or activated to the dormant BWP, the UE does not monitor PDCCH DCI, and thus it is very inefficient for the UE to receive the PDCCH DCI or bitmap proposed in the disclosure in the SCell instead of the PCell or SpCell. Accordingly, the disclosure proposes monitoring of the PDCCH DCI proposed in the disclosure in the PCell or SpCell.

For example, as described above, the gNB may configure the power saving function or the DRX function in a plurality of UEs and transmit the first DCI format through PDCCH transmission resources within the short time 1*j*-02 configured before the next active time 1*j*-30 of the DRX cycle configured in the UEs as indicated by reference numeral 1*j*-03. The first DCI format may include bitmaps 1*j*-04 and 1*j*-05 including indication information for dormant BWPs of the first SCell groups configured in each of the plurality of UEs.

A first UE 1*j*-10 applying information configured through the RRC message may monitor the PDCCH on the basis of the PS-RNTI which is an identifier within the short time 1*j*-02 configured before the next active time 1*j*-30 of the DRX cycle and search for the first DCI format from the base station in the search space as indicated by reference numeral 1*j*-03. If the first DCI format 1*j*-03 is detected, the first UE may read the bitmap 1*j*-04 including indication information for the dormant BWPs of the first SCell groups of the first UE through time information or location information configured through the RRC message in the first DCI format 1*j*-03. The length of the bitmap may be configured to be the same as the number of first SCell groups configured in the first UE or maximally configured to a predetermined number (for example, 5). Further, each bit value of the bitmap may be mapped to or indicated by each first SCell group in an ascending order of SCell group identifier values of the first SCell groups configured in the first UE from the right bit (for example, from the least significant bit (LSB)) of the bitmap. In another method, each bit value of the bitmap may be mapped to or indicated by each first SCell group in a descending order of SCell group identifier values of the first SCell groups configured in the first UE from the right bit (for example, from the least significant bit (LSB)) of the bitmap. In another method, each bit value of the bitmap may be mapped to or indicated by each first SCell group in an ascending order of SCell group identifier values of the first SCell groups configured in the first UE from the left bit (for example, from the most significant bit (MSB)) of the bitmap. In another method, each bit value of the bitmap may be mapped to or indicated by each first SCell group in a descending order of SCell group identifier values of the first SCell groups configured in the first UE from the left bit (for example, from the most significant bit (MSB)) of the bitmap.

When bit values of the bitmaps 1*j*-11 and 1*j*-12 are 0, the bit value of 0 may indicate switching to a dormant BWP or activation of a dormant BWP for each activated SCell among SCells belonging to the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells belonging to the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells belonging to the first SCell group corresponding to the bit. In another method, when the bit value of the bitmap is 1, the bit value of 1 may indicate switching to the normal BWP (for example, the first active BWP that is activated from the dormant state) or activation to the normal BWP (for example, the first active BWP that is activated from the dormant state) if the current or activated BWP for each activated SCell among SCells belonging to the first SCell group corresponding to the bit is a dormant BWP (or is not a normal BWP). Otherwise (if the current or activated BWP for each activated SCell among SCells belonging to the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

A second UE 1*j*-20 applying information configured through the RRC message may monitor the PDCCH on the basis of the PS-RNTI which is an identifier within the short time 1*j*-02 configured before the next active time 1*j*-30 of the DRX cycle and detect the first DCI format from the base station in the search space as indicated by reference numeral 1*j*-03. If the first DCI format 1*j*-03 is detected, the second UE may read the bitmap 1*j*-05 including indication information for the dormant BWPs of the first SCell groups of the second UE through time information or location information configured through the RRC message in the first DCI format 1*j*-03. The length of the bitmap may be configured to be the same as the number of first SCell groups configured in the second UE or maximally configured to a predetermined number (for example, 5). Further, each bit value of the bitmap may be mapped to or indicated by each first SCell group in an ascending order of SCell group identifier values of the first SCell groups configured in the second UE from the right bit (for example, from the least significant bit (LSB)) of the bitmap. In another method, each bit value of the bitmap may be mapped to or indicated by each first SCell group in a descending order of SCell group identifier values of the first SCell groups configured in the second UE from the right bit (for example, from the least significant bit (LSB)) of the bitmap. In another method, each bit value of the bitmap may be mapped to or indicated by each first SCell group in an ascending order of SCell group identifier values of the first SCell groups configured in the second UE from the left bit (for example, from the most significant bit (MSB)) of the bitmap. In another method, each bit value of the bitmap may be mapped to or indicated by each first SCell group in a descending order of SCell group identifier values of the first SCell groups configured in the second UE from the left bit (for example, from the most significant bit (MSB)) of the bitmap.

When bit values of the bitmaps 1*j*-21, 1*j*-22, 1*j*-23, 1*j*-24, and 1*j*-25 are 0, the bit value of 0 may indicate switching to a dormant BWP or activation of a dormant BWP for each activated SCell among SCells belonging to the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells belonging to the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells belonging to the first SCell group corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell among SCells belonging to the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

Embodiment 1 of the disclosure is realized as described above, and the first DCI format of the PDCCH proposed by embodiment 1 may be used within the short time and is not accompanied by downlink transmission resources (for example, PDSCH) or uplink transmission resources (for example, PUSCH) for the UE. Accordingly, the UE may receive the first DCI format of the PDCCH and may not transmit ACK or NACK information (for example, HARQ ACK or NACK) therefor in the first embodiment.

The first embodiment proposed in the disclosure may be implemented in more detail as described below.

In the first embodiment of the disclosure, a hibernation or non-hibernation operation for SCells of the UE and an operation for a PDCCH monitoring indicator are described below.

The UE in which the DRX function or the power saving function for the PCell or SpCell is configured may monitor the PDCCH within the short time 1*h*-04 of FIG. 8 or 1*j*-02 of FIG. 10 and may follow the operation described below. Further, the UE may monitor the PDCCH in an activated downlink BWP of the PCell or SpCell.

The UE may monitor the PDCCH and search for the first DCI format (for example, DCI format 2-6) or the WUS by the PS-RNTI.

The UE may receive a configuration of a plurality of search spaces and apply the same in order to monitor the PDCCH for searching for the first DCI format (for example, format 2-6) or the WUS in the activated downlink BWP of the PCell or SpCell according to a common search area configured through the RRC message.

The size of data (payload) of the first DCI format may be determined as a size configured through RRC (for example, SizeDCI_2-6).

When the WUS or the first DCI format is detected, the UE may identify the location of a PDCCH monitoring indicator of the WUS configured through RRC and, if a value of the PDCCH monitoring indicator is 0, does not start a timer for the active time (or on-duration) of the next longer DRX cycle so as not to monitor the PDCCH within the active time. If the value of the PDCCH monitoring indicator is 1, the UE may monitor the PDCCH within the active time by starting the timer for the active time (or on-duration) of the next longer DRX cycle.

When the WUS or the first DCI format is detected, the UE may identify the location of the WUS configured through RRC and, if a plurality of first SCell groups for the first embodiment of the disclosure are configured through the RRC message, read the size of a bitmap corresponding to the number of first SCells groups.

The location of the bitmap for the first embodiment of the disclosure may be right after the PDCCH monitoring indicator.

The size of the bitmap for the first embodiment of the disclosure may be the same as the number of first SCell groups in which SCells configured in the UE through the RRC message are included or configured, and each bit of the bitmap may correspond to each first SCell group (or first SCell group identifier or SCells belonging to the first SCell group) in an ascending order of SCells group identifier values of the configured first SCell group. In another method, each bit of the bitmap may correspond to or mapped to each first SCell group (or first SCell group identifier or SCells belonging to the first SCell group) in a descending order of SCell group identifier values of the configured first SCell group. In another method, each bit of the bitmap may correspond to or may be mapped to each first SCell group (or first SCell group identifier or SCells belonging to the first SCell group) in an ascending order of SCell group identifier values of the first SCell group sequentially from the right bit (from the least significant bit (LSB)) or the left bit (from the most significant bit (MSB)). In another method, each bit of the bitmap may correspond to or may be mapped to each first SCell group (or first SCell group identifier or SCells belonging to the first SCell group) in a descending order of SCell group identifier values of the first SCell group sequentially from the right bit (from the least significant bit (LSB)) or the left bit (from the most significant bit (MSB)).

When the bit value of the bitmap is 0, the bit value of 0 may indicate switching to a dormant BWP or activation of a dormant BWP for each activated SCell among SCells included in the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells belonging to the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the first SCell group corresponding to the bit. In another method, when the bit value of the bitmap is 1, the bit value of 1 may indicate switching to the normal BWP (for example, the first active BWP that is activated from the dormant state) or activation to the normal BWP (for example, the first active BWP that is activated from the dormant state) if the current or activated BWP for each activated SCell among SCells belonging to the first SCell group corresponding to the bit is a dormant BWP (or is not a normal BWP). Otherwise (if the current or activated BWP for each activated SCell among SCells belonging to the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells belonging to the first SCell group corresponding to the bit, indicate activation to the normal BWP (for example, the first active BWP activated from the dormant state), or indicate maintenance, continuous use, application, or activation of the current active BWP.

The short time 1h-04 of FIG. 8 or 1j-02 of FIG. 10 within which the PDCCH should be monitored to detect the first DCI format or the WUS may be calculated or indicated by an offset configured in the RRC message, and the first DCI format or the WUS may be detected within a short time before the active time of the DRX cycle.

The first DCI format (for example, DCI format 2_6) may not be detected or monitored through unnecessary PDCCH monitoring within the active interval of the DRX cycle in order to reduce a battery of the UE.

If the UE has not detected the first DCI format or the WUS within the short time 1h-04 of FIG. 8 or 1j-02 of FIG. 10 even though the power saving function or the DRX function is configured (or the UE is configured to detect the first DCI format within the short time), the UE may perform the basic operation within the active time of the DRX cycle.

If a search space in which PDCCH monitoring is performed to detect the first DCI format in an activated downlink BWP of the PCell or SpCell is configured or provided and the UE has not detected the first DCI format, If the power saving function is configured in the RRC message or an indicator (for example, power saving (ps)-wake up or not) indicating whether to start a timer (or wake up and perform a search within the active time) to monitor the PDCCH within the next active time for the power saving function or not start the timer (or not perform the search within the active time) is configured (or provided), the UE may or not start the timer for the active time according to the indicator.

If the power saving function is configured in the RRC message or an indicator (for example, power saving (ps)-wake up or not) indicating whether to start a timer (or wake up and perform a search within the active time) to monitor the PDCCH within the next active time for the power saving function or not start the timer (or not perform the search within the active time) is not configured (or not provided), the UE may not start the timer for the active time.

If a search space in which PDCCH monitoring is performed to search for the first DCI format in an activated downlink BWP of the PCell or SpCell is configured or provided and the UE is not configured (or is not required) to search for the first DCI format through PDCCH monitoring within a short time interval before the next active time of the DRX cycle or if the short time interval within which the first DCI format is detected through PDCCH monitoring before the next active time of the DRX cycle, the UE should start a timer for the next active time of the DRX cycle.

Another embodiment obtained by concretizing the first embodiment of the disclosure proposed in the disclosure is described below.

PDCCH monitoring indication and dormancy/non-dormancy behaviour for SCells

A UE configured with DRX mode operation on the PCell or on the SpCell a PS-RNTI for DCI format 2_6 by ps-RNTI a number of search space sets, by dci-Format2-6, to monitor PDCCH for detection of DCI format 2_6 on the active DL BWP of the PCell or of the SpCell according to a common search space a payload size for DCI format 2_6 by SizeDCI_2-6 a location in DCI format 2_6 of a Wake-up indication bit by PSPositionDCI2-6, where the UE may not start the drx-onDurationTimer for the next long DRX cycle when a value of the 'PDCCH monitoring' bit is '0', and the UE starts the drx-onDurationTimer for the next long DRX cycle when a value of the 'PDCCH monitoring' bit is '1' a bitmap, when the UE is provided a number of groups of configured SCells by SCell-groups-for-dormancy-outside-active-time, where the bitmap location is immediately after the 'PDCCH monitoring' bit location the bitmap size is equal to the number of groups of configured SCells where each bit of the bitmap from LSB or MSB corresponds to a group of configured SCells from the number of groups of configured SCells in the ascending order or descending order of configured dormant SCell group identity.

a '0' value for a bit of the bitmap indicates an active DL BWP, provided by dormant-BWP, for the UE for each activated SCell in the corresponding group of configured SCells Option 1.

if the current DL BWP is a dormant DL BWP or if the active DL BWP is a dormant DL BWP, a '1' value for a bit of the bitmap indicates an active DL BWP, provided by firstActiveDownlinkBWPFromDormant, for the UE for each activated SCell in the corresponding group of configured SCells. Otherwise, it indicates to continue the current active DL BWP.

Option 2.
if the current DL BWP is not an active DL BWP (normal DL BWP) or if the active DL BWP is not an active DL BWP (normal DL BWP), a '1' value for a bit of the bitmap indicates an active DL BWP, provided by firstActiveDownlinkBWPFromDormant, for the UE for each activated SCell in the corresponding group of configured SCells. Otherwise, it indicates to continue the current active DL BWP.

Option 3.
a '1' value for a bit of the bitmap indicates an active DL BWP switched from dormant DL BWP, provided by firstActiveDownlinkBWPFromDormant or the current active DL BWP, for the UE for each activated SCell in the corresponding group of configured SCells an offset by ps-Offset indicating a time, where the UE starts monitoring PDCCH for detection of DCI format 2_6 according to the number of search space sets, prior to a slot where the drx-onDuarationTimer would start on the PCell or on the SpCell for each search space set, the PDCCH monitoring occasions are the ones in the first Ts slots indicated by duration, or Ts=1 slot if duration is not provided, starting from the first slot of the first Ts slots and ending prior to the start of drx-onDurationTimer.

The UE does not monitor PDCCH for detecting DCI format 2_6 during Active Time.

If a UE reports for an active DL BWP a requirement for a number of slots prior to the beginning of a slot where the UE would start the drx-onDurationTimer, the UE is not required to monitor PDCCH for detection of DCI format 2_6 during the number of slots.

If a UE is provided search space sets to monitor PDCCH for detection of DCI format 2_6 in the active DL BWP of the PCell or of the SpCell and the UE does not detect DCI format 2_6
if the UE is provided ps-WakeupOrNot, the UE is indicated by ps-WakeupOrNot whether the UE may not start or whether the UE shall start the drx-onDurationTimer for the next DRX cycle
if the UE is not provided ps-WakeupOrNot, the UE may not start Active Time indicated by drx-onDurationTimer for the next DRX cycle If a UE is provided search space sets to monitor PDCCH for detection of DCI format 2_6 in the active DL BWP of the PCell or of the SpCell and the UE
is not required to monitor PDCCH for detection of DCI format 2_6, for all corresponding PDCCH monitoring occasions outside Active Time prior to a next DRX cycle, or
does not have any PDCCH monitoring occasions for detection of DCI format 2_6 outside Active Time of a next DRX cycle
the UE shall start by drx-onDurationTimer for the next DRX cycle.

Figure 11:
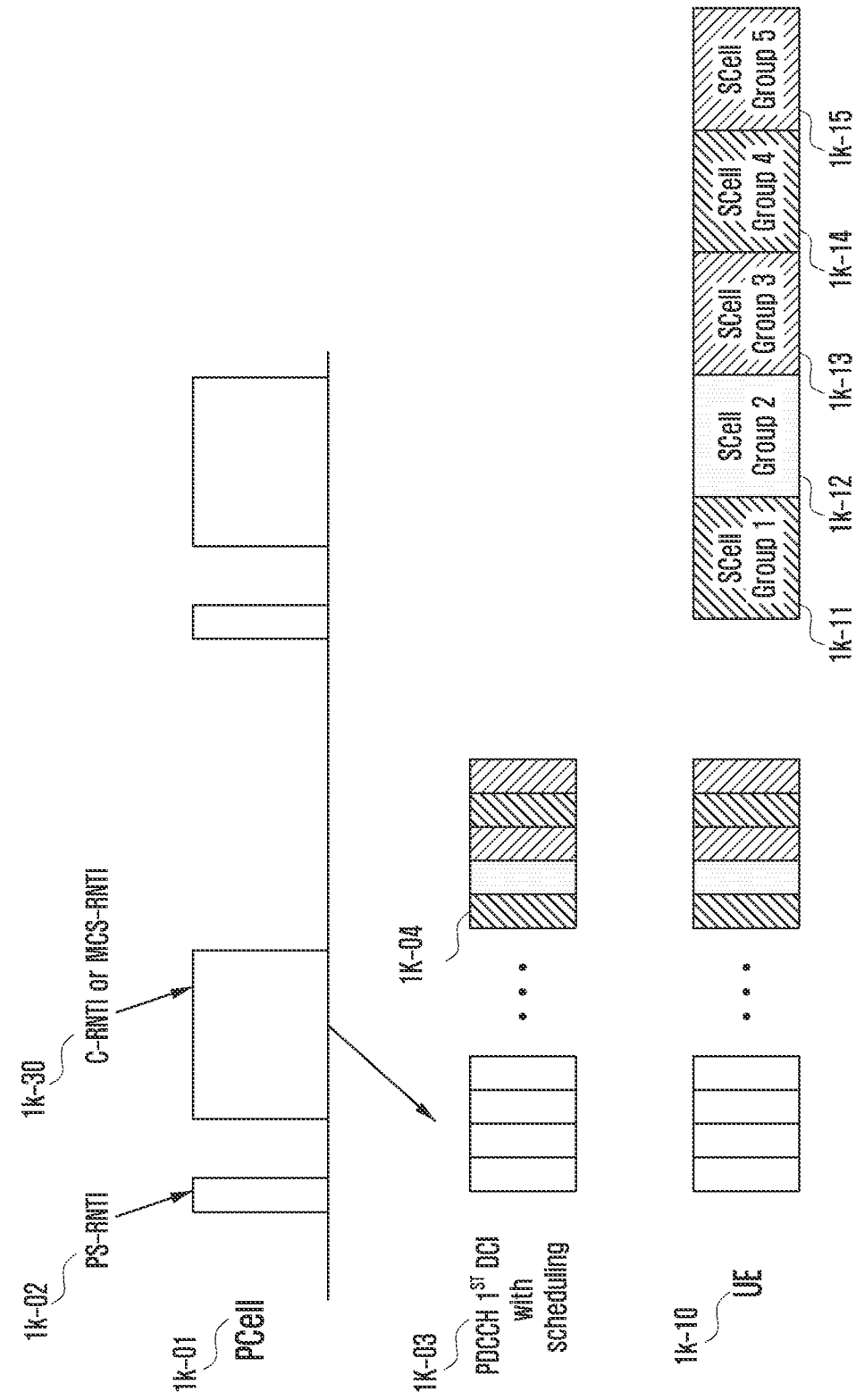
FIG. 11 illustrates a second embodiment obtained by concretizing the concept of the method of operating the dormant BWP in the activated SCell described with reference to FIG. 9 of the disclosure.

FIG. 11 illustrates a second embodiment obtained by concretizing the concept of the method of operating the dormant BWP in the activated SCell described with reference to FIG. 9 of the disclosure.

In the second embodiment, the gNB may configure a plurality of SCells in the UE for carrier aggregation through the RRC message as described in FIG. 6, allocate each SCell identifier, configure a dormant BWP for each SCell, and may not configure a dormant BWP for some SCells. Further, the plurality of SCells may be included in each SCell, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value). SCell groups or SCell group identifier configured for the second embodiment of the disclosure or for applying the same may be referred to as second SCell groups. The second SCell groups may indicate group identifiers to which the operation indicated by a DCI bitmap value received after monitoring of PDCCH DCI by the UE within the active time is applied in the second embodiment of the disclosure.

In FIG. 11, the gNB may configure a power saving function or a DRX function in the UE through the RRC message as illustrated in FIG. 6. Further, in the RRC message, configuration information of a second DCI format (for example, DCI format 0_1 or DCI format 1_1) for which the UE should search within an active time 1k-30 of the DRX cycle for the PCell or SpCell may be configured. When the UE detects the second DCI format in the PCell or SpCell, the UE may identify whether a bitmap including an indicator for second SCell groups for the UE in the second DCI format. Further, the gNB may configure a search space of PDCCH monitoring or a UE identifier (for example, C-RNTI, MCS-C-RNTI, or SPS-C-RNTI (or CS-RNTI)) for searching for the second DCI format within the active time 1k-30 in the UE through the RRC message. When the SCell is switched or activated to the dormant BWP, the UE does not monitor PDCCH DCI, and thus it is very inefficient for the UE to receive the PDCCH DCI or bitmap proposed in the disclosure in the SCell instead of the PCell or SpCell. Accordingly, the disclosure proposes monitoring of the PDCCH DCI proposed in the disclosure in the PCell or SpCell.

For example, as described above, the gNB may transmit the second DCI format through PDCCH transmission resources of the active time 1k-30 in the PCell or SpCell as indicated by reference numeral 1k-03, and the second DCI format may include a bitmap 1k-04 including indication information for the dormant BWP of the second SCell groups configured in the UE.

As described above, the first UE 1k-10 applying information configured through the RRC message may monitor the PDCCH on the basis of the UE identifier (for example, C-RNTI, MCS-C-RNTI, or SPS-C-RNTI (or CS-RNTI)) which is an identifier configured within the active time 1k-30 of the DRX cycle and search for the second DCI format from the base station in the search space as indicated by reference numeral 1k-03. If the second DCI format 1k-03 is detected, the first UE may read the bitmap 1k-04 including indication information for the dormant BWP of the second SCell groups of the first UE in the second DCI format 1k-03. The length of the bitmap may be configured to be the same as the number of second SCell groups configured in the first UE or maximally configured to a predetermined number (for example, 5).

Further, each bit value of the bitmap may be mapped to or indicated by each second SCell group in an ascending order of SCell group identifier values of the second SCell groups configured in the first UE from the right bit (for example, from the least significant bit (LSB)) of the bitmap. In another method, each bit value of the bitmap may be mapped to or indicated by each second SCell group in a descending order of SCell group identifier values of the second SCell groups configured in the first UE from the right bit (for example, from the least significant bit (LSB)) of the bitmap. In another method, each bit value of the bitmap may be mapped to or indicated by each second SCell group in an ascending order of SCell group identifier values of the second SCell groups configured in the first UE from the left bit (for example, from the most significant bit (MSB)) of the bitmap. In another method, each bit value of the bitmap may be mapped to or indicated by each second SCell group in a descending order of SCell group identifier values of the second SCell groups configured in the first UE from the left bit (for example, from the most significant bit (MSB)) of the bitmap.

When bit values of the bitmaps 1k-11, 1k-12, 1k-13, and 1k-14 are 0, the bit value of 0 may indicate switching to a dormant BWP or activation of a dormant BWP for each activated SCell among SCells belonging to the second SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells belonging to the second SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells belonging to the second SCell group corresponding to the bit. In another method, when the bit value of the bitmap is 1, the bit value of 1 may indicate switching to the normal BWP (for example, the first active BWP that is activated from the dormant state) or activation to the normal BWP (for example, the first active BWP that is activated from the dormant state) if the current or activated BWP for each activated SCell among SCells belonging to the second SCell group corresponding to the bit is a dormant BWP (or is not a normal BWP). Otherwise (if the current or activated BWP for each activated SCell among SCells belonging to the second SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells belonging to the second SCell group corresponding to the bit, indicate activation to the normal BWP (for example, the first active BWP activated from the dormant state), or indicate maintenance, continuous use, application, or activation of the current active BWP.

The second embodiment of the disclosure is realized as described above, and the second DCI format of the PDCCH proposed by the second embodiment may be used within the active time and accompanied by downlink transmission resources (for example, PDSCH) or uplink transmission resources (for example, PUSCH) for the PCell or SpCell of the UE. Accordingly, in the second embodiment, the UE may receive the second DCI format of the PDCCH and transmit ACK or NACK information (for example, HARQ ACK or NACK) for scheduling information (downlink transmission resources or uplink transmission resources) of the PCell or SpCell indicated by the second DCI format, and accordingly the gNB may identify whether the UE successfully receives an indication of the second DCI format in the second embodiment.

The second embodiment proposed in the disclosure may be implemented in more detail as described below.

In the second embodiment of the disclosure, a hibernation or non-hibernation operation for SCells of the UE and an operation for a PDCCH monitoring indicator are described below.

For the PCell or SpCell, when a search space is configured, provided, or detected to allow the UE to monitor a PDCCH in order to search for the second DCI format (for example, DCI format 0_1 or DCI format 1_1) within the active time 1k-30 of FIG. 11 and when a bitmap including an indication for the second SCell groups of the UE is included in the second DCI format, the UE may receive the bitmap and operate as follows. Further, the UE may monitor the PDCCH in an activated downlink BWP of the PCell or SpCell.

The UE may monitor the PDCCH and search for the second DCI format (for example, DCI format 0_1 or DCI format 1_1) by a UE identifier (C-RNTI, MCS-C-RNTI, or SPS-C-RNTI (or CS-RNTI)).

The UE may receive a configuration of a plurality of search space sets and apply the same in order to monitor the PDCCH for searching for the second DCI format in the activated downlink BWP of the PCell or SpCell according to a common search area configured through the RRC message.

When the second DCI format is detected, the UE may read the size of a bitmap corresponding to the number of second SCell groups if a plurality of second SCell groups for the second embodiment of the disclosure are configured through the RRC message.

The location of the bitmap for the second embodiment of the disclosure may be right after the PDCCH monitoring indicator.

The size of the bitmap for the second embodiment of the disclosure may be the same as the number of second SCell groups in which SCells configured in the UE through the RRC message are included or configured, and each bit of the bitmap may correspond to each second SCell group (or second SCell group identifier or SCells belonging to the second SCell group) in an ascending order of SCells group identifier values of the configured second SCell group. In another method, each bit of the bitmap may correspond to or mapped to each second SCell group (or second SCell group identifier or SCells belonging to the second SCell group) in a descending order of SCell group identifier values of the configured second SCell group. In another method, each bit of the bitmap may correspond to or may be mapped to each second SCell group (or second SCell group identifier or SCells belonging to the second SCell group) in an ascending order of SCell group identifier values of the second SCell group sequentially from the right bit (from the least significant bit (LSB)) or the left bit (from the most significant bit (MSB)). In another method, each bit of the bitmap may correspond to or may be mapped to each second SCell group (or second SCell group identifier or SCells belonging to the second SCell group) in a descending order of SCell group identifier values of the second SCell group sequentially from the right bit (from the least significant bit (LSB)) or the left bit (from the most significant bit (MSB)).

When the bit value of the bitmap is 0, the bit value of 0 may indicate switching to a dormant BWP or activation of a dormant BWP for each activated SCell among SCells included in the second SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells belonging to the second SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the second SCell group corresponding to the bit. In another method, when the bit value of the bitmap is 1, the bit value of 1 may indicate switching to the normal BWP (for example, the first active BWP that is activated from the dormant state) or activation to the normal BWP (for example, the first active BWP that is activated from the dormant state) if the current or activated BWP for each activated SCell among SCells belonging to the second SCell group corresponding to the bit is a dormant BWP (or is not a normal BWP). Otherwise (if the current or activated BWP for each activated SCell among SCells belonging to the second SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the second SCell group corresponding to the bit, indicate activation to the normal BWP (for example, the first active BWP activated from the dormant state), or indicate maintenance, continuous use, application, or activation of the current active BWP.

Another embodiment obtained by concretizing the second embodiment proposed in the disclosure is described below.

If a UE is provided search space sets to monitor PDCCH for detection of DCI format 0_1 and DCI format 1_1 and if one or both of DCI format 0_1 and DCI format 1_1 include a XYZ field, for PCell,
  the XYZ field is a bitmap with size equal to a number of groups of configured SCells, provided by SCell-groups-for-dormancy-within-active-time,
  each bit of the bitmap corresponds to a group of configured SCells from the number of groups of configured SCells in the ascending order or descending order of configured dormant SCell group identity
  a '0' value for a bit of the bitmap indicates an active DL BWP, provided by dormant-BWP, for the UE for each activated SCell in the corresponding group of configured SCells Option 1.
  if the current DL BWP is a dormant DL BWP, a '1' value for a bit of the bitmap indicates an active DL BWP, provided by first-non-dormant-BWP-ID-for-DCI-inside-active-time, for the UE for each activated SCell in the corresponding group of configured SCells. Otherwise, it indicates to continue the current active DL BWP.

Option 2.
  if the current DL BWP is not an active DL BWP, a '1' value for a bit of the bitmap indicates an active DL BWP, provided by first-non-dormant-BWP-ID-for-DCI-inside-active-time, for the UE for each activated SCell in the corresponding group of configured SCells. Otherwise, it indicates to continue the current active DL BWP.

Option 3.
  a '1' value for a bit of the bitmap indicates an active DL BWP switched from dormant DL BWP, provided by first-non-dormant-BWP-ID-for-DCI-inside-active-time or the current active DL BWP, for the UE for each activated SCell in the corresponding group of configured SCells In FIG. 6 of the disclosure, through the RRCSetup message, the RRCResume message 1*f*-25, or the RRCReconfiguration message 1*f*-45 of the RRC connection configuration, the gNB may configure first SCell group configuration information which can be applied to the first embodiment and second SCell group configuration information which can be applied to the second embodiment, proposed in the disclosure, in the UE. In the RRC message, the gNB may allocate an SCell identifier to each SCell of the UE, and may allocate a first SCell group identifier to each of the first SCell groups and a second SCell group identifier to each of the second SCell groups. Further, a first SCell group set identifier indicating first SCell groups may be allocated and a second SCell group set identifier indicating second SCell groups may be allocated. Each SCell identifier may be included in or mapped to each first SCell group or each second SCell group. The gNB may include the SCell or the SCell identifier in the first SCell group or the second SCell group or map the SCell or the SCell identifier to the first SCell group or the second SCell group to configure the SCell or the SCell identifier only when a dormant BWP (for example, a downlink dormant BWP) is configured for the SCell.

Figure 12:
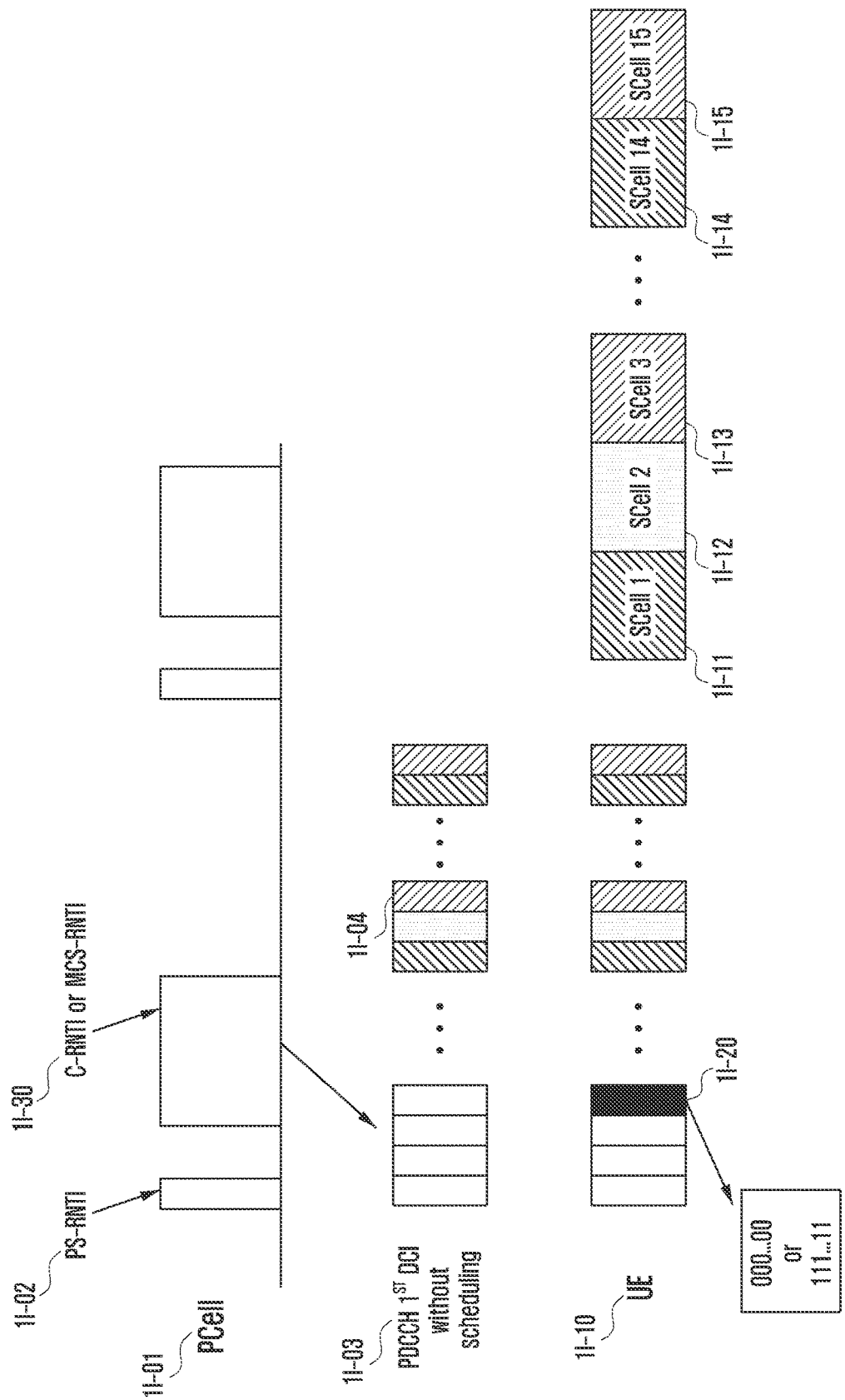
FIG. 12 illustrates a third embodiment obtained by concretizing the concept of the method of operating the dormant BWP in the activated SCell described with reference to FIG. 9 of the disclosure.

FIG. 12 illustrates a third embodiment obtained by concretizing the conception of the method of operating the dormant BWP in the activated SCell described with reference to FIG. 9 of the disclosure.

In the third embodiment, the gNB may configure a plurality of SCells in the UE for carrier aggregation through the RRC message as described in FIG. 6, allocate each SCell identifier, configure a dormant BWP for each SCell, and may not configure a dormant BWP for some SCells. An SCell identifier value may be allocated as a predetermined bit value and have an integer value (or a natural number value). In order to operate or apply the third embodiment of the disclosure, SCell identifiers configured in the RRC message may be used. The SCell identifiers may indicate SCells or SCell identifiers to which the operation indicated by a DCI bitmap value received after monitoring of PDCCH DCI by the UE within the active time is applied in the third embodiment of the disclosure.

In FIG. 12, the gNB may configure a power saving function or a DRX function in the UE through the RRC message as illustrated in FIG. 6. Further, in the RRC message, configuration information of a third DCI format (for example, DCI format 1_1) for which the UE should search within an active time 1*l*-30 of the DRX cycle for the PCell or SpCell may be configured. When the UE detects the third DCI format in the PCell or SpCell, the UE may identify whether a bitmap including an indicator for each SCell or SCell identifier of the UE in the third DCI format.

The third DCI format may include a transmission resource type (resourceAllocation) field, a frequency transmission resource allocation (frequency domain resource assignment) field, a modulation and coding scheme (MCS) field, a new data indicator (NDI) field, a redundancy version (RV) field, an HARQ process number field, an antenna port field, or a DMRS sequence initialization (DMRS SI) field.

If the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the detected third DCI format, bits or fields located thereafter are not analyzed by the modulation and coding scheme (MCS) field, the new data indicator (NDI) field, the Redundancy version (RV) field, the HARQ process number field, the antenna port field, or the DMRS sequence initialization (DMRS SI) field, but information indicated by the bitmap may be applied by considering and reading bitmap fields indicating switching to the dormant BWP for each SCell configured in the UE or activation or indicating switching of the dormant BWP to the normal BWP or the activation.

However, if the type indicated by the transmission resource type field (for example, resourceAllocation) is the first type (for example, resourceAllocationType0) and all bits of the frequency transmission resource allocation field are not 0 or if the type indicated by the transmission resource type field (for example, resourceAllocation) is a second type (for example, resourceAllocationType1) and all bits of the frequency transmission resource allocation field are not 1 in the detected third DCI format, bits or fields located thereafter are analyzed, read, and applied by the modulation and coding scheme (MCS) field, the new data indicator (NDI) field, the redundancy version (RV) field, the HARQ process number field, the antenna port field, or the DMRS sequence initialization (DMRS SI) field.

When the UE detects the third DCI field of the PDCCH, if the third DCI field is scrambled by a second UE identifier (for example, SPS-C-RNTI (or CS-RNTI)) or detected thereby, a special instruction indicating activation or release of periodic transmission resources configured in the UE may be transmitted when the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format.

Accordingly, if the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format only when the third DCI field of the PDCCH is found through scrambling with the first UE identifier (for example, C-RNTI or MCS-C-RNTI), the third embodiment of the disclosure proposes analysis of the fields thereafter by the bitmap indicating the dormant BWP operation for each SCell of the UE.

Further, the gNB may configure a search space of PDCCH monitoring or a UE identifier (for example, C-RNTI or MCS-C-RNTI) for searching for the third DCI format within the active time 1/-30 in the UE through the RRC message.

For example, as described above, the gNB may transmit the third DCI format through PDCCH transmission resources of the active time 1/-30 in the PCell or SpCell as indicated by reference numeral 1/-03, and may include a bitmap 1/-04 including indication information for the dormant BWP of the third SCell groups configured in the UE.

As described above, the first UE 1/-10 applying information configured through the RRC message may monitor the PDCCH on the basis of (or through scrambling with) the first UE identifier (for example, C-RNTI or MCS-C-RNTI) which is an identifier configured within the active time 1/-30 of the DRX cycle to search for the third DCI format from the base station in the search space as indicated by reference numeral 1/-03. If the third DCI format 1/-03 is detected and the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format 1/-03 as indicated by reference numeral 1/-20, fields thereafter may be analyzed by the bitmap indicating the dormant BWP operation for each SCell of the UE and the bitmap 1/-04 including indication information for the dormant BWP for a plurality of SCells (or SCell identifiers) configured in the first UE may be read.

When the above-proposed condition is met, the bitmap may have a fixed length, for example, 15 bits or 16 bits since the bitmap is analyzed to replace the conventional MCS field, NDI field, RV field, HARQ process number field, antenna port field, or DMRS SI field.

Embodiment 3-1 to which a second bitmap mapping method is applied to the third embodiment proposed in the disclosure is described below.

In the first bitmap mapping method, each bit value of the bitmap may be mapped to and indicated by each SCell in an ascending order or a descending order of SCell identifier values of SCells configured in the first UE from a right bit (for example, from the least significant bit (LSB)) of the bitmap or from a left bit (for example, from the most significant bit (MSB)).

In another method, in the first bitmap mapping method, each bit value of the bitmap may be mapped to and indicated by each SCell in an ascending order of SCell identifier values of SCells of a cell group (a master cell group (MCG) or a secondary cell group (SCG)) configured in the first UE from a right bit (for example, from the least significant bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in a descending order of SCell identifier values of SCells of a cell group (a master cell group (MCG) or a secondary cell group (SCG)) configured in the first UE from a right bit (for example, from the least significant bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in an ascending order of SCell identifier values of SCells of a cell group (a master cell group (MCG) or a secondary cell group (SCG)) configured in the first UE from a left bit (for example, from the most significant Bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in a descending order of SCell identifier values of SCells of a cell group (a master cell group (MCG) or a secondary cell group (SCG)) configured in the first UE from a left bit (for example, from the most significant bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells belonging to one cell group are mapped to the bitmap is that the number of SCells which can be configured in one UE is 32 and the bitmap is 15 bits or 16 bits.

When the mapping rule from the left bit or the right bit of the bitmap is applied, it is possible to reduce the number of bitmaps which the UE should read, thereby enabling more rapid UE processing.

When bit values of the bitmaps 1*l*-1*l*, 1*l*-12, 1*l*-13, and 1*l*-14 are 0, the bit value of 0 may indicate switching to a dormant BWP or activation of a dormant BWP for each activated SCell corresponding to the bit (if a dormant BWP is configured or belongs to a first SCell group or a second SCell group). In another method, when the bit values of the bitmaps are 0, the bit value of 0 may indicate switching to a dormant BWP or activation of a dormant BWP if a BWP activated for each activated SCell corresponding to the bit is not a dormant BWP (or is a normal BWP). If the dormant BWP is not configured in the activated SCell corresponding to the bit of the bitmap, the UE may ignore, may not read, or may not apply the bit value.

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. If the dormant BWP is not configured in the activated SCell corresponding to the bit of the bitmap, the UE may ignore, may not read, or may not apply the bit value.

Embodiment 3-2 to which a first bitmap mapping method is applied to the third embodiment proposed in the disclosure is described below.

In the second bitmap mapping method, each bit value of the bitmap may be mapped to and indicated by each SCell in an ascending order or a descending order of SCell identifier values of SCells included in a first SCell group or a second SCell group or in which a dormant BWP is configured among SCells configured in the first UE from a right bit (for example, from the least significant bit (LSB)) of the bitmap or from a left bit (for example, from the most significant bit (MSB)).

In another method, in the second bitmap mapping method, each bit value of the bitmap may be mapped to and indicated by each SCell in an ascending order of SCell identifier values of SCells belonging to a first SCell group or a second SCell group or in which a dormant BWP is configured among SCells of a cell group (a master cell group (MCG) or a secondary cell group (SCG)) configured in the first UE from a right bit (for example, from the least significant bit (LSB)) of the bitmap. If the UE receives the third DCI format in the PCell, SCells included in the first SCell group or the second SCell group or in which the dormant BWP is configured among the SCells belonging to the cell group of the MCG may be mapped to the bitmap in an ascending order of the SCell identifier values. If the UE receives the third DCI format in the PCell, SCells belonging to the first SCell group or the second SCell group or in which the dormant BWP is configured among the SCells belonging to the cell group of the SCG may be mapped to the bitmap in an ascending order of the SCell identifier values. The reason why the SCells belonging to one cell group are mapped to the bitmap is that the number of SCells which can be configured in one UE is 32 and the bitmap is 15 bits or 16 bits.

In another method, in the second bitmap mapping method, each bit value of the bitmap may be mapped to and indicated by each SCell in a descending order of SCell identifier values of SCells belonging to a first SCell group or a second SCell group or in which a dormant BWP is configured among SCells of a cell group (a master cell group (MCG) or a secondary cell group (SCG)) configured in the first UE from a right bit (for example, from the least significant bit (LSB)) of the bitmap. If the UE receives the third DCI format in the PCell, SCells included in the first SCell group or the second SCell group or in which the dormant BWP is configured among the SCells belonging to the cell group of the MCG may be mapped to the bitmap in an ascending order of the SCell identifier values. If the UE receives the third DCI format in the PSCell, SCells belonging to the first SCell group or the second SCell group or in which the dormant BWP is configured among the SCells belonging to the cell group of the SCG may be mapped to the bitmap in a descending order of the SCell identifier values. The reason why the SCells belonging to one cell group are mapped to the bitmap is that the number of SCells which can be configured in one UE is 32 and the bitmap is 15 bits or 16 bits.

In another method, in the second bitmap mapping method, each bit value of the bitmap may be mapped to and indicated by each SCell in an ascending order of SCell identifier values of SCells belonging to a first SCell group or a second SCell group or in which a dormant BWP is configured among SCells of a cell group (a master cell group (MCG) or a secondary cell group (SCG)) configured in the first UE from a left bit (for example, from the most significant bit (MSB)) of the bitmap. If the UE receives the third DCI format in the PCell, SCells included in the first SCell group or the second SCell group or in which the dormant BWP is configured among the SCells belonging to the cell group of the MCG may be mapped to the bitmap in an ascending order of the SCell identifier values. If the UE receives the third DCI format in the PCell, SCells belonging to the first SCell group or the second SCell group or in which the dormant BWP is configured among the SCells belonging to the cell group of the SCG may be mapped to the bitmap in an ascending order of the SCell identifier values. The reason why the SCells belonging to one cell group are mapped to the bitmap is that the number of SCells which can be configured in one UE is 32 and the bitmap is 15 bits or 16 bits.

In another method, in the second bitmap mapping method, each bit value of the bitmap may be mapped to and indicated by each SCell in a descending order of SCell identifier values of the SCells belonging to a first SCell group or a second SCell group or in which a dormant BWP is configured among SCells of a cell group among the SCells of a cell group (a master cell group (MCG) or a secondary cell group (SCG)) configured in the first UE from a left bit (for example, from the most significant bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, SCells belonging to the first SCell group or the second SCell group or in which the dormant BWP is configured among the SCells belonging to the cell group of the SCG may be mapped to the bitmap in a descending order of the SCell identifier values. The reason why the SCells belonging to one cell group are mapped to the bitmap is that the number of SCells which can be configured in one UE is 32 and the bitmap is 15 bits or 16 bits.

When the mapping rule from the left bit or the right bit of the bitmap is applied, it is possible to reduce the number of bitmaps which the UE should read, thereby enabling more rapid UE processing.

When bit values of the bitmaps 1/-1/, 1/-12, 1/-13, and 1/-14 are 0, the bit value of 0 may indicate switching to a dormant BWP or activation of a dormant BWP for each activated SCell corresponding to the bit (if a dormant BWP is configured or belongs to a first SCell group or a second SCell group). In another method, when the bit values of the bitmaps are 0, the bit value of 0 may indicate switching to a dormant BWP or activation of a dormant BWP if a BWP activated for each activated SCell corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP.

The third embodiment of the disclosure is realized as described above, and the third DCI format of the PDCCH proposed by the third embodiment may be used within the active time and is not accompanied by downlink transmission resources (for example, PDSCH) or uplink transmission resources (for example, PUSCH) for the PCell or SpCell of the UE. Accordingly, in the third embodiment, the UE may receive the third DCI format of the PDCCH and may not transmit ACK or NACK information (for example, HARQ ACK or NACK) for indication in the third DCI format.

The third embodiment proposed in the disclosure may be implemented in more detail as described below.

A hibernation or non-hibernation operation for SCells of the UE and an operation for a PDCCH monitoring indicator in the third embodiment of the disclosure are described below.

For the PCell or SpCell, if a search space is configured, provided, or found to allow the UE to monitor a PDCCH in order to search for the third DCI format (for example, DCI format 1_1) through scrambling with or on the basis of a first UE identifier (for example, C-RNTI or MCS-C-RNTI) within the active time as indicated by reference numeral 1/-30 of FIG. 12 and if the type indicated by a transmission resource type field (for example, resourceAllocation) in the third DCI format is a first type (for example, resourceAllocationType0) and all bits of a frequency transmission resource allocation field are 0 or if the type indicated by the transmission resource type field (for example, resourceAllocation) is a second type (for example, resourceAllocationType1) and all bits of the frequency transmission resource allocation field are 1, the UE may consider that the third DCI format includes information on an indication indicating activation or switching of a downlink BWP activated for each activated SCell configured in the UE (or in which a dormant BWP is configured) to the dormant BWP or to a BWP first activated from a dormant state, analyze fields after the transmission resource field or the frequency transmission resource allocation field as a bitmap indicating a dormant BWP operation for each SCell of the UE, and read a bitmap 1/-04 including indication information for dormant BWPs for a plurality of SCells (or SCell identifiers) configured in the UE.

If the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the detected third DCI format, bits or fields located thereafter are not analyzed by the modulation and coding scheme (MCS) field, the new data indicator (NDI) field, the Redundancy version (RV) field, the HARQ process number field, the antenna port field, or the DMRS sequence initialization (DMRS SI) field, but information indicated by the bitmap may be applied by considering and reading bitmap fields indicating switching to the dormant BWP for each SCell configured in the UE or activation or indicating switching of the dormant BWP to the normal BWP or the activation.

When the UE satisfies the condition in the third DCI format and reads the bitmap, the first bitmap mapping method or the second bitmap mapping method proposed in the disclosure may be applied.

When the bit value of the bitmap is 0, the bit value of 0 may indicate switching to a dormant BWP or activation of a dormant BWP for each activated SCell or SCell identifier corresponding to the bit (if a dormant BWP is configured or is included in a first SCell group or a second SCell group). In another method, when the bit value of the bitmap is 0, the bit value of 0 may indicate switching to a dormant BWP or activation of a dormant BWP if the dormant BWP is configured for each activated SCell corresponding to the bit or is included in a first SCell group or a second SCell group, or if the activated BWP is not the dormant BWP (or is a normal BWP). In another method, when the bit value of the bitmap is 0, the bit value of 0 may indicate switching to a dormant BWP or activation of a dormant BWP for each activated SCell (in which a dormant BWP is configured or included in a first SCell group or a second SCell group) or SCell identifier corresponding to the bit. In another method, when the bit value of the bitmap is 0, the bit value of 0 may indicate switching to a dormant BWP or activation of a dormant BWP for each activated SCell or SCell identifier corresponding to the bit. If the bit of the bitmap indicates the SCell in which no dormant BWP is configured or the SCell identifier, the UE may ignore the bit, may not read, or may not apply the bit.

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. In another method, when the bit value of the bitmap is 1, the bit value of 1 may indicate switching to the normal BWP (for example, the first active BWP activated from the dormant state) or activation to the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated.

Another embodiment obtained by concretizing the third embodiment proposed in the disclosure is described below.

If a UE is provided search space sets to monitor PDCCH for detection of DCI format 1_1 scrambled by C-RNTI or MCS-C-RNTI, for PCell or SpCell and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 the UE considers the DCI format 1_1 as indicating an active DL BWP provided by dormant-BWP or by first-non-dormant-BWP-ID-for-DCI-inside-active-time for each activated SCell and interprets the sequence of fields of, for transport block 1

Modulation and coding scheme
New data indicator
Redundancy version
and of
HARQ process number
Antenna port(s)
DMRS sequence initialization as providing a bitmap to each configured SCell from LSB or MSB, in an ascending order of the SCell index for the cell group, where—a '0' value for a bit of the bitmap indicates an active DL BWP, provided by dormant-BWP, for the UE for a corresponding activated SCell configured with dormant BWP or belonging to SCell dormant group.

Option 1.

if the current DL BWP is a dormant DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 2.
if the current DL BWP is not an active DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 3.
a '1' value for a bit of the bitmap indicates an active DL BWP switched from dormant DL BWP, provided by first-non-dormant-BWP-ID-for-DCI-inside-active-time or the current active DL BWP, for the UE for a corresponding activated SCell Another embodiment obtained by concretizing the third embodiment proposed in the disclosure is described below If a UE is provided search space sets to monitor PDCCH for detection of DCI format 1_1 scrambled by C-RNTI or MCS-C-RNTI, for PCell or SpCell and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 the UE considers the DCI format 1_1 as indicating an active DL BWP provided by dormant-BWP or by first-non-dormant-BWP-ID-for-DCI-inside-active-time for each activated SCell and interprets the sequence of fields of, for transport block 1

Modulation and coding scheme
New data indicator
Redundancy version
and of
HARQ process number
Antenna port(s)
DMRS sequence initialization
as providing a bitmap to each configured SCell from LSB or MSB, in an ascending order of the SCell index configured with dormant BWP or belonging to dormant SCell group for the cell group, where—a '0' value for a bit of the bitmap indicates an active DL BWP, provided by dormant-BWP, for the UE for a corresponding activated SCell Option 1.
if the current DL BWP is a dormant DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 2.
if the current DL BWP is not an active DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 3.
a '1' value for a bit of the bitmap indicates an active DL BWP switched from dormant DL BWP, provided by first-non-dormant-BWP-ID-for-DCI-inside-active-time or the current active DL BWP, for the UE for a corresponding activated SCell If an active DL BWP provided by dormant-BWP for a UE on an activated SCell is not a default DL BWP for the UE on the activated SCell, as described in Clause 12, the BWP inactivity timer is not used for transitioning from the active DL BWP provided by dormant-BWP to the default DL BWP on the activated SCell.

Figure 13:
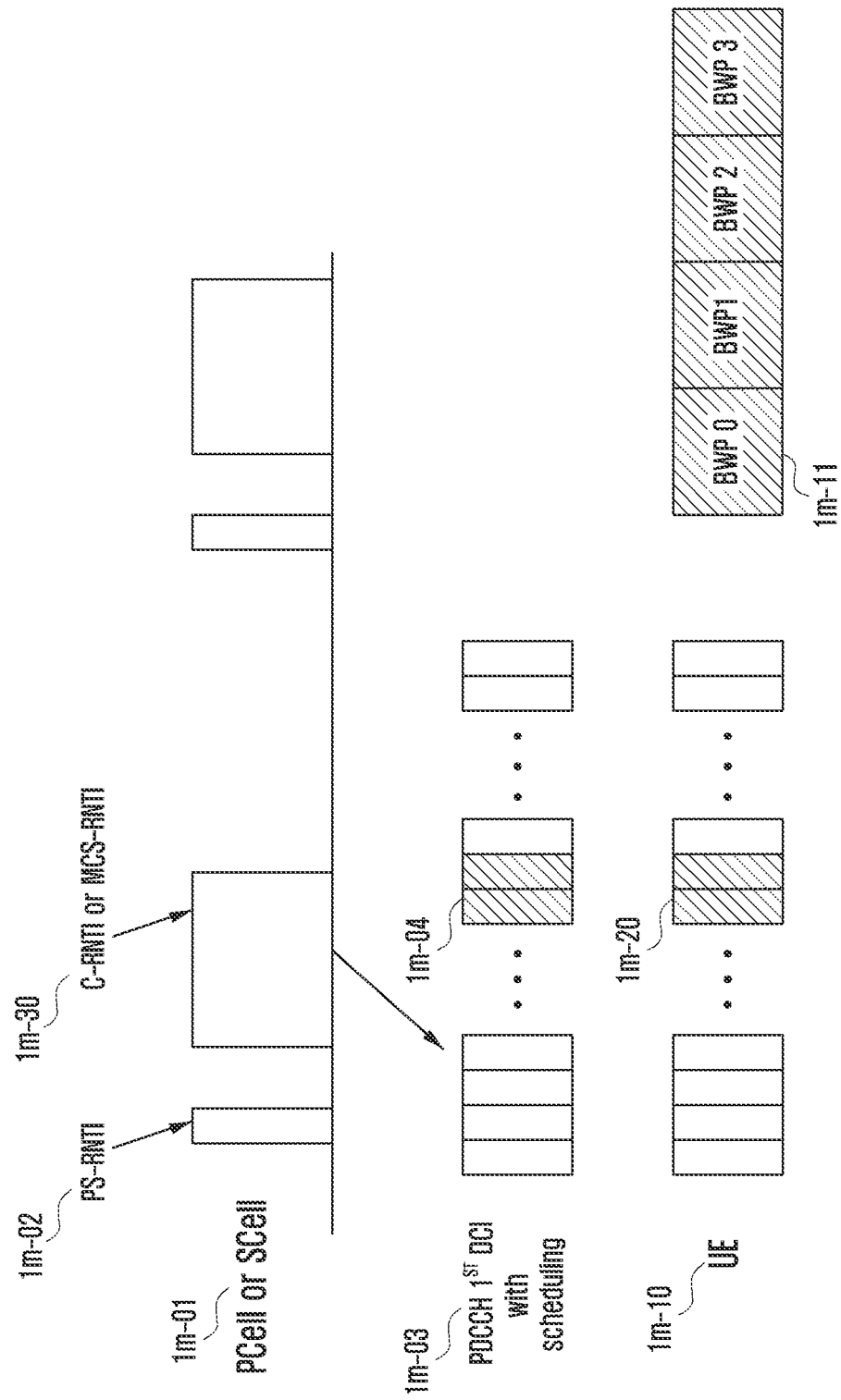
FIG. 13 illustrates a fourth embodiment obtained by concretizing the concept of the method of operating the dormant BWP in the activated SCell described with reference to FIG. 9 of the disclosure.

FIG. 13 illustrates a fourth embodiment obtained by concretizing the concept of the method of operating the dormant BWP in the activated SCell described with reference to FIG. 9 of the disclosure.

In the fourth embodiment, the gNB may configure a plurality of SCells in the UE for carrier aggregation through the RRC message as described in FIG. 6, allocate each SCell identifier, configure a dormant BWP for each SCell, and may not configure a dormant BWP for some SCells. A plurality of BWPs may be configured for each SCell, and a BWP identifier may be allocated to each BWP. Each BWP identifier may have a value of 0, 1, 2, 3, or 4. A predetermined bit value (for example, 5 bits) may be allocated to the SCell identifier value, and the SCell identifier may have an integer value (or a natural number value). SCell identifiers or BWP identifiers configured in the RRC message may be used to implement or apply the fourth embodiment of the disclosure. In the fourth embodiment of the disclosure, in order to monitor PDCCH DCI in a PCell or SCell within an active time and indicate switching or activation of a BWP by a 2-bit indicator of received DCI, the UE may indicate a BWP identifier value. The two-bit indicator value may indicate 0, 1, 2, or 3, which may show a specific BWP identifier value to indicate a BWP to be switched from the current BWP or which should be activated from the current BWP.

In FIG. 13, the gNB may configure a power saving function or a DRX function in the UE through the RRC message as illustrated in FIG. 6. Further, in the RRC message, configuration information of a fourth DCI format (for example, DCI format 0, DCI format 1, DCI format 0_1, or DCI format 1_1) for which the UE should search within an active time 1*m*-30 of the DRX cycle for the PCell, SpCell, or the SCell may be configured. When the UE found the fourth DCI format in the PCell, SpCell, or SCell (for example, on the basis of a UE identifier (C-RNTI, MCS-RNTI, or SPS-C-RNTI (or CS-C-RNTI)), the UE may identify whether a 2-bit indicator indicating BWP switching of the activated SCell of the UE is included in the fourth DCI format. The 2-bit indicator may indicate a BWP identifier value and, for example, indicate a BWP identifier value configured through the RRC message, such as 00=0, 01=1, 10=2, or 11=3.

The PDCCH DCI proposed by the fourth embodiment (for example, the fourth DCI format) may be always accompanied by downlink transmission resources (downlink assignment) or uplink transmission resources (uplink grant), and may be used to switch a BWP currently activated in the PCell, SpCell, or SCell to another BWP or to activate the BWP.

For example, in order to indicate switching of the current BWP activated in the PCell, SpCell, or SCell to a first BWP or activation of the current BWP through PDCCH DCI 1*m*-03 proposed in the fourth embodiment, the gNB may indicate an identifier value 1*m*-11 of the first BWP through a 2-bit indicator 1*m*-04 of the fourth DCI format and indicate downlink transmission resources or uplink transmission resources for the first BWP. The UE may read the 2-bit indicator 1*m*-20 receiving the fourth DCI format, switch the current BWP to the first BWP 1*m*-11 or activate the current BWP according to an indication, receive downlink data through the downlink transmission resources of the first BWP, or transmit uplink data through the uplink transmission resources. The UE may transmit HARQ ACK or NACK for the downlink transmission resources in the first BWP. Accordingly, upon receiving HARQ ACK or NACK for the downlink transmission in the first BWP or receiving uplink data through the uplink transmission resources, the gNB may know that the BWP indicated by the fourth DCI format of the PDCCH is successfully indicated. Further, the fourth embodiment may be applied to a procedure of switching the current BWP (for example, a first BWP) activated in the PCell, SpCell, or SCell to a second BWP (for example, a BWP first activated from a dormant state configured through RRC) or activating the current BWP through the PDCCH DCI 1m-03.

In the disclosure, a method of not applying the fourth embodiment illustrated in FIG. 13 to the dormant BWP is described below. This is because that uplink transmission resources or downlink transmission resources are always accompanied by an indication of switching of the BWP to the UE through the PDCCH DCI in the fourth embodiment proposed above. As proposed in the disclosure, data cannot be transmitted through uplink transmission resources and data cannot be transmitted through downlink transmission resources in the dormant BWP, and thus the gNB or the UE may not use the fourth embodiment. That is, the gNB may not indicate the fourth embodiment to the UE or the UE may not expect reception of an indication of the fourth embodiment from the gNB. More specifically, the UE does not expect that a BWP indicator indicating a BWP (or BWP identifier) indicates a BWP identifier configured by a dormant BWP of the SCell in a higher layer (device or RRC layer device) in the fourth embodiment or in a DCI format used in the fourth embodiment by the gNB. In another method, when a BWP indicator indicating a BWP (or BWP identifier) indicates a BWP identifier configured by a dormant BWP of the SCell in a higher layer (device or RRC layer device) in the fourth embodiment or in a DCI format used in the fourth embodiment by the gNB, the UE may ignore the same.

In another method, in order to not apply the fourth embodiment proposed in FIG. 13 to the dormant BWP of the SCell, a method of mapping or determining a DCI format indicator used in the fourth embodiment which can be applied by the gNB or the UE is proposed below.

In the fourth embodiment, a DCI format (for example, DCI format 1_1) used for scheduling of downlink data transmission resources (PDSCH) in one cell may be configured as follows. The DCI format may be scrambled by a C-RNTI, a CS-RNTI (or SPS-RNTI), or an MCS-C-RNTI.

A bandwidth part (BWP) indicator may be determined as the length of 0, 1, or 2 bits, and may be determined by the number of downlink BWP identifiers configured in a higher-layer device (for example, an RRC layer device). When the length of bits of the BWP indicator is determined, the length of bits of the BWP indicator of the DCI format may be determined on the basis of the number of initial BWPs (initial DL bandwidth parts), dormant BWPs, or downlink BWPs except for BWPs (or BWP identifiers) configured as the dormant BWPs among the downlink BWP identifiers configured in the higher-layer device (for example, the RRC layer device). When the number of initial BWPs (initial DL bandwidth parts), dormant BWPs, or downlink BWPs except for BWPs (or BWP identifiers) configured as the dormant BWPs among the downlink BWP identifiers configured in the higher-layer device (for example, the RRC layer device) is N, the length of the BWP indicator may be determined as a value obtained by rounding up a value of log 2(K). For example, log 2(1) may have a value of 0 bit, log 2(2) may have a value of 1 bit, and log 2(3) or log 2(4) may have a value of 2 bits.

When the value of N is equal to or smaller than 3, K=N+1, and the indicator (or bit value) of the BWP may be mapped in an ascending order of the BWP identifier. Alternatively, the indicator (or bit value) of the BWP may be the same as the ascending order of the BWP identifier.

Otherwise (when the value of N is larger than 3), K=N, 00 of the 2-bit BWP indicator may indicate the BWP identifier value of 1, 01 may indicate the BWP identifier value of 2, 10 may indicate the BWP identifier value of 3, and 11 may indicate the BWP identifier value of 4.

In the fourth embodiment, a DCI format (for example, DCI format 0_1) used for scheduling of uplink data transmission resources (PUSCH) in one cell may be configured as follows. The DCI format may be scrambled by a C-RNTI, a CS-RNTI (or SPS-RNTI), an MCS-C-RNTI, or an SP-CSI-RNTI (identifier for indicating channel measurement configuration information).

(In the case of frequency division duplex (FDD) or paired spectrum), a bandwidth part (BWP) indicator may be determined as the length of 0, 1, or 2 bits, and may be determined by the number of uplink BWP identifiers configured in a higher-layer device (for example, an RRC layer device). When the length of bits of the BWP indicator is determined, the length of bits of the BWP indicator of the DCI format may be determined on the basis of the number of uplink BWPs except for BWPs (or BWP identifiers) configured as initial BWPs (initial DL bandwidth parts) among the uplink BWP identifiers configured in the higher-layer device (for example, the RRC layer device). When the number of uplink BWPs except for BWPs (or BWP identifiers) configured as initial BWPs (initial DL bandwidth parts) among the uplink BWP identifiers configured in the higher-layer device (for example, the RRC layer device) is N, the length of the BWP indicator may be determined as a value obtained by rounding up a value of log 2(K). For example, log 2(1) may have a value of 0 bit, log 2(2) may have a value of 1 bit, and log 2(3) or log 2(4) may have a value of 2 bits.

When the value of N is equal to or smaller than 3, K=N+1, and the indicator (or bit value) of the BWP may be mapped in an ascending order of the BWP identifier. Alternatively, the indicator (or bit value) of the BWP may be the same as the ascending order of the BWP identifier.

Otherwise (when the value of N is larger than 3), K=N, 00 of the 2-bit BWP indicator may indicate the BWP identifier value of 1, 01 may indicate the BWP identifier value of 2, 10 may indicate the BWP identifier value of 3, and 11 may indicate the BWP identifier value of 4.

(In the case of time division duplex (TDD) or unpaired spectrum), a bandwidth part (BWP) indicator may be determined as the length of 0, 1, or 2 bits, and may be determined by the number of uplink BWP identifiers configured in a higher-layer device (for example, an RRC layer device). When the length of bits of the BWP indicator is determined, the length of bits of the BWP indicator of the DCI format may be determined on the basis of the number of initial BWPs (initial DL bandwidth parts), dormant BWPs, or uplink BWPs except for BWPs (or BWP identifiers) configured as the dormant BWPs among the uplink BWP identifiers configured in the higher-layer device (for example, the RRC layer device). When the number of initial BWPs (initial DL bandwidth parts), dormant BWPs, or uplink BWPs except for BWPs (or BWP identifiers) configured as the dormant BWPs among the uplink BWP identifiers configured in the higher-layer device (for example, the RRC layer device) is N, the length of the BWP indicator may be determined as a value obtained by rounding up a value of log 2(K). For example, log 2(1) may have a value of 0 bit, log 2(2) may have a value of 1 bit, and log 2(3) or log 2(4) may have a value of 2 bits.

When the value of N is equal to or smaller than 3, K=N+1, and the indicator (or bit value) of the BWP may be mapped in an ascending order of the BWP identifier. Alternatively, the indicator (or bit value) of the BWP may be the same as the ascending order of the BWP identifier.

Otherwise (when the value of N is larger than 3), K=N, 00 of the 2-bit BWP indicator may indicate the BWP identifier value of 1, 01 may indicate the BWP identifier value of 2, 10 may indicate the BWP identifier value of 3, and 11 may indicate the BWP identifier value of 4.

In another method, in order to not apply the fourth embodiment proposed in FIG. 13 to the dormant BWP of the SCell, a method of mapping or determining a DCI format indicator used in the fourth embodiment which can be applied by the gNB or the UE is proposed below.

In the fourth embodiment, a DCI format (for example, DCI format 1_1) used for scheduling of downlink data transmission resources (PDSCH) in one cell may be configured as follow. The DCI format may be scrambled by a C-RNTI, a CS-RNTI (or SPS-RNTI), or an MCS-C-RNTI.

A bandwidth part (BWP) indicator may be determined as the length of 0, 1, or 2 bits, and may be determined by the number of downlink BWP identifiers configured in a higher-layer device (for example, an RRC layer device). When the length of bits of the BWP indicator is determined, the length of bits of the BWP indicator of the DCI format may be determined on the basis of the number of initial BWPs (initial DL bandwidth parts), dormant BWPs, or downlink BWPs except for BWPs (or BWP identifiers) configured as the dormant BWPs among the downlink BWP identifiers configured in the higher-layer device (for example, the RRC layer device). When the number of initial BWPs (initial DL bandwidth parts), dormant BWPs, or downlink BWPs except for BWPs (or BWP identifiers) configured as the dormant BWPs among the downlink BWP identifiers configured in the higher-layer device (for example, the RRC layer device) is N, the length of the BWP indicator may be determined as a value obtained by rounding up a value of log 2(K). For example, log 2(1) may have a value of 0 bit, log 2(2) may have a value of 1 bit, and log 2(3) or log 2(4) may have a value of 2 bits.

When the value of N is equal to or smaller than 3, K=N+1, and the indicator (or bit value) of the BWP may be mapped in an ascending order of the BWP identifier. Alternatively, the indicator (or bit value) of the BWP may be the same as the ascending order of the BWP identifier.

Otherwise (when the value of N is larger than 3), K=N, 00 of the 2-bit BWP indicator may indicate the BWP identifier value of 1, 01 may indicate the BWP identifier value of 2, 10 may indicate the BWP identifier value of 3, and 11 may indicate the BWP identifier value of 4

In the fourth embodiment, a DCI format (for example, DCI format 0_1) used for scheduling of uplink data transmission resources (PUSCH) in one cell may be configured as follow. The DCI format may be scrambled by a C-RNTI, a CS-RNTI (or SPS-RNTI), an MCS-C-RNTI, or an SP-CSI-RNTI (identifier for indicating channel measurement configuration information).

A bandwidth part (BWP) indicator may be determined as the length of 0, 1, or 2 bits, and may be determined by the number of uplink BWP identifiers configured in a higher-layer device (for example, an RRC layer device). When the length of bits of the BWP indicator is determined, the length of bits of the BWP indicator of the DCI format may be determined on the basis of the number of uplink BWPs except for BWPs (or BWP identifiers) configured as initial BWPs (initial DL bandwidth parts) among the uplink BWP identifiers configured in the higher-layer device (for example, the RRC layer device). When the number of uplink BWPs except for BWPs (or BWP identifiers) configured as initial BWPs (initial DL bandwidth parts) among the uplink BWP identifiers configured in the higher-layer device (for example, the RRC layer device) is N, the length of the BWP indicator may be determined as a value obtained by rounding up a value of log 2(K). For example, log 2(1) may have a value of 0 bit, log 2(2) may have a value of 1 bit, and log 2(3) or log 2(4) may have a value of 2 bits.

When the value of N is equal to or smaller than 3, K=N+1, and the indicator (or bit value) of the BWP may be mapped in an ascending order of the BWP identifier. Alternatively, the indicator (or bit value) of the BWP may be the same as the ascending order of the BWP identifier.

Otherwise (when the value of N is larger than 3), K=N, 00 of the 2-bit BWP indicator may indicate the BWP identifier value of 1, 01 may indicate the BWP identifier value of 2, 10 may indicate the BWP identifier value of 3, and 11 may indicate the BWP identifier value of 4.

In another method, in order to not apply the fourth embodiment illustrated in FIG. 13 to the dormant BWP of the SCell, the higher-layer device (for example, the RRC layer device) may configure the configuration information of the BWP configured as the dormant BWP as follows In the downlink BWP configured as the dormant BWP, PDCCH configuration information pdcch-config, pdcch-configComon, or sps-config (periodic transmission resource configuration information) which is configuration information required for monitoring the PDCCH by the UE is not configured. When the PDSCH configuration information is configured in the downlink BWP configured as the dormant BWP, configuration information for downlink transmission resources may not be configured or may be ignored by the UE even though the configuration information for downlink transmission resources is configured, and beam-related configuration information (transmission configuration indicator (TCI) state) for beam management or beam recovery may be configured in the PDSCH configuration information. The PDCCH configuration information or the PDSCH configuration information may be included or may not be included in downlink BWP configuration information in a downlink BWP-adding or modifying list of serving cell information (ServingCellConfig) of cell group configuration information (CellGroupConfig).

When the dormant BWP is configured or in an uplink BWP corresponding to the downlink BWP configured as the dormant BWP or having the same BWP identifier (for example, in the case of TDD or unpaired spectrum), the UE does not configure PUCCH configuration information (pucch-config or sps-config (periodic transmission resource configuration information)). Further, the PUSCH configuration information may not be configured in the uplink BWP corresponding to the downlink BWP configured as the dormant BWP or having the same BWP identifier (for example, in the case of TDD or unpaired spectrum) or the configuration information for uplink transmission resources may not be configured when the PUSCH configuration is configured or the UE may ignore the configuration information in spite of the configuration thereof. For example, beam-related configuration information may be configured and may be applied by the UE. In another method, BWP identifier information, BWP configuration information, or uplink transmission resource configuration information may not be configured in the uplink BWP corresponding to the downlink BWP configured as the dormant BWP or having the same BWP identifier (for example, in the case of TDD or unpaired spectrum) or the UE may ignore the BWP identifier information, the BWP configuration information, or the uplink transmission resource configuration information in spite of the configuration thereof. Through the configuration method, the fourth embodiment cannot be applied to the uplink BWP. The PUCCH configuration information or the PUSCH configuration information may be included or may not be included in uplink BWP configuration information in an up BWP-adding or modifying list of serving cell configuration information (ServingCellConfig) of cell group configuration information (CellGroupConfig).

Accordingly, an operation of switching a BWP of the gNB or the UE for the method of not applying the fourth embodiment of FIG. 13 proposed in the disclosure to the dormant BWP is proposed below.

When the BS or the UE indicates or performs switching of a second BWP (a BWP which is not a dormant BWP, a normal BWP, or a BWP which is not configured as a dormant BWP) to another second BWP (a BWP which is not a dormant BWP, a normal BWP, or a BWP which is not configured as a dormant BWP), the fourth embodiment (for example, the method using the BWP indicator (2-bit indicator) in DCI format 0_1 of the PDCCH or DCI format 1_1 of the PDCCH) proposed in the disclosure may be applied. The first embodiment (for example, the method using the bitmap indicating each SCell group of DCI format 2_6 of the PDCCH scrambled by the PS-RNTI), the second embodiment (for example, the method using the bitmap (for example, XYZ field) indicating each SCell group in DCI format 0_1 of the PDCCH or DCI format 1_1 of the PDCCH)), or the third embodiment (for example, the method of configuring all of field values indicating frequency transmission resource allocation as 0 or 1 in DCI format 1_1 of the PDCCH scrambled by the C-RNTI or the MCS-RNTI and analyzing the following field values as the bitmap indicating each SCell identifier in which the dormant BWP is configured, proposed in the disclosure cannot be applied. For example, when receiving the indication of switching of the BWP in the fourth embodiment, the UE performs a procedure of switching the second BWP to another second BWP according to the indication.

When indicating (or performing) switching of the second BWP (the BWP which is not the dormant BWP, the normal BWP, or the BWP which is not configured as the dormant BWP) to the first BWP (the dormant BWP or the BWP configured as the dormant BWP) or indicating (or performing) switching of the first BWP (the dormant BWP or the BWP configured as the dormant BWP) to the second BWP (the BWP which is not the dormant BWP, the normal BWP, or the BWP which is not configured as the dormant BWP), the gNB or the UE cannot apply the fourth embodiment (for example, the method using the BWP indicator (2-bit indicator) in DCI format 0_1 of the PDCCH or DCI format 1_1 of the PDCCH) proposed in the disclosure but can apply the first embodiment (for example, the method using the bitmap indicating each SCell group of DCI format 2_6 of the PDCCH scrambled by the PS-RNTI), the second embodiment (for example, the method using the bitmap (for example, XYZ field) indicating each SCell group in DCI format 0_1 of the PDCCH or DCI format 1_1 of the PDCCH), or the third embodiment (for example, the method of configuring all of field values indicating frequency transmission resource allocation as 0 or 1 in DCI format 1_1 of the PDCCH scrambled by the C-RNTI or the MCS-RNTI and analyzing the following field values as the bitmap indicating each SCell identifier in which the dormant BWP is configured), proposed in the disclosure. For example, when receiving the indication of switching of the BWP through the first embodiment, the second embodiment, or the third embodiment, the UE may perform the procedure of switching the second BWP to the first BWP or the procedure of switching of the first BWP to the second BWP. In another method, if cross-scheduling is configured in the SCell when switching of the first BWP (the dormant BWP or the BWP configured as the dormant BWP) to the second BWP (the BWP which is not the dormant BWP, the normal BWP, or the BWP which is not configured as the dormant BWP) is indicated (or performed), the fourth embodiment may be used.

Subsequently, the disclosure proposes a UE operation allowing the fourth embodiment illustrated in FIG. 13 to be applied to the dormant BWP. This is because that uplink transmission resources or downlink transmission resources are always accompanied by the indication of switching of the BWP to the UE through the PDCCH DCI in the fourth embodiment proposed above, and thus the UE operation corresponding thereto is needed.

The detailed operation of the gNB and the UE in the case in which the fourth embodiment is applied to each SCell to indicate switching to the dormant BWP or switching from the dormant BWP to the BWP which is not the dormant BWP is described below (for example, the following application may be made in the case of FDD. Alternatively, the application may be expanded to the case of TDD).

If self-scheduling is configured in the UE for the serving cell,
the gNB applies the fourth embodiment to transmit the proposed PDCCH DCI to the UE in the serving cell.
the UE may receive the PDCCH DCI in the serving cell, perform the procedure proposed in the fourth embodiment, and perform switching to a BWP indicated by a 2-bit indicator of the DCI or perform activation.
If the BWP indicated by the indicated BWP indicator (2-bit indicator) is the second BWP (the BWP which is not the dormant BWP, the normal BWP, or the BWP which is not configured as the dormant BWP) or the BWP identifier,
the UE may switch or activate the BWP to the indicated BWP, transmit uplink data in uplink transmission resources indicated by the DCI or receive downlink data in downlink transmission resources indicated by the DCI in the BWP, and transmit HARQ ACK or NACK in transmission resources corresponding thereto or configured in the DCI (for example, the PUCCH).
If the BWP indicated by the indicated BWP indicator (2-bit indicator) is the first BWP (the dormant BWP or the BWP configured as the dormant BWP) or the BWP identifier,
the UE may switch, activate, or hibernate the BWP to the indicated BWP. Alternatively, uplink transmission resources indicated by the DCI in the BWP may not be expected or may be ignored. Alternatively, downlink transmission resources indicated by the DCI may not be expected or may be ignored. Alternatively, HARQ ACK or NACK may be transmitted in transmission resources corresponding to the downlink transmission resources indicated by the DCI or transmission resources configured in the DCI (for example, the PUCCH). In another method, when the DCI indicates uplink transmission resources, uplink data or asynchronous channel measurement information (aperiodic CSI report) may be transmitted through the uplink transmission resources. In another method, in the case of TDD (unpaired spectrum), when the DCI indicates uplink transmission resources, uplink data or asynchronous channel measurement information (aperiodic CSI report) may be transmitted through the uplink transmission resources.

If cross-scheduling is configured in the UE for the serving cell,
the gNB applies the fourth embodiment to transmit the indication for the serving cell to the UE in the PCell or SpCell through the PDCCH DCI.
the UE may receive the indication for the serving cell in the PCell or SpCell through the PDCCH DCI, perform the procedure proposed by the fourth embodiment, and perform switching to a BWP indicated a 2-bit indicator of the DCI or perform activation.
If the BWP indicated by the indicated BWP indicator (2-bit indicator) is the second BWP (the BWP which is not the dormant BWP, the normal BWP, or the BWP which is not configured as the dormant BWP) or the BWP identifier,
the UE may switch or activate the BWP to the indicated BWP, transmit uplink data in uplink transmission resources indicated by the DCI or receive downlink data in downlink transmission resources indicated by the DCI in the BWP, and transmit HARQ ACK or NACK in transmission resources corresponding thereto or configured in the DCI (for example, the PUCCH).
If the BWP indicated by the indicated BWP indicator (2-bit indicator) is the first BWP (the dormant BWP or the BWP configured as the dormant BWP) or the BWP identifier,
the UE may switch, activate, or hibernate the BWP to the indicated BWP. Alternatively, uplink transmission resources indicated by the DCI in the BWP may not be expected or may be ignored. Alternatively, downlink transmission resources indicated by the DCI may not be expected or may be ignored. Alternatively, HARQ ACK or NACK may be transmitted in transmission resources corresponding to the downlink transmission resources indicated by the DCI or transmission resources configured in the DCI (for example, the PUCCH). In another method, when the DCI indicates uplink transmission resources, uplink data or asynchronous channel measurement information (aperiodic CSI report) may be transmitted through the uplink transmission resources. In another method, in the case of TDD (unpaired spectrum), when the DCI indicates uplink transmission resources, uplink data or asynchronous channel measurement information (aperiodic CSI report) may be transmitted through the uplink transmission resources.

If an indication of switching or activation of a first BWP (dormant BWP) of a serving cell (for example, SCell) to a second BWP (the normal BWP or the BWP which is not the dormant BWP) is made,
the PDCCH is not monitored in the serving cell when the first dormant BWP is activated in the serving cell, and thus the gNB or the UE cannot apply the fourth embodiment in the serving cell if self-scheduling is configured.
if cross-scheduling is configured in the UE for the serving cell or if the gNB realizes the first embodiment, the second embodiment, or the third embodiment proposed in the disclosure in the PCell or SpCell through cross-scheduling,
the gNB applies the first embodiment, the second embodiment, the third embodiment, or the fourth embodiment to transmit the indication for the serving cell to the UE in the PCell or SpCell through the PDCCH DCI.
the UE may receive the indication for the serving cell in the PCell or SpCell through the PDCCH DCI, perform the procedure proposed by the fourth embodiment, and perform switching to a BWP indicated a 2-bit indicator of the DCI or perform activation. In another method, the UE may receive the indication for the serving cell in the PCell or SpCell through the PDCCH DCI, perform the procedure proposed by the first embodiment, the second embodiment, or the third embodiment, and perform switching to a BWP (for example, the first active BWP from dormant) configured or indicated by RRC or perform activation according to an indication of a DCI bitmap of the embodiments.

The disclosure has provided the method of applying the fourth embodiment proposed in the disclosure to make the indication of switching of the dormant BWP in the case in which self-scheduling or cross-scheduling is configured for the SCell.

In another method, the fourth embodiment proposed in the disclosure for the procedure of switching the dormant BWP cannot be applied when the method is modified or expanded and self-scheduling is configured for the SCell, and the fourth embodiment proposed in the disclosure for the procedure of switching the dormant BWP can be applied and allowed only when cross-scheduling is configured for the SCell. This is because the UE cannot receive PDCCH DCI through self-scheduling when the downlink BWP is switched or activated to the dormant BWP in the SCell.

In order to apply the fourth embodiment illustrated in FIG. 13 to the dormant BWP of the SCell, the higher-layer device (for example, the RRC layer device) may configure the configuration information of the BWP configured as the dormant BWP as follows.

In the downlink BWP configured as the dormant BWP, PDCCH configuration information pdcch-config, pdcch-configComon, or sps-config (periodic transmission resource configuration information) which is configuration information required for monitoring the PDCCH by the UE is not configured. When the PDSCH configuration information is configured in the downlink BWP configured as the dormant BWP, configuration information for downlink transmission resources may not be configured or may be ignored by the UE even though the configuration information for downlink transmission resources is configured, and beam-related configuration information (transmission configuration indicator (TCI) state) for beam management or beam recovery may be configured in the PDSCH configuration information. The PDCCH configuration information or the PDSCH configuration information may be included or may not be included in downlink BWP configuration information in a downlink BWP-adding or modifying list of serving cell information (ServingCellConfig) of cell group configuration information (CellGroupConfig).

When the dormant BWP is configured or in an uplink BWP corresponding to the downlink BWP configured as the dormant BWP or having the same BWP identifier (for example, in the case of TDD or unpaired spectrum), the UE does not configure PUCCH configuration information (pucch-config or sps-config (periodic transmission resource configuration information)). PUSCH configuration information may be configured in the uplink BWP corresponding to the downlink BWP configured as the dormant BWP or having the same BWP identifier (for example, in the case of TDD or unpaired spectrum). In another method, the PUSCH configuration information is not configured or, when the PUSCH configuration information is configured, configuration information for uplink transmission resources may not be configured or the UE may ignore the configuration information in spite of the configuration thereof. For example, beam-related configuration information may be configured and may be applied by the UE. In another method, BWP identifier information, BWP configuration information, or uplink transmission resource configuration information may not be configured in the uplink BWP corresponding to the downlink BWP configured as the dormant BWP or having the same BWP identifier (for example, in the case of TDD or unpaired spectrum) or the UE may ignore the BWP identifier information, the BWP configuration information, or the uplink transmission resource configuration information in spite of the configuration thereof. The PUCCH configuration information or the PUSCH configuration information may be included or may not be included in uplink BWP configuration information in an up BWP-adding or modifying list of serving cell configuration information (ServingCellConfig) of cell group configuration information (CellGroupConfig).

Accordingly, the operation of switching the dormant BWP by the gNB or the UE for the method of applying the fourth embodiment of FIG. 13 proposed in the disclosure to the dormant BWP is described below.

When the gNB or the UE indicates or performs switching of a second BWP (a BWP which is not a dormant BWP, a normal BWP, or a BWP which is not configured as a dormant BWP) to another second BWP (a BWP which is not a dormant BWP, a normal BWP, or a BWP which is not configured as a dormant BWP), the fourth embodiment (for example, the method using the BWP indicator (2-bit indicator) in DCI format 0_1 of the PDCCH or DCI format 1_1 of the PDCCH) proposed in the disclosure may be applied. The first embodiment (for example, the method using the bitmap indicating each SCell group of DCI format 2_6 of the PDCCH scrambled by the PS-RNTI), the second embodiment (for example, the method using the bitmap (for example, XYZ field) indicating each SCell group in DCI format 0_1 of the PDCCH or DCI format 1_1 of the PDCCH)), or the third embodiment (for example, the method of configuring all of field values indicating frequency transmission resource allocation as 0 or 1 in DCI format 1_1 of the PDCCH scrambled by the C-RNTI or the MCS-RNTI and analyzing the following field values as the bitmap indicating each SCell identifier in which the dormant BWP is configured, proposed in the disclosure cannot be applied. For example, when receiving the indication of switching of the BWP in the fourth embodiment, the UE performs the procedure of switching the second BWP to another second BWP according to the indication.

When indicating (or performing) switching of the second BWP (the BWP which is not the dormant BWP, the normal BWP, or the BWP which is not configured as the dormant BWP) to the first BWP (the dormant BWP or the BWP configured as the dormant BWP) or indicating (or performing) switching of the first BWP (the dormant BWP or the BWP configured as the dormant BWP) to the second BWP (the BWP which is not the dormant BWP, the normal BWP, or the BWP which is not configured as the dormant BWP), the gNB or the UE may apply the fourth embodiment (for example, the method using the BWP indicator (2-bit indicator) in DCI format 0_1 of the PDCCH or DCI format 1_1 of the PDCCH) proposed in the disclosure and also apply the first embodiment (for example, the method using the bitmap indicating each SCell group of DCI format 2_6 of the PDCCH scrambled by the PS-RNTI), the second embodiment (for example, the method using the bitmap (for example, XYZ field) indicating each SCell group in DCI format 0_1 of the PDCCH or DCI format 1_1 of the PDCCH), or the third embodiment (for example, the method of configuring all of field values indicating frequency transmission resource allocation as 0 or 1 in DCI format 1_1 of the PDCCH scrambled by the C-RNTI or the MCS-RNTI and analyzing the following field values as the bitmap indicating each SCell identifier in which the dormant BWP is configured). For example, when receiving the indication of switching of the BWP through the first embodiment, the second embodiment, the third embodiment, or the fourth embodiment, the UE may perform the procedure of switching the second BWP to the first BWP according to the indication or perform the procedure of switching the first BWP to the second BWP (for example, in the fourth embodiment or the case in which cross-scheduling is configured for the SCell). In another method, if cross-scheduling is configured in the SCell when switching of the first BWP (the dormant BWP or the BWP configured as the dormant BWP) to the second BWP (the BWP which is not the dormant BWP, the normal BWP, or the BWP which is not configured as the dormant BWP) is indicated (or performed), the fourth embodiment may be used.

When the first embodiment, the second embodiment, the third embodiment, or the fourth embodiment of the disclosure is applied, if the downlink dormant BWP configured in the SCell of the UE is not configured as a downlink default BWP (default DL BWP), a BWP inactivity timer for switching or transitioning the dormant BWP to the default BWP may not be used. This is because, when the default BWP is configured as the normal BWP which is not the dormant BWP, the dormant BWP is automatically switched to the normal BWP when the timer expires, and thus battery consumption due to PDCCH monitoring may be generated.

Figure 14:
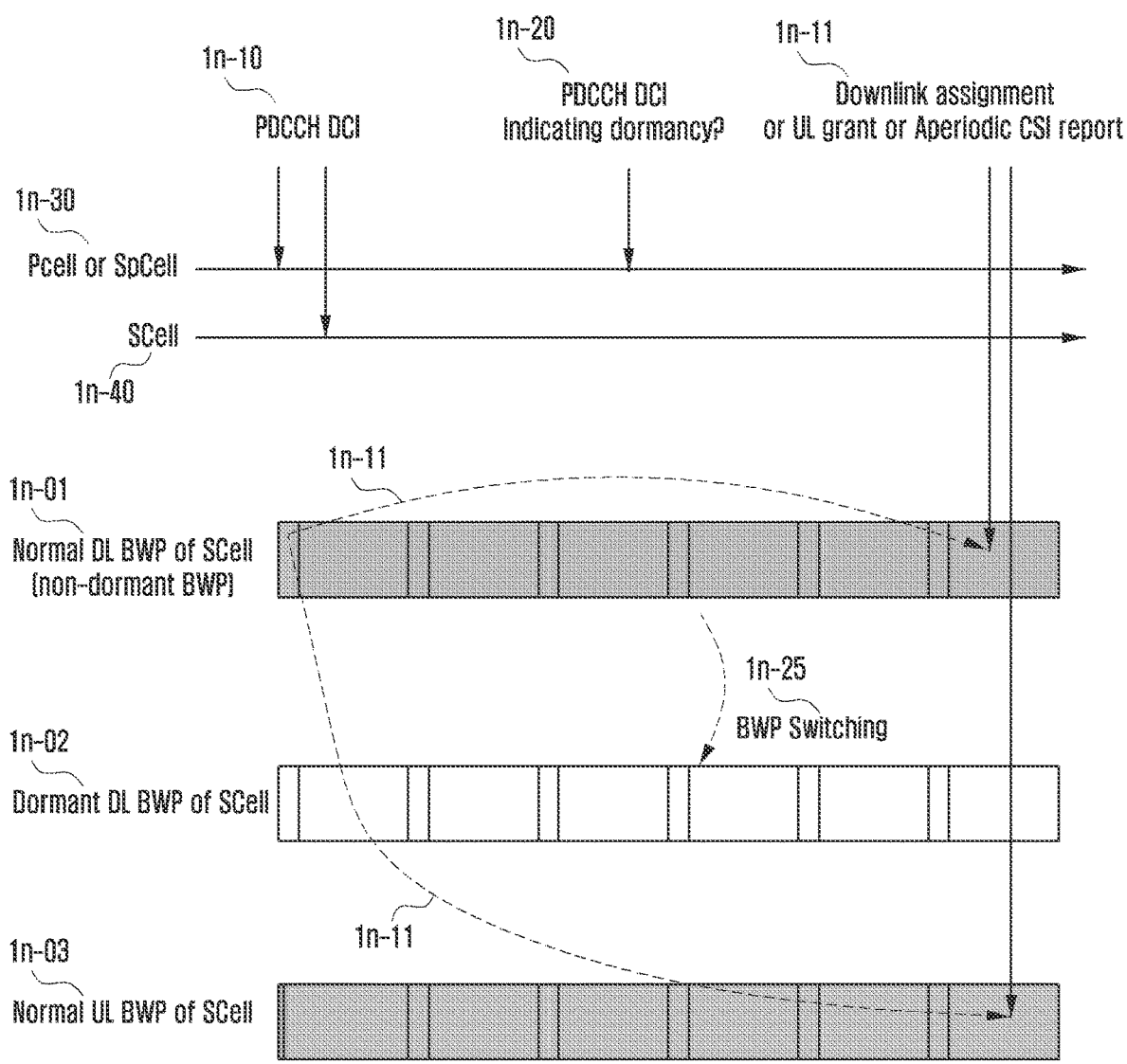
FIG. 14 illustrates a problem generated due to time difference between instructions or indications of PDCC DCIs which the gNB transmits or the UE receives from the gNB in the disclosure.

FIG. 14 illustrates a problem generated due to time difference between instructions or indications of PDCC DCIs which the gNB transmits or the UE receives from the gNB in the disclosure.

In FIG. 14, the UE may receive first PDCCH DCI 1*n*-10 in a PCell or SpCell 1*n*-30 through cross-scheduling or in an SCell 1*n*-40 through self-scheduling for a second BWP (a downlink BWP 1*n*-01 which is not a dormant BWP or an uplink BWP 1*n*-03 which is not a dormant BWP) of the activated SCell 1*n*-40. The first PDCCH DCI may indicate (or allocate) uplink transmission resources 1*n*-11 (PUSCH) for the uplink BWP, indicate (or allocate) downlink transmission resources 1*n*-11 (PDSCH) for the downlink BWP, or indicate (or allocate) the uplink transmission resources 1*n*-11 (PUSCH) for an aperiodic channel measurement report (aperiodic CSI report) for the uplink BWP.

After receiving the first PDCCH DCI, the UE may receive second PDCCH DCI 1*n*-20 in the PCell or SpCell 1*n*-30 or the SCell before receiving downlink data through the downlink transmission resources (PDSCH) of the downlink BWP indicated by the first PDCCH DCI or before transmitting uplink data (or aperiodic channel measurement result report) through the uplink transmission resources (PUSCH) of the uplink BWP indicated by the first PDCCH DCI.

The gNB may apply the first embodiment, the second embodiment, the third embodiment, or the fourth embodiment proposed in the disclosure when transmitting the first PDCCH DCI or the second PDCCH DCI, or the UE may perform the UE operation according to the first embodiment, the second embodiment, the third embodiment, or the fourth embodiment proposed in the disclosure when receiving the first PDCCH DCI or the second PDCCH DCI.

A first problem which may occur due to switching between downlink normal BWPs in the embodiment of FIG. 14 is described below.

If the second PDCCH DCI 1*n*-20 indicates switching of the current second downlink BWP to a third downlink BWP (a BWP which is not a dormant BWP), the UE performs switching to the third downlink BWP before receiving downlink data through the downlink transmission resources 1*n*-11 indicated by the first PDCCH DCI, and thus a problem that downlink data cannot be received through the downlink transmission resources 1*n*-11 indicated by the first PDCCH DCI may occur. Accordingly, in order to solve the first problem, one of the following methods may be applied or a plurality of methods among the following methods may be combined and applied.

First solution: When the second PDCCH DCI 1*n*-20 indicates switching of the current second downlink BWP of the SCell to the third downlink BWP (BWP which is not the dormant BWP), the UE may directly perform switching to the third downlink BWP indicated by the second PDCCH DCI 1*n*-20 before receiving downlink data through the downlink transmission resources 1*n*-11 indicated by the first PDCCH DCI. Accordingly, the UE may not receive downlink data through the downlink transmission resources 1*n*-11 indicated by the first PDCCH DCI, the UE may consider that the downlink data is not transmitted, or the UE may not be required to receive the downlink data. That is, the gNB may determine that the downlink data indicated by the first PDCCH DCI is not important and may transmit the second PDCCH DCI 1*n*-20 to the UE.

Second solution: The gNB may restrict transmission of the second PDCCH DCI 1*n*-20 indicating switching of the current second downlink BWP to another third downlink BWP (BWP which is not the dormant BWP) before the UE successfully receive the downlink data through the downlink transmission resources 1*n*-11 indicated by the first PDCCH DCI. Accordingly, specifically, the gNB may transmit the second PDCCH DCI 1*n*-20 to the UE after the UE receives the downlink data through the downlink transmission resources 1*n*-11 indicated by the first PDCCH DCI and transmits HARQ ACK or NACK in response thereto or successfully receives the downlink data or after the gNB identifies that the UE successfully receives the downlink data (receives ACK). That is, the gNB cannot transmit the second PDCCH DCI 1*n*-20 to the UE before the UE receives the downlink data through the downlink transmission resources 1*n*-11 indicated by the first PDCCH DCI, transmits HARQ ACK or NACK in response thereto, or successfully receives the downlink data or before the gNB identifies that the UE successfully receives the downlink data (receives ACK).

Third solution: When the second PDCCH DCI 1*n*-20 indicates switching of the current second downlink BWP of the SCell to another third downlink BWP (BWP which is not the dormant BWP), the UE may perform switching to the third downlink BWP indicated by the second PDCCH DCI 1*n*-20 after receiving downlink data through the downlink transmission resources 1*n*-11 indicated by the first PDCCH DCI or receiving the downlink data and transmitting HARQ ACK or NACK. Accordingly, the UE receives downlink data through the downlink transmission resources 1*n*-11 indicated by the first PDCCH DCI and then performs switching.

A second problem which may occur due to switching between uplink normal BWPs in the embodiment of FIG. 14 is described below.

If the second PDCCH DCI 1*n*-20 indicates switching of the current second uplink BWP to a third uplink BWP (a BWP which is not a dormant BWP), the UE performs switching to the indicated third downlink BWP before transmitting uplink data through the uplink transmission resources 1*n*-11 indicated by the first PDCCH DCI, and thus a problem that uplink data cannot be transmitted through the uplink transmission resources 1n-11 indicated by the first PDCCH DCI may occur. Accordingly, in order to solve the second problem, one of the following methods may be applied or a plurality of methods among the following methods may be combined and applied.

> First solution: When the second PDCCH DCI 1n-20 indicates switching of the current second uplink BWP of the SCell to another third uplink BWP (BWP which is not the dormant BWP), the UE may directly perform switching to the third downlink BWP indicated by the second PDCCH DCI 1n-20 before receiving uplink data through the uplink transmission resources 1n-11 indicated by the first PDCCH DCI. Accordingly, the UE may not receive uplink data through the uplink transmission resources 1n-11 indicated by the first PDCCH DCI, the UE may consider that the uplink data is not transmitted, or the UE may not be required to receive the uplink data. That is, the gNB may determine that the uplink data indicated by the first PDCCH DCI is not important and may transmit the second PDCCH DCI 1n-20 to the UE.
>
> Second solution: The gNB may restrict transmission of the second PDCCH DCI 1n-20 indicating switching of the current second downlink BWP to another third downlink BWP (BWP which is not the dormant BWP) before the UE successfully transmit the uplink data through the uplink transmission resources 1n-11 indicated by the first PDCCH DCI. Accordingly, specifically, the gNB may transmit the second PDCCH DCI 1n-20 to the UE after the UE transmits the uplink data through the uplink transmission resources 1n-11 indicated by the first PDCCH DCI, receives HARQ ACK or NACK in response thereto or successfully transmits the uplink data, or the gNB identifies that the UE successfully transmits the uplink data (receives ACK). That is, the gNB cannot transmit the second PDCCH DCI 1n-20 to the UE before the UE transmits the uplink data through the uplink transmission resources 1n-11 indicated by the first PDCCH DCI, receives HARQ ACK or NACK in response thereto, successfully transmits the uplink data, or identifies that the gNB successfully receives the uplink data (receives ACK or identifies an NDI value).
>
> Third solution: When the second PDCCH DCI 1n-20 indicates switching of the current second uplink BWP of the SCell to another third uplink BWP (BWP which is not the dormant BWP), the UE may perform switching to the third uplink BWP indicated by the second PDCCH DCI 1n-20 after transmitting uplink data through the uplink transmission resources 1n-11 indicated by the first PDCCH DCI or identifying that the gNB successfully receives the uplink data (for example, identifying an NDI value). Accordingly, the UE receives uplink data through the uplink transmission resources 1n-11 indicated by the first PDCCH DCI and then performs switching.

A third problem which may occur due to switching of a downlink normal BWP to a downlink dormant BWP in the embodiment of FIG. 14 is described below.

If the second PDCCH DCI 1n-20 indicates switching of the current second downlink BWP to a first downlink BWP (dormant BWP) as indicated by reference numeral 1n-25, the UE performs switching to the indicated first downlink BWP before transmitting uplink data through the uplink transmission resources 1n-11 or the downlink transmission resources 1n-11 indicated by the first PDCCH DCI, and thus a problem that uplink data cannot be transmitted through the uplink transmission resources 1n-11 indicated by the first PDCCH DCI or a problem that downlink data cannot be received through the downlink transmission resources 1n-11 indicated by the first PDCCH DCI may occur. Accordingly, in order to solve the third problem, a method for a downlink BWP or a method for an uplink BWP is proposed, and one of the following methods may be applied or a plurality of methods among the following methods may be combined and applied.

The operation of the downlink BWP proposed to solve the third problem is described below, and one of the following methods may be applied or a plurality of methods among the following methods may be combined and applied.

> First solution: When the second PDCCH DCI 1n-20 indicates switching of the current second downlink BWP of the SCell to the first downlink BWP (dormant BWP), the UE may directly perform switching to the first downlink BWP indicated by the second PDCCH DCI 1n-20 before receiving downlink data through the downlink transmission resources 1n-11 indicated by the first PDCCH DCI. Accordingly, the UE may not receive downlink data through the downlink transmission resources 1n-11 indicated by the first PDCCH DCI, the UE may consider that the downlink data is not transmitted, or the UE may not be required to receive the downlink data. That is, the gNB may determine that the downlink data indicated by the first PDCCH DCI is not important and may transmit the second PDCCH DCI 1n-20 to the UE.
>
> Second solution: The gNB may restrict transmission of the second PDCCH DCI 1n-20 indicating switching of the current second downlink BWP to the first downlink BWP (dormant BWP) before the UE successfully receive the downlink data through the downlink transmission resources 1n-11 indicated by the first PDCCH DCI. Accordingly, specifically, the gNB may transmit the second PDCCH DCI 1n-20 to the UE after the UE receives the downlink data through the downlink transmission resources 1n-11 indicated by the first PDCCH DCI and transmits HARQ ACK or NACK in response thereto or successfully receives the downlink data or after the gNB identifies that the UE successfully receives the downlink data (receives ACK). That is, the gNB cannot transmit the second PDCCH DCI 1n-20 to the UE before the UE receives the downlink data through the downlink transmission resources 1n-11 indicated by the first PDCCH DCI, transmits HARQ ACK or NACK in response thereto, or successfully receives the downlink data or before the gNB identifies that the UE successfully receives the downlink data (receives ACK).
>
> Third solution: When the second PDCCH DCI 1n-20 indicates switching of the current second downlink BWP of the SCell to the first downlink BWP (dormant BWP), the UE may perform switching to the first downlink BWP indicated by the second PDCCH DCI 1n-20 after receiving downlink data through the downlink transmission resources 1n-11 indicated by the first PDCCH DCI or after receiving the downlink data and then transmitting HARQ ACK or NACK. Accordingly, the UE receives downlink data through the downlink transmission resources 1n-11 indicated by the first PDCCH DCI and then performs switching.

The operation of the uplink BWP proposed to solve the third problem is described below, and one of the following methods may be applied or a plurality of methods among the following methods may be combined and applied.

First solution: When the second PDCCH DCI 1*n*-20 indicates switching of the current second downlink BWP of the SCell to the first downlink BWP (dormant BWP), the UE may directly perform switching to the first downlink BWP indicated by the second PDCCH DCI 1*n*-20 before receiving uplink data through the uplink transmission resources 1*n*-11 indicated by the first PDCCH DCI. Further, when the second PDCCH DCI 1*n*-20 indicates switching of the current second downlink BWP of the SCell to the first downlink BWP (dormant BWP), the UE may directly hibernate or deactivate an uplink BWP corresponding to the SCell and may apply the operation proposed in the disclosure when the BWP is hibernated or deactivated. In another method, when the second PDCCH DCI 1*n*-20 indicates switching of the current second downlink BWP of the SCell to the first downlink BWP (dormant BWP), the UE may directly switch or activate the uplink BWP corresponding to the SCell to an uplink dormant BWP configured through an RRC message. Accordingly, the UE may not receive uplink data through the uplink transmission resources 1*n*-11 indicated by the first PDCCH DCI, the UE may consider that the uplink data is not transmitted, or the UE may not be required to receive the uplink data. That is, the gNB may determine that the uplink data indicated by the first PDCCH DCI is not important and may transmit the second PDCCH DCI 1*n*-20 to the UE.

Second solution: The gNB may restrict transmission of the second PDCCH DCI 1*n*-20 indicating switching of the current second downlink BWP to the first downlink BWP (dormant BWP) before the UE successfully transmit the uplink data through the uplink transmission resources 1*n*-11 indicated by the first PDCCH DCI. Accordingly, specifically, the gNB may transmit the second PDCCH DCI 1*n*-20 to the UE after the UE transmits the uplink data through the uplink transmission resources 1*n*-11 indicated by the first PDCCH DCI and receives HARQ ACK or NACK in response thereto or successfully transmits the uplink data, or the gNB identifies that the UE successfully transmits the uplink data (receives ACK). That is, the gNB cannot transmit the second PDCCH DCI 1*n*-20 to the UE before the UE transmits the uplink data through the uplink transmission resources 1*n*-11 indicated by the first PDCCH DCI, receives HARQ ACK or NACK in response thereto, successfully transmits the uplink data, or identifies that the gNB successfully receives the uplink data (receives ACK or identifies an NDI value).

Third solution: When the second PDCCH DCI 1*n*-20 indicates switching of the current second downlink BWP of the SCell to the first downlink BWP (dormant BWP), the UE may hibernate or deactivate an uplink BWP corresponding to the SCell after transmitting uplink data through the uplink transmission resources 1*n*-11 indicated by the first PDCCH DCI or identifying that the gNB successfully receives the uplink data (for example, identifying an NDI value) and may apply the operation proposed in the disclosure when the BWP is hibernated or deactivated. In another method, when the second PDCCH DCI 1*n*-20 indicates switching of the current second downlink BWP of the SCell to the first downlink BWP (dormant BWP), the UE may switch or activate the uplink BWP corresponding to the SCell to an uplink BWP configured through an RRC message after transmitting uplink data through the uplink transmission resources 1*n*-11 indicated by the first PDCCH DCI or identifying that the gNB successfully receives the uplink data (for example, identifying an NDI value). When the second PDCCH DCI 1*n*-20 indicates switching of the current second downlink BWP of the SCell to the first downlink BWP (dormant BWP), the UE may directly perform switching to the first downlink BWP indicated by the second PDCCH DCI 1*n*-20 for the downlink BWP before receiving uplink data through the uplink transmission resources 1*n*-11 indicated by the first PDCCH DCI. In another method, when the second PDCCH DCI 1*n*-20 indicates switching of the current second downlink BWP of the SCell to the first downlink BWP (dormant BWP), the UE may perform switching to the first downlink BWP indicated by the second PDCCH DCI 1*n*-20 for the downlink BWP after successfully transmitting uplink data through the uplink transmission resources 1*n*-11 indicated by the first PDCCH DCI. Accordingly, the UE transmits uplink data through the uplink transmission resources 1*n*-11 indicated by the first PDCCH DCI.

In the disclosure, the first solution, the second solution, or the third solution for the downlink BWP and the first solution, the second solution, or the third solution for the uplink BWP to solve the third problem may be applied to the UE transmitting or receiving data to or from the gNB through a frequency division duplex (FDD) system or an FDD method. This is because the uplink and the downlink use different frequencies and different BWPs in the FDD communication. However, one of the following methods may be applied to the UE transmitting or receiving data to or from the gNB through a TDD system or a TDD method. In the TDD communication, since the uplink and the downlink do not share time for the same frequency and the same BWP, switching or activation timing for one BWP may be determined as follows.

First solution: When the second PDCCH DCI 1*n*-20 indicates switching of the current second downlink BWP of the SCell to the first downlink BWP (dormant BWP), the UE may directly perform switching to the first downlink BWP (uplink or downlink) indicated by the second PDCCH DCI 1*n*-20 before receiving downlink data through the downlink transmission resources 1*n*-11 indicated by the first PDCCH DCI or transmitting uplink data through the uplink transmission resources 1*n*-11 indicated by the first PDCCH DCI. Accordingly, the UE may not receive downlink data through the downlink transmission resources 1*n*-11 indicated by the first PDCCH DCI or not transmit uplink data through the uplink transmission resources 1*n*-11 indicated by the first PDCCH DCI, the UE may consider that the downlink data is not transmitted, or the UE may not be required to receive the downlink data or transmit the uplink data through the uplink transmission resources 1*n*-11 indicated by the first PDCCH DCI. That is, the gNB may determine that the downlink data or the uplink data indicated by the first PDCCH DCI is not important and may transmit the second PDCCH DCI 1*n*-20 to the UE.

Second solution: The gNB may restrict transmission of the second PDCCH DCI 1*n*-20 indicating switching of the current second downlink BWP of the SCell to the first downlink BWP (dormant BWP) before the UE successfully receive the downlink data through the downlink transmission resources 1*n*-11 indicated by the first PDCCH DCI or successfully transmits the uplink data through the uplink transmission resources 1o-11 indicated by the first PDCCH DCI. Accordingly, specifically, the gNB may transmit the second PDCCH DCI 1n-20 to the UE after the UE receives the downlink data through the downlink transmission resources 1n-11 indicated by the first PDCCH DCI and transmits HARQ ACK or NACK in response thereto or successfully receives the downlink data, or after the gNB identifies that the UE successfully receives the downlink data (receives ACK) or successfully receives uplink data through the uplink transmission resources 1n-11 indicated by the first PDCCH DCI. That is, the gNB cannot transmit the second PDCCH DCI 1n-20 to the UE before the UE receives the downlink data through the downlink transmission resources 1n-11 indicated by the first PDCCH DCI, transmits HARQ ACK or NACK in response thereto, or the gNB successfully receives the downlink data, identifies that the UE successfully receives the downlink data (receives ACK), or receives uplink data through the uplink transmission resources 1n-11 indicated by the first PDCCH DCI.

Third solution: When the second PDCCH DCI 1n-20 indicates switching of the current second downlink BWP of the SCell to the first downlink BWP (dormant BWP), the UE may perform switching or activation to the first BWP (uplink or downlink) indicated by the second PDCCH DCI 1n-20 after receiving downlink data through the downlink transmission resources 1n-11 indicated by the first PDCCH DCI, receiving the downlink data, and transmitting HARQ ACK or NACK, or successfully transmitting uplink data through the uplink transmission resources 1n-11 indicated by the first PDCCH DCI. Accordingly, the UE may perform switching or activation after receiving downlink data through the downlink transmission resources 1n-11 indicated by the first PDCCH DCI or transmitting uplink data through the uplink transmission resources 1n-11 indicated by the first PDCCH DCI.

When the UE receives the indication of switching or activation of the first downlink BWP (dormant BWP) of the activated SCell to the second downlink BWP according to the first embodiment, the second embodiment, or the third embodiment proposed in the disclosure, the second downlink BWP may be a first active downlink BWP from dormant, configured through an RRC message. However, when receiving the indication of activation of the deactivated SCell through MAC control information proposed in the disclosure, the second downlink BWP or the second uplink BWP may be a first active downlink BWP or a first active uplink BWP configured through the RRC message when the UE activates the second downlink BWP or the second uplink BWP.

FIG. 15 proposes a format of the RRC message for configuring configuration information to apply the first embodiment, the second embodiment, the third embodiment, or the fourth embodiment, proposed in the disclosure.

In FIG. 15, the gNB may transmit configuration information for applying the first embodiment, the second embodiment, the third embodiment, or the fourth embodiment proposed in the disclosure to the UE through the RRC message (for example, the RRCSetup message, the RRCResume message, or the RRCReconfiguration message) as illustrated in FIG. 6.

The format of the RRC message (for example, the RRCReconfiguration message) may be configured as illustrated in FIG. 15.

Bearer configuration information 1o-10 for configuring each bearer may be included.

Cell group configuration information 1o-11 for configuring the RLC layer device, the MAC layer device, the PHY layer device, or the cell may be included. Accordingly, the cell group configuration information 10-11 may include RLC layer device configuration information, MAC layer device configuration information 1o-21, PHY layer device configuration information 1o-25, or configuration information 1o-22, 1o-23, 1o-24, 1o-30, 1o-40, 1o-41, and 1o-42 for configuring the cell.

In order to configure the configuration information for applying the first embodiment, the second embodiment, the third embodiment, or the fourth embodiment proposed in the disclosure, the gNB may configure a plurality of SCells in the UE for carrier aggregation through the RRC message as illustrated in FIG. 15, allocate each SCell identifier, configure a dormant BWP for each SCell, and may not configure a dormant BWP for some SCells as illustrated in FIG. 6. Further, the plurality of SCells may be included and configured in each SCell group (the first SCell group for the first embodiment or the second SCell group for the second embodiment), and one SCell group (the first SCell group for the first embodiment or the second SCell group for the second embodiment) may include a plurality of SCells. An SCell group identifier (the first SCell group identifier for the first embodiment or the second SCell group identifier for the second embodiment) may be allocated to each SCell group (the first SCell group for the first embodiment or the second SCell group for the second embodiment), and a plurality of SCell identifiers may be configured to be included in or mapped to each SCell group identifier (the first SCell group identifier for the first embodiment or the second SCell group identifier for the second embodiment). The SCell identifier value or the SCell group identifier value may be allocated as a predetermined bit value and have an integer value (or a natural number value). First SCell groups for the first embodiment may be configured to be plural, and the first SCell group may have the SCell group identifier or the SCell group identifier may be mapped to a first SCell group set identifier for the first embodiment. Second SCell groups for the second embodiment may be configured to be plural, and the second SCell group may have the SCell group identifier or the SCell group identifier may be mapped to a second SCell group set identifier for the second embodiment.

A plurality of BWPs may be configured for each of the uplink and the downlink for each SCell, and a BWP identifier may be allocated to each BWP. Each BWP identifier may have a value of 0, 1, 2, 3, or 4. A predetermined bit value (for example, 5 bits) may be allocated to the SCell identifier value, and the SCell identifier may have an integer value (or a natural number value). For each SCell, a first active BWP, a default BWP, an initial BWP, a dormant BWP, or a first active BWP from dormant for the uplink or downlink may be indicated and configured by a BWP identifier.

Specifically, the method of configuring configuration information to apply the first embodiment, the second embodiment, the third embodiment, or the fourth embodiment proposed in the disclosure by the UE or the gNB is proposed below and one or a plurality of following methods may be applied.

First method: When an SCell identifier 1o-40 is configured in cell configuration information 1o-23 and 1o-30 of cell group configuration information 1o-11 of the RRC message, dormant SCell group configuration information may be also included therein to indicate a first SCell group (or group identifier) or a second SCell group (or group identifier) to which the SCell identifier is mapped or in which the SCell identifier is included. The dormant SCell group configuration information may include the first SCell group set identifier for the first embodiment, and include the first SCell group identifier included in the first SCell group set for the first embodiment to indicate that the SCell identifier is mapped to or included in the first SCell group (group corresponding to the group identifier) of the first SCell group set. The dormant SCell group configuration information may include the second SCell group set identifier for the second embodiment, and include the second SCell group identifier included in the second SCell group set for the second embodiment to indicate that the SCell identifier is mapped to or included in the second SCell group (group corresponding to the group identifier) of the second SCell group set. In another method, the dormant SCell group configuration information may include one identifier among the first SCell group identifier for the first embodiment or the second SCell group set identifier for the second embodiment, and include the first SCell group identifier included in the first SCell group set for the first embodiment or the second SCell group set identifier for the second embodiment and indicate that the SCell identifier is mapped to or included in the SCell group of one SCell group among the first SCell group of the first SCell group set and the second SCell group of the second SCell group set. That is, one SCell identifier may be mapped to included in only one SCell group among the first SCell group for the first embodiment or the second SCell group for the second embodiment, or included in only one SCell group. Further, in order to configure a plurality of first SCell groups when dormant SCell group configuration information is configured in cell configuration information 1o-23 and 1o-30 of the cell group configuration information 1o-11 of the RRC message, the first SCell group list may be configured, and the first SCell group list may include first SCell group identifiers and, more specifically, may include lists to which SCell groups are added, from which SCell groups are released, or in which SCell groups are modified. Further, in order to configure a plurality of second SCell groups when dormant SCell group configuration information is configured in cell configuration information 1o-23 and 1o-30 of the cell group configuration information 1o-11 of the RRC message, the second SCell group list may be configured, and the second SCell group list may include second SCell group identifiers and, more specifically, may include lists to which SCell groups are added, from which SCell groups are released, or in which SCell groups are modified.

Second method: When an SCell identifier 1o-40 is configured in cell configuration information 1o-23 and 1o-30 of cell group configuration information 1o-11 of the RRC message, dormant SCell group configuration information may be also included therein to indicate a first SCell group (or group identifier) or a second SCell group (or group identifier) to which the SCell identifier is mapped or in which the SCell identifier is included. The dormant SCell group configuration information may include the first SCell group identifier included in the first SCell group set (groups) for the first embodiment to indicate that the SCell identifier is mapped or included in the first SCell group (group corresponding to the group identifier) of the first SCell group set. The dormant SCell group configuration information may include the second SCell group identifier included in the second SCell group set for the second embodiment to indicate that the SCell identifier is mapped to or included in the second SCell group (group corresponding to the group identifier) of the second SCell group set. In another method, the dormant SCell group configuration information may include the first SCell group identifier included in the first SCell group set for the first embodiment or the second SCell group set identifier for the second embodiment to indicate that the SCell identifier is mapped or included in the SCell group of one SCell group set among the first SCell group of the first SCell group set and the second SCell group of the second SCell group set. That is, one SCell identifier may be mapped to included in only one SCell group among the first SCell group for the first embodiment or the second SCell group for the second embodiment, or included in only one SCell group. Further, in order to configure a plurality of first SCell groups when dormant SCell group configuration information is configured in cell configuration information 1o-23 and 1o-30 of the cell group configuration information 1o-11 of the RRC message, the first SCell group list may be configured, and the first SCell group list may include first SCell group identifiers and, more specifically, may include lists to which SCell groups are added, from which SCell groups are released, or in which SCell groups are modified. In addition, in order to configure a plurality of second SCell groups when dormant SCell group configuration information is configured in cell configuration information 1o-23 and 1o-30 of the cell group configuration information 1o-11 of the RRC message, the second SCell group list may be configured, and the second SCell group list may include second SCell group identifiers and, more specifically, may include lists to which SCell groups are added, from which SCell groups are released, or in which SCell groups are modified.

Third method: dormant SCell group configuration information may be configured along with cell configuration information 1o-23 and 1o-30 of cell group configuration information 1o-11 of the RRC message. The dormant SCell group configuration information may include the first SCell group set identifier for the first embodiment, include the first SCell group identifier included in the first SCell group set for the first embodiment, and configure the first SCell identifier list included in the first SCell group. SCell identifiers included in the first SCell identifier list may be configured to be mapped to or included in the first SCell group (group corresponding to the group identifier) of the first SCell group set. Further, the dormant SCell group configuration information may include the second SCell group set identifier for the second embodiment, include the second SCell group identifier included in the second SCell group set for the second embodiment, and configure the second SCell identifier list included in the second SCell group. SCell identifiers included in the second SCell identifier list may be configured to be mapped to or included in the second SCell group (group corresponding to the group identifier) of the second SCell group set. A plurality of first SCell groups and the first SCell identifier list corresponding to each first SCell group may be configured in the first SCell group set of the dormant SCell group configuration information, or a plurality of second SCell groups and the second SCell identifier list corresponding to each second SCell group may be configured in the second SCell group set. In another method, the dormant SCell group configuration information may include one identifier among the first SCell group set identifier for the first embodiment and the second SCell group set identifier for the second embodiment, and may include the first SCell identifier list of the first SCell group included in the first SCell group set for the first embodiment or the second SCell identifier list of the second SCell group included in the second SCell group set identifier for the second embodiment to indicate that each SCell identifier is mapped to or included in the SCell group of one SCell group set among the first SCell group of the first SCell group set and the second SCell group of the second SCell group set. That is, one SCell identifier may be mapped to included in only one SCell group among the first SCell group for the first embodiment or the second SCell group for the second embodiment, or included in only one SCell group. The SCell identifier list may include lists to which SCell identifiers are added, in which SCell identifiers are modified, or from which SCell identifiers are released. Further, in order to configure a plurality of first SCell groups when dormant SCell group configuration information is configured in cell configuration information 1*o*-23 and 1*o*-30 of the cell group configuration information 1*o*-11 of the RRC message, the first SCell group list may be configured, and the first SCell group list may include first SCell group identifiers and, more specifically, may include lists to which SCell groups are added, from which SCell groups are released, or in which SCell groups are modified. In addition, in order to configure a plurality of second SCell groups when dormant SCell group configuration information is configured in cell configuration information 1*o*-23 and 1*o*-30 of the cell group configuration information 1*o*-11 of the RRC message, the second SCell group list may be configured, and the second SCell group list may include second SCell group identifiers and, more specifically, may include lists to which SCell groups are added, from which SCell groups are released, or in which SCell groups are modified.

Fourth method: dormant SCell group configuration information may be configured along with cell configuration information 1*o*-23 and 1*o*-30 of cell group configuration information 1*o*-11 of the RRC message. The dormant SCell group configuration information may include the first SCell group identifier included in the first SCell group set for the first embodiment and configure the first SCell identifier list included in the first SCell group. SCell identifiers included in the first SCell identifier list may be configured to be mapped to or included in the first SCell group (group corresponding to the group identifier) of the first SCell group set. Further, the dormant SCell group configuration information may include the second SCell group identifier included in the second SCell group set for the second embodiment and configure the second SCell identifier list included in the second SCell group. SCell identifiers included in the second SCell identifier list may be configured to be mapped to or included in the second SCell group (group corresponding to the group identifier) of the second SCell group set. A plurality of first SCell groups and the first SCell identifier list corresponding to each first SCell group may be configured in the first SCell group set of the dormant SCell group configuration information or a plurality of second SCell groups and the second SCell identifier list corresponding to each second SCell group may be configured in the second SCell group set. In another method, the dormant SCell group configuration information may include the first SCell identifier list of the first SCell group included in the first SCell group set for the first embodiment or the second SCell identifier list of the second SCell group included in the second SCell group set identifier for the second embodiment to indicate that each SCell identifier is mapped to included in the SCell group of one SCell group set among the first SCell group of the first SCell group set and the second SCell group of the second SCell group set. That is, one SCell identifier may be mapped to included in only one SCell group among the first SCell group for the first embodiment or the second SCell group for the second embodiment, or included in only one SCell group. The SCell identifier list may include lists to which SCell identifiers are added, in which SCell identifiers are modified, or from which SCell identifiers are released. Further, in order to configure a plurality of first SCell groups when dormant SCell group configuration information is configured in cell configuration information 1*o*-23 and 1*o*-30 of the cell group configuration information 1*o*-11 of the RRC message, the first SCell group list may be configured, and the first SCell group list may include first SCell group identifiers and, more specifically, may include lists to which SCell groups are added, from which SCell groups are released, or in which SCell groups are modified. In addition, in order to configure a plurality of second SCell groups when dormant SCell group configuration information is configured in cell configuration information 1*o*-23 and 1*o*-30 of the cell group configuration information 1*o*-11 of the RRC message, the second SCell group list may be configured, and the second SCell group list may include second SCell group identifiers and, more specifically, may include lists to which SCell groups are added, from which SCell groups are released, or in which SCell groups are modified.

The above-proposed methods may be applied by inserting the configuration information proposed in the first method, the second method, the third method, or the fourth method into the MAC layer device configuration information 1*o*-21, the PHY layer device configuration information 1*o*-21, or the bearer configuration information 1*o*-10.

Figure 16:
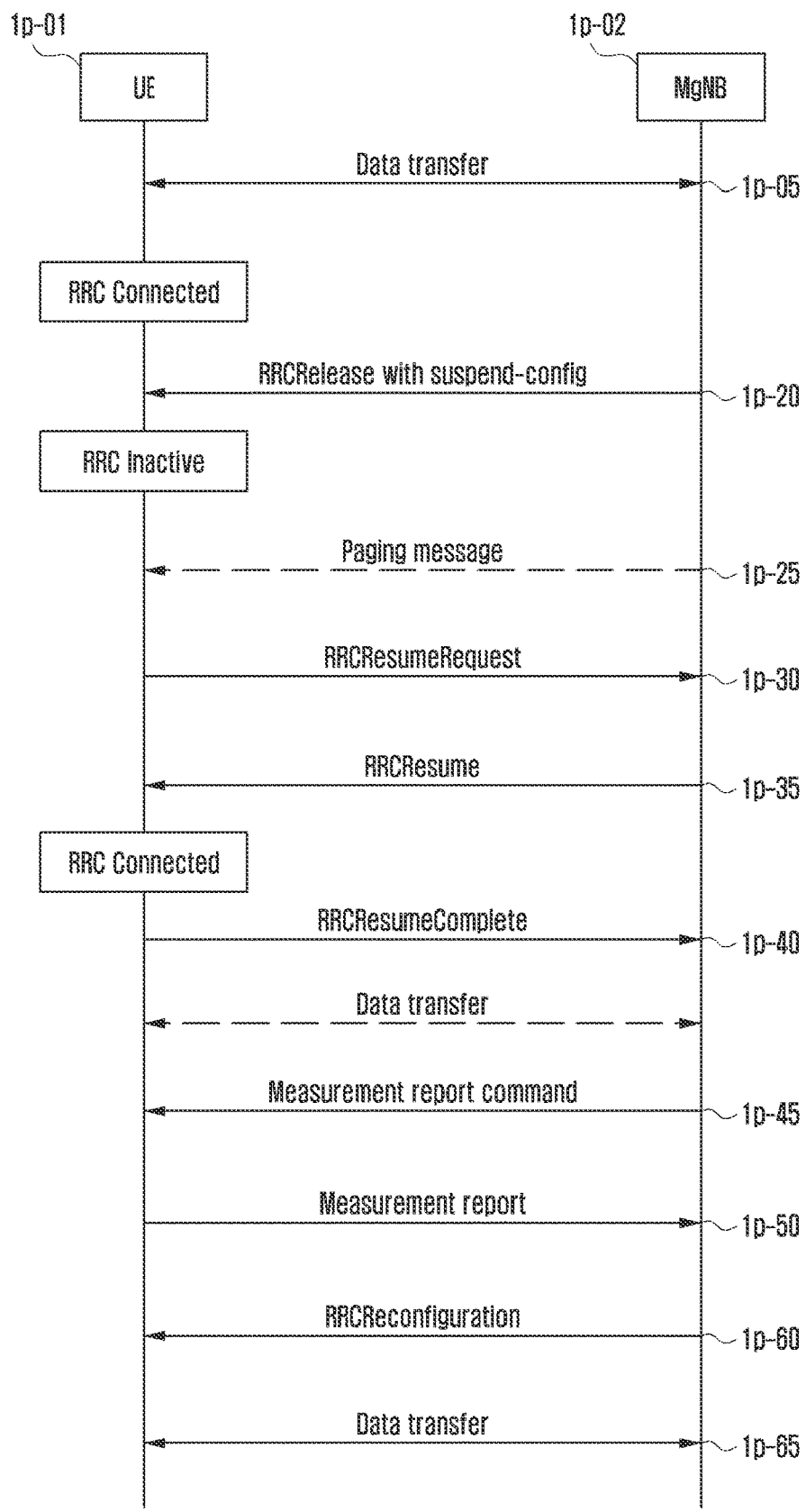
FIG. 16 illustrates a fifth embodiment obtained by expanding and applying the first embodiment, the second embodiment, the third embodiment, or the fourth embodiment proposed in the disclosure to the UE in an RRC-inactive mode.

FIG. 16 illustrates a fifth embodiment of expanding and applying the first embodiment, the second embodiment, the third embodiment, or the fourth embodiment proposed in the disclosure to the UE in an RRC-inactive mode.

The fifth embodiment proposes continuous storage of the SCell configuration information (for example, the configuration information described or proposed in FIG. 15) configured or stored for the first embodiment, the second embodiment, the third embodiment, or the fourth embodiment in the RRC-connected mode without releasing or discarding the SCell configuration information as illustrated in FIG. 6 even though the UE transitions to the RRC-inactive mode. Further, when performing an RRC connection resume procedure, the UE in the RRC-inactive mode proposes determining whether to discard, release, maintain and apply, or reconfiguring the stored SCell configuration information (for example, the configuration information described or proposed in FIG. 15) through an indicator of an RRCResume message or an RRCReconfiguration message transmitted by the gNB or through a reconfiguration procedure. When transmitting an RRCRelease message including a configuration or an indicator indicating transition of the UE to the RRC-inactive mode to the UE, the gNB may also transmit an indicator or configuration information indicating whether to discard, release, maintain and apply, or reconfigure the SCell configuration information (for example, the configuration information described or proposed in FIG. 15) stored in the RRCRelease message to the UE. When updating an RAN notification area (RNA) while moving in the RRC-inactive mode, the UE may receive and apply an indicator or configuration information indicating whether to discard, release, maintain and apply, or reconfigure the SCell configuration information (for example, the configuration information described or proposed in FIG. 15) stored in the RRCRelease message which the gNB transmits to the UE.

In the fifth embodiment proposed in the disclosure, the gNB may allow configuration of the first active BWP of downlink or uplink BWP configuration information of each cell as the dormant BWP in the SCell configuration information (for example, configuration information described or proposed in FIG. 15) of the RRC message and thus the UE may operate the downlink BWP or the uplink BWP of each SCell as the dormant BWP when the UE activates each SCell, so that battery consumption of the UE can be reduced.

In another method, in the fifth embodiment proposed in the disclosure, the gNB may not allow configuration of the first active BWP of BWP configuration information of the downlink or uplink of each cell as the dormant BWP in SCell configuration information (for example, the configuration information described or proposed in FIG. 15) of the RRC message to always activate the downlink BWP or the uplink BWP of each SCell as the first active BWP when the UE activates each SCell and switch the same to the dormant BWP or activate the same by the first embodiment, the second embodiment, the third embodiment, or the fourth embodiment proposed in the disclosure, thereby reducing battery consumption of the UE.

Further, the fifth embodiment proposed above may be expanded and applied to configuration information of each SCell of a master cell group (MCG) or a secondary cell group (SCG) of the UE in which the dual connectivity is configured. That is, SCell configuration information of the SCG may be stored when the UE transitions to the RRC-inactive mode, and an indicator or configuration information indicating whether to discard, release, maintain and apply, or reconfigure the stored SCell configuration information of the MCG or the SCG (for example, the configuration information described or proposed in FIG. 15) may be transmitted to the UE through the RRC message (for example, RRCResume, RRCReconfiguration, or RRCRelease) when the RRC connection resume procedure is performed or when the UE transitions to the RRC-inactive mode.

In FIG. 16, a UE 1p-01 may make a network connection with an MgNB 1p-02 and transmit and receive data in operation 1p-05. If the MgNB needs to transition the UE to the RRC-inactive mode for a predetermined reason, the MgNB may transmit an RRCRelease message 1p-20 to transition the UE to the RRC-inactive mode. The indicator or configuration information indicating whether to discard, release, maintain and apply, or reconfigure the stored SCell configuration information of the MCG or the SCG (for example, the configuration information described or proposed in FIG. 15) may be transmitted to the UE through the RRC message (for example, RRCRelease). In the case of the UE applying the dual connectivity, the MgNB may determine whether to stop and resume master cell group bearer configuration, RRC configuration information, or SCell configuration information of the MCG or the SCG, ask the gNB of the secondary cell about whether to stop and resume the secondary cell group bearer configuration and the RRC configuration information in order to determine whether to stop and resume the same, and receive a response to determine the same in operation 1p-15. Further, the MgNB may configure a list of frequencies which the UE measures in the RRC-idle mode or the RRC-inactive mode, frequency measurement configuration information, or a period during which the frequency is measured in the RRCRelease message.

When the UE in the RRC-inactive mode receives a paging message during movement in operation 1p-25, has a need to transmit uplink data, or has a need to update a RAN notification area, the UE may perform the RRC connection resumption procedure.

When the UE needs to configure the connection, the UE performs a random access procedure, and when an RRCResumeRequest message is transmitted to the MgNB, a proposed UE operation related to transmission of the message is described below in operation 1p-30.

1. The UE identifies system information and, when the system information indicates transmission of a complete UE connection resume identifier (I-RNTI or a full resume ID), prepares transmission by inserting the stored complete UE connection resume identifier (I-RNTI) into the message. If the system information indicates transmission of a truncated UE connection resume identifier (truncated I-RNTI or a truncated resume ID), the UE configures the stored complete UE connection resume identifier (I-RNTI) as the truncated UE connection resume identifier (truncated resume ID) through a predetermined method and prepares transmission by inserting the configured truncated UE connection resume identifier into the message.

2. The UE restores RRC connection configuration information and security context information from stored UE context.

3. The UE updates a new KgNB security key corresponding to a master cell group on the basis of a current KgNB security key, a NextHop (NH) value, and an NCC value received and stored in the RRCRelease message.

4. Upon receiving the SCG-counter value (or sk-counter) in the RRCRelease message, the UE updates a new SKgNB security key corresponding to the secondary cell group on the basis of the KgNB security key and the SCG-counter value (or sk-counter).

5. The UE induces new security keys (K_RRCenc, K_RRC_int, K_Upint, and K_Upenc) to be used in an integrity protection and verification procedure and an encryption and decryption procedure using the newly updated KgNB security key.

6. Upon receiving the SCG-counter value (or sk-counter) in the RRCRelease message, the UE induces new security keys (SK_RRCenc, SK_RRC_int, SK_Upint, and SK_Upenc) to be used in an integrity protection and verification procedure and an encryption and decryption procedure using the newly updated SKgNB security key corresponding to the secondary cell group.

7. The UE prepares transmission by calculating a MAC-I and inserting the same into the message.

8. The UE resumes SRB1 (The UE should resume SRB1 in advance since the UE will receive an RRCResume message through SRB1 in response to an RRCResumeRequest message to be transmitted).

9. The UE configures the RRCResumeRequest message and transmits the same to a lower layer device.

10. The UE resumes the integrity protection and verification procedure by applying the updated security keys and a previously configured algorithm to all bearers (MCG terminated RBs) except for SRB0 corresponding to the master cell group and then apply integrity verification and protection to transmitted and received data (This is to increase reliability and security of data transmitted and received from SRB1 or DRBs).

11. The UE resumes the encryption and decryption procedure by applying the updated security keys and a previously configured algorithm to all bearers (MCG terminated RBs) except for SRB0 corresponding to the master cell group and then apply encryption and decryption to transmitted and received data (This is to increase reliability and security of data transmitted and received from SRB1 or DRBs).

12. Upon receiving the SCG-counter value (or sk-counter) in the RRCRelease message, the UE resumes the integrity protection and verification procedure by applying the updated security keys and a previously configured algorithm to all bearers (SCG terminated RBs) corresponding to the secondary cell group and then apply integrity protection and verification to transmitted and received data (This is to increase reliability and security of data transmitted and received from DRBs in the future).

13. Upon receiving the SCG-counter value (or sk-counter) in the RRCRelease message, the UE resumes the encryption and decryption procedure by applying the updated security keys and a previously configured algorithm to all bearers (SCG terminated RBs) corresponding to the secondary cell group and then apply encryption and decryption to transmitted and received data (This is to increase reliability and security of data transmitted and received from DRBs in the future).

The UE operation proposed when the UE has a need to configure the connection, performs a random access procedure, transmits an RRCResumeRequest message to the MgNB, and receives an RRCResume message in response thereto is described below in operation 1p-35. If the RRCResume message includes an indicator indicating a report on an effective frequency measurement result measured in the RRC-inactive mode to the UE, the UE may configure the frequency measurement result in an RRCResumeComplete message and report the same. Further, the MgNB may insert an indicator or configuration information indicating whether to discard, release, maintain and apply, or reconfigure SCell configuration information of the MCG or SCG (for example, the configuration information described or proposed in FIG. 15) stored in the UE into the RRC message (for example, RRCResume) and transmit the same to the UE.

1. Upon receiving the message, the UE restores a PDCP state corresponding to the master cell group, resets a count value, and reestablishes PDCP layer devices of SRB2 corresponding to the master cell group and all DRBs (MCG terminated RBs).

2. Upon receiving an SCG-counter value (or sk-counter) in the message, the UE updates a new SKgNB security key corresponding to a secondary cell group on the basis of the KgNB security key and the SCG-counter value (or sk-counter). Further, the UE induces new security keys (SK_RRCenc, SK_RRC_int, SK_Upint, and SK_Upenc) to be used in an integrity protection and verification procedure and an encryption and decryption procedure using the newly updated SKgNB security key corresponding to the second cell group.

3. If the message includes master cell group (masterCellgroup) configuration information, A. the master cell group configuration information included in the message is executed and applied. The master cell group information may contain configuration information of RLC layer devices belonging to the master cell group, a logical channel identifier, and a bearer identifier.

4. If the message includes bearer configuration information (radioBearerConfig), A. the bearer configuration information (radioBearerConfig) included in the message may be executed and applied. The bearer configuration information (radioBearerConfig) may contain configuration information of PDCP layer devices for respective bearers, configuration information of SDAP layer devices, a logical channel identifier, and a bearer identifier.

5. If the message includes secondary cell group (masterCellgroup) configuration information, A. the second cell group configuration information included in the message may be executed and applied. The secondary cell group information may contain configuration information of RLC layer devices belonging to the second cell group, a logical channel identifier, and a bearer identifier.

6. If the message includes secondary bearer configuration information (radioBearerConfig), A. the secondary bearer configuration information (radioBearerConfig) included in the message may be executed and applied. The secondary bearer configuration information (radioBearerConfig) may contain configuration information of PDCP layer devices for respective secondary bearers, configuration information of SDAP layer devices, a logical channel identifier, and a bearer identifier.

7. The UE resumes SRB2 corresponding to the master cell group and all DRBs (MCG terminated RBs).

8. If the message includes frequency measurement configuration information (measConfig), A. the frequency measurement configuration information included in the message is executed and applied. That is, the frequency measurement may be performed according to the configuration.

9. The UE transitions to the RRC-connected mode.

10. The UE indicates resumption of the RRC connection, which has been suspended, to a higher layer device.

11. The UE configures an RRCResumeComplete message and transmits the same to a lower layer device in operation 1p-40.

When the UE has bearer configuration information and UE text information for the suspended secondary cell group, the UE may perform frequency measurement on the basis of frequency configuration information configured in system information, the RRCRelease message, or the RRCResume message and, when there is an effective result, insert an indicator indicating the result into the RRCResumeComplete message, and transmit the same. Upon receiving the indicator, the MgNB may instruct the UE to report the frequency measurement result in operation 1p-45 and receive a report on the frequency measurement result or receive the report on the frequency measurement result through the RRCResumeComplete message in operation 1p-50 when resumption of the carrier aggregation or the dual connectivity is needed. Upon receiving the frequency measurement result, the MgNB may ask the gNB of the secondary cell about whether to resume bearer information for the suspended secondary cell group, receive a response thereto, determine whether to resume, transmit an RRCReconfiguation message to the UE, and indicate whether to resume or release bearers for the second cell group. Further, the MgNB may insert an indicator or configuration information indicating whether to discard, release, maintain and apply, or reconfigure SCell configuration information of the MCG or SCG (for example, the configuration information described or proposed in FIG. 15) stored in the UE into the RRC message (for example, RRCReconfiguration) and transmit the same to the UE.

In the fifth embodiment proposed in FIG. 16 of the disclosure, the MgNB may allow configuration of the first active BWP of downlink or uplink BWP configuration information of each cell as the dormant BWP in the SCell configuration information (for example, configuration information described or proposed in FIG. 15) of the RRC message (for example, RRCRelease, RRCResume, or RRCReconfiguration) and thus the UE may operate the downlink BWP or the uplink BWP of each SCell as the dormant BWP when the UE activates each SCell, so that battery consumption of the UE can be reduced. For example, when the SCell state is configured as an activated state in the SCell configuration information of the RRC message (for example, RRCRelease, RRCResume, or RRCReconfiguration) or an indication indicating activation of the SCell is received through the MAC control information proposed in the disclosure, the SCell may be activated and the downlink BWP or the uplink BWP of the SCell may be activated as the dormant BWP when the SCell is activated, thereby saving the battery of the UE. In another method, in the fifth embodiment proposed in the disclosure, the MgNB may not allow configuration of the first active BWP of BWP configuration information of the downlink or uplink of each cell as the dormant BWP in SCell configuration information (for example, the configuration information described or proposed in FIG. 15) of the RRC message to always activate the downlink BWP or the uplink BWP of each SCell as the first active BWP when the UE activates each SCell and switch the same to the dormant BWP or activate the same by the first embodiment, the second embodiment, the third embodiment, or the fourth embodiment proposed in the disclosure, thereby reducing battery consumption of the UE.

When the UE in the RRC-inactive mode transitions to the RRC-connected mode and the SCell configuration information proposed in the disclosure is restored, applied, or reconfigured, BWPs may be switched or activated, or the dormant BWP may be activated or applied for each activated SCell according to the first embodiment, the second embodiment, the third embodiment, or the fourth embodiment proposed in the disclosure. Further, the firth embodiment may be expanded and applied when a handover is performed.

An embodiment of a detailed operation related to a BWP of a MAC layer device and a BWP inactivity timer according to the first embodiment, the second embodiment, or the third embodiment of the disclosure is described below, and the BWP inactivity timer starts or restarts only when a default BWP is configured and a BWP instructed to be BWP-switched is not a dormant BWP or not the default BWP or when the default BWP is not configured and a BWP instructed to be BWP-switched is not the dormant BWP or not an initial BWP.

If the MAC layer device receives an indication of a PDCCH for switching of a BWP of a serving cell (PCell, PSCell, or SCell), the MAC layer device operates with respect to a serving cell in which a BWP inactivity timer is configured as follows.

1> If the PDCCH for the BWP switching indication is received and the MAC layer device switches the downlink active BWP according to the indication,
    2> If a downlink default BWP identifier (defaultDownlinkBWP-Id) is configured and the MAC layer device switches to a BWP which is not instructed by the downlink default BWP identifier or a downlink dormant BWP,
    2> If a downlink default BWP identifier (defaultDownlinkBWP-Id) is not configured and the MAC layer device switches to a BWP which is not a downlink initial BWP or a downlink dormant BWP,
        3> A BWP inactivity timer (bwp-InactivityTimer) for the downlink active BWP starts or restarts.

Another embodiment of the detailed operation related to the BWP of the MAC layer device and the BWP inactivity timer according to the first embodiment, the second embodiment, or the third embodiment of the disclosure is described below, and the BWP inactivity timer starts or restarts only when the switched and activated BWP is not the dormant BWP.

If the MAC layer device receives an indication of a PDCCH for switching of a BWP of a serving cell (PCell, PSCell, or SCell), the MAC layer device operates with respect to a serving cell in which a BWP inactivity timer is configured as follows.

1> If the PDCCH for the BWP switching indication is received and the MAC layer device switches the downlink active BWP according to the indication,
    2> If a downlink default BWP identifier (defaultDownlinkBWP-Id) is configured and the MAC layer device switches to a BWP which is not instructed by the downlink default identifier,
    2> If a downlink default BWP identifier (defaultDownlinkBWP-Id) is not configured and the MAC layer device switches to a BWP which is not a downlink initial BWP,
        3> if the switched and activated downlink BWP is not the dormant BWP or not the BWP indicated by the dormant BWP identifier,
            4> a BWP inactivity timer (bwp-InactivityTimer) for the downlink active BWP starts or restarts.

Another embodiment of the detailed operation related to an uplink BWP when a downlink BWP when the downlink BWP of the MAC layer device is switched to a dormant BWP according to the first embodiment, the second embodiment, or the third embodiment of the disclosure is described below, and an active uplink BWP is deactivated or hibernated when the downlink BWP is switched to the dormant BWP. This is because the PDCCH is not monitored and data transmission/reception is not performed in the dormant BWP and thus the uplink BWP is not used.

If the MAC layer device receives the indication of the PDCCH for switching of the BWP of the serving cell (PCell, PSCell, or SCell), 1> If there is no random access procedure which is being performed by the serving cell,
1> Alternatively, if a random access procedure which is being performed by the serving cell is successfully completed when the PDCCH indicated by the C-RNTI is received,
    2> the UE switches the current BWP of the serving cell to a BWP indicated by the PDCCH.

2> if the BWP indicated by the PDCCH is a downlink BWP having the same BWP identifier as a downlink dormant BWP identifier or if the switched and activated BWP is a downlink dormant BWP,
3> an active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.
3> if a BWP activation timer related to the active downlink BWP is being driven in the current serving cell, the BWP activation timer is stopped. This is to prevent automatic switching and activation of the dormant BWP to the default BWP (battery consumption due to PDCCH monitoring). If the default BWP is configured as the dormant BWP, the above problem may be prevented.
3> in another method, if the cell inactivity timer is being driven, the cell inactivity timer may be stopped. The operation is applied to prevent cell deactivation of the dormant BWP due to expiration of the cell timer and automatic deactivation of the dormant BWP.

Another embodiment of the detailed operation related to the uplink BWP when the downlink BWP of the MAC layer device is a dormant BWP but the downlink BWP is switched to a normal BWP instead of the dormant BWP according to embodiment 1, embodiment 2, or embodiment 3 is described below, and the uplink BWP is switched and activated to a first active BWP when the downlink BWP is switched from the dormant BWP to the normal BWP.

If the MAC layer device receives the indication of the PDCCH for switching of the BWP of the serving cell (PCell, PSCell, or SCell),
1> If there is no random access procedure which is being performed by the serving cell,
1> Alternatively, if a random access procedure which is being performed by the serving cell is successfully completed when the PDCCH indicated by the C-RNTI is received,
2> the UE switches the current BWP of the serving cell to a BWP indicated by the PDCCH.
2> if the BWP indicated by the PDCCH is a downlink BWP having the same BWP identifier as a downlink dormant BWP identifier or if the switched and activated BWP is a downlink dormant BWP,
3> an active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.
3> if a BWP activation timer related to the active downlink BWP is being driven in the current serving cell, the BWP activation timer is stopped. This is to prevent automatic switching and activation of the dormant BWP to the default BWP (battery consumption due to PDCCH monitoring). If the default BWP is configured as the dormant BWP, the above problem may be prevented.
3> in another method, if the cell inactivity timer is being driven, the cell inactivity timer may be stopped. The operation is applied to prevent cell deactivation of the dormant BWP due to expiration of the cell timer and automatic deactivation of the dormant BWP.
2> if the active downlink BWP (for example, previous downlink BWP) is a dormant BWP or is a BWP indicated by a dormant BWP identifier,
2> if a BWP indicated by the PDCCH is a BWP having a BWP identifier which is not the same as the dormant BWP identifier or if the switched and activated downlink BWP according to the indication of the PDCH is not the dormant BWP,
3> the uplink BWP of the current serving cell is activated to an uplink BWP indicated by a first active BWP identifier or a first active BWP.

Another embodiment of the detailed operation related to the uplink BWP when the downlink BWP of the MAC layer device is a dormant BWP but the downlink BWP is switched to a normal BWP instead of the dormant BWP according to embodiment 1, embodiment 2, or embodiment 3 is described below, and the uplink BWP is switched to an uplink BWP having the same BWP identifier as a BWP identifier indicated by the PDCCH and activated when the downlink BWP is switched from the dormant BWP to the normal BWP.

If the MAC layer device receives the indication of the PDCCH for switching of the BWP of the serving cell (PCell, PSCell, or SCell),
1> if there is no random access procedure which is being performed by the serving cell,
1> alternatively, if a random access procedure which is being performed by the serving cell is successfully completed when the PDCCH indicated by the C-RNTI is received,
2> the UE switches the current BWP of the serving cell to a BWP indicated by the PDCCH.
2> if the BWP indicated by the PDCCH is a downlink BWP having the same BWP identifier as a downlink dormant BWP identifier or if the switched and activated BWP is a downlink dormant BWP,
- 3> an active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.
- 3> if a BWP activation timer related to the active downlink BWP is being driven in the current serving cell, the BWP activation timer is stopped. This is to prevent automatic switching and activation of the dormant BWP to the default BWP (battery consumption due to PDCCH monitoring). If the default BWP is configured as the dormant BWP, the above problem may be prevented.
- 3> in another method, if the cell inactivity timer is being driven, the cell inactivity timer may be stopped. The operation is applied to prevent cell deactivation of the dormant BWP due to expiration of the cell timer and automatic deactivation of the dormant BWP.
- 2> if the active downlink BWP (for example, previous downlink BWP) is a dormant BWP or is a BWP indicated by a dormant BWP identifier,
- 2> if a BWP indicated by the PDCCH is a BWP having a BWP identifier which is not the same as the dormant BWP identifier or if the switched and activated downlink BWP according to the indication of the PDCCH is not the dormant BWP,
  - 3> the uplink BWP of the current serving cell is activated to an uplink BWP having the same BWP identifier as a BWP identifier indicated by the PDCCH or an uplink BWP having the same BWP identifier as a BWP identifier of the current downlink BWP.

Another embodiment of the detailed operation related to the uplink BWP when the downlink BWP of the MAC layer device is a dormant BWP but the downlink BWP is switched to a normal BWP which is not the dormant BWP according to the first embodiment, the second embodiment, or the third embodiment is described below, and the uplink BWP is switched and activated to an uplink BWP activated when a previous downlink BWP is switched to the dormant BWP or a last activated uplink BWP if the downlink BWP is switched from the dormant BWP to the normal BWP.

If the MAC layer device receives the indication of the PDCCH for switching of the BWP of the serving cell (PCell, PSCell, or SCell),

- 1> if there is no random access procedure which is being performed by the serving cell,
- 1> alternatively, if a random access procedure which is being performed by the serving cell is successfully completed when the PDCCH indicated by the C-RNTI is received,
  - 2> the UE switches the current BWP of the serving cell to a BWP indicated by the PDCCH.
  - 2> if the BWP indicated by the PDCCH is a downlink BWP having the same BWP identifier as a downlink dormant BWP identifier or if the switched and activated BWP is a downlink dormant BWP,
    - 3> an active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.
    - 3> if a BWP activation timer related to the active downlink BWP is being driven in the current serving cell, the BWP activation timer is stopped. This is to prevent automatic switching and activation of the dormant BWP to the default BWP (battery consumption due to PDCCH monitoring). If the default BWP is configured as the dormant BWP, the above problem may be prevented.
    - 3> in another method, if the cell inactivity timer is being driven, the cell inactivity timer may be stopped. The operation is applied to prevent cell deactivation of the dormant BWP due to expiration of the cell timer and automatic deactivation of the dormant BWP.
  - 2> if the active downlink BWP (for example, previous downlink BWP) is a dormant BWP or is a BWP indicated by a dormant BWP identifier,
  - 2> if a BWP indicated by the PDCCH is a BWP having a BWP identifier which is not the same as the dormant BWP identifier or if the switched and activated downlink BWP according to the indication of the PDCCH is not the dormant BWP,
    - 3> the uplink BWP of the current serving cell is activated to an uplink BWP activated when a previous downlink BWP is switched to the dormant BWP or a last activated uplink BWP.

Another embodiment for the detailed operation depending on the cell state (active state or inactive state) of the MAC layer device according to the first embodiment, the second embodiment, or the third embodiment of the disclosure is described below.

If an indication indicating deactivation of a serving cell (PCell or SCell) is received through a MAC CE or an RRC message or if a cell inactivity timer has been configured and has expired, one or a plurality of operations among the following operations may be performed.

The downlink or uplink BWP is deactivated or hibernated.

The cell inactivity timer configured or driven in the cell or BWP is stopped.

If the BWP inactivity timer configured for the BWP of the cell is being driven, the BWP inactivity timer is stopped. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the active state to the dormant state. This is because there is no information on periodic transmission resources activated or indicated through L1 signaling when the BWP is transitioned from the inactive state to the dormant state. In another method, the periodic transmission resources may be released only when the periodic downlink transmission resources or the periodic uplink transmission resources are configured or when the transmission resources are configured and used.

The periodic uplink transmission resources (configured uplink grant type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant Type 1), may be performed only when the BWP transitions from the active state to the dormant state. This is because periodic transmission resources are not used when the BWP is transitioned from the inactive state to the dormant state. In another method, the periodic transmission resources may be released only when the periodic downlink transmission resources or the periodic uplink transmission resources are configured or when the transmission resources are configured and used.

All HARQ buffers configured in the uplink or downlink BWP are emptied.

The UE does not transmit an SRS for the uplink BWP of the cell.

Uplink data is not transmitted through a UL-SCH in the BWP of the cell.

A random access procedure is not performed for the BWP of the cell.

The UE does not monitor a PDCCH in the BWP of the cell.

The UE does not monitor a PDCCH for the BWP of the cell. However, in the case of cross-scheduling, if the dormant BWP is configured in the cell, an indication may be received through monitoring of a PDCCH for the cell (for example, SCell) in the scheduled cell (for example, PCell).

PUCCH or SPUCCH transmission is not performed in the BWP of the cell.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a dormant BWP (for example, a downlink BWP) to an active BWP (or a BWP which is not the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

If the current downlink BWP (or the BWP configured as the first active BWP (downlink or uplink)) of the serving cell is not the dormant BWP or if the serving cell was previously in an inactive state and is activated by the indication of the MAC CE, the uplink or downlink BWP is switched to a predetermined BWP (for example, an downlink or uplink first active BWP) and the BWP is activated.

If the current downlink BWP (or the first active BWP) of the serving cell is not the dormant BWP or if the serving cell was previously in an inactive state and is activated by the indication of the MAC CE, a sounding reference signal (SRS) is transmitted to enable the gNB to perform channel measurement for the uplink in the activated BWP. For example, the SRS may be periodically transmitted If the current downlink BWP (or the first active BWP) of the serving cell is not the dormant BWP or if the serving cell was previously in an inactive state and is activated by the indication of the MAC CE, a PUCCH is transmitted if the PUCCH is configured in the activated BWP.

If the current downlink BWP (or the first active BWP) of the serving cell is not the dormant BWP or if the serving cell was previously in an inactive state and is activated by the indication of the MAC CE, a BWP or cell inactivity timer starts or restarts. In another method, the BWP or cell inactivity timer may start or restart only when a BWP or cell hibernation timer is not configured. If the BWP or cell hibernation timer can be configured through the RRC message, the BWP or the cell may be hibernated when the timer expires. For example, the BWP or cell inactivity timer may start or restart only in the hibernated BWP or cell.

If the current downlink BWP (or the first active BWP) of the serving cell is not the dormant BWP or if the serving cell was previously in an inactive state and is activated by the indication of the MAC CE, stored type 1 transmission resources may be initialized as original and used when there are suspended type 1 configuration transmission resources. The type 1 configuration transmission resources are periodic (uplink or downlink) transmission resources pre-allocated through an RRC message, which can be used after being activated through the RRC message.

If the current downlink BWP (or the first active BWP) of the serving cell is not the dormant BWP or if the serving cell was previously in an inactive state and is activated by the indication of the MAC CE, a PHR for the BWP is triggered.

The UE may report a channel measurement result (CSI, CQI, PMI, RI, PTI, or CRI) for the downlink in the activated BWP according to a configuration of the gNB.

If the current downlink BWP (or the first active BWP) of the serving cell is not the dormant BWP or if the serving cell was previously in an inactive state and is activated by the indication of the MAC CE, a PDCCH is monitored to read an indication of the gNB in the activated BWP.

If the current downlink BWP (or the first active BWP) of the serving cell is not the dormant BWP or if the serving cell was previously in an inactive state and is activated by the indication of the MAC CE, a PDCCH is monitored to read cross-scheduling for the activated BWP.

If the current downlink BWP (or the first active BWP) of the serving cell is not the dormant BWP or if the serving cell was previously in an inactive state and is activated by the indication of the MAC CE, a BWP inactivity timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If the current downlink BWP (or the first active BWP) of the serving cell is not the dormant BWP or if the serving cell was previously in an inactive state and is activated by the indication of the MAC CE, and if a link BWP hibernation timer is configured for the BWP, the BWP hibernation timer may start or restart for the BWP.

Further, in the embodiment of the disclosure, when the gNB triggers a random access procedure for the SCell, the gNB does not indicate BWP switching of the downlink BWP to the dormant BWP. This is because the uplink BWP is deactivated when switching to the downlink dormant BWP is performed and thus the random access procedure cannot be successfully performed.

The operation related to switching of the normal BWP (for example, a BWP which is not the dormant BWP) or the dormant BWP is performed when the cell (for example, SCell) operating the BWP is in an active state in the embodiment of the disclosure. Accordingly, when MAC control information (MAC control element (MAC CE)) including an indication indicating activation or deactivation of the cell is received, the indication may be ignored if the cell operates a downlink dormant BWP and receives the MAC CE including the indication indicating activation of the cell, and the downlink dormant BWP of the cell may be deactivated if the cell operates the downlink dormant BWP and receives the MAC CE including the indication indicating deactivation of the cell. In another method, in the embodiment of the disclosure, if a cell inactivity timer is running when the downlink BWP is switched to the dormant BWP, the cell inactivity timer may be suspended. The operation is applied to prevent cell deactivation of the dormant BWP due to expiration of the cell timer and automatic deactivation of the dormant BWP.

The fourth embodiment for operating state transition in units of BWPs and the operation according thereto is described below.

In the fourth embodiment of the disclosure, a dormant BWP is configured by an indicator or a BWP identifier when a plurality of BWPs are configured in the UE for each cell through the RRC message as illustrated in FIG. 6. When the gNB transmits the MAC CE including the indication indicating deactivation of a specific cell to the UE and a dormant BWP is configured in the cell, the UE deactivates the specific cell and perform switching to the dormant BWP according to the indication of the MAC CE. The UE monitors no PDCCH and perform no data transmission/reception in the dormant BWP of the specific cell, but transmits a channel measurement report so as to reduce UE battery consumption and enable rapid BWP activation. When there is a need to transmit and receive data for the inactive cell switched to the dormant BWP, the gNB may transmit the MAC CE including an indication indicating activation of a specific cell to the UE. When the UE receives the MAC CE, the UE may activate the specific cell, and perform switching and activation to a first active BWP. The UE may monitor the PDCCH and start data transmission/reception again in the switched BWP. However, when deactivation of a specific call is indicated through the RRC message in the fourth embodiment of the disclosure, all BWPs are deactivated even though a dormant BWP is configured in the specific cell. Upon receiving an indication indicating deactivation of the cell through the MAC CE for the deactivated cell through the RRC message, the UE may activate the dormant BWP, perform an operation in the dormant BWP, and start a channel measurement report if the dormant BWP is configured for the cell.

In the fourth embodiment of the disclosure, the cell in the inactive state operates or uses the dormant BWP. Further, in the fourth embodiment of the disclosure, switching the BWP to the dormant BWP indicates switching of the downlink BWP. This is because the operation of not monitoring the PDCCH and the operation of reporting the channel measurement are operations for the downlink BWP of the cell by the UE.

In the fourth embodiment of the disclosure, for the state of the cell (for example, SCell), the activated state or the deactivated state is maintained and operated and the state transition between states is supported. For the state of the BWP, the activated state, the dormant state, or the deactivated state is maintained and operated and the state transition between BWPs or switching between BWPs is performed according to the cell state.

An embodiment of the detailed operation depending on the cell state (active state or inactive state) of the MAC layer device according to the fourth embodiment of the disclosure is described below.

If the UE receives an indication of the operation as the dormant BWP for the serving cell (PCell or SCell), if the UE receives an indication indicating deactivation of the cell through a MAC CE or an RRC message, if the UE receives an indication indicating switching of a BWP (for example, a downlink BWP) to a dormant BWP through DCI of a PDCCH (L1 control signal), a MAC CE, or an RRC message, or if a cell deactivation timer was configured and has expired, one or a plurality of following operations may be performed.

If the dormant BWP is configured in the serving cell, the downlink BWP is switched to a BWP indicated by a dormant BWP identifier. Alternatively, the BWP is hibernated.

The uplink BWP is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

The cell deactivation timer configured or driven in the cell or BWP is stopped.

If the BWP deactivation timer configured for the BWP of the cell is being driven, the BWP deactivation timer is stopped. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the active state to the dormant state. This is because there is no information on periodic transmission resources activated or indicated through L1 signaling when the BWP is transitioned from the deactivated state to the dormant state. In another method, the periodic transmission resources may be released only when the periodic downlink transmission resources or the periodic uplink transmission resources are configured or when the transmission resources are configured and used.

The periodic uplink transmission resources (configured uplink grant type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant Type 1), may be performed only when the BWP transitions from the active state to the dormant state. This is because periodic transmission resources are not used when the BWP is transitioned from the deactivated state to the dormant state. In another method, the periodic transmission resources may be released only when the periodic downlink transmission resources or the periodic uplink transmission resources are configured or when the transmission resources are configured and used.

All HARQ buffers configured in the uplink or downlink BWP are all emptied.

The UE does not transmit an SRS for the uplink BWP of the cell.

If the dormant BWP is configured in the cell, the UE measures a channel (CSI, CQI, PMI, RI, PTI, or CRI) for the downlink in the dormant BWP according to the configuration of the gNB and reports the measurement. For example, the UE may periodically report the channel or frequency measurement.

Uplink data is not transmitted through a UL-SCH in the BWP of the cell.

A random access procedure is not performed for the BWP of the cell.

The UE does not monitor a PDCCH in the BWP of the cell.

The UE does not monitor a PDCCH for the BWP of the cell. However, in the case of cross-scheduling, if the dormant BWP is configured in the cell, an indication may be received through monitoring of a PDCCH for the cell (for example, SCell) in the scheduled cell (for example, PCell).

PUCCH or SPUCCH transmission is not performed in the BWP of the cell.

If the dormant BWP is configured in the cell, the downlink BWP may be hibernated, and a channel measurement may be performed and reported. Further, an uplink BWP of the cell may be deactivated and not used. This is because the channel is measured only for the downlink BWP in the dormant state SCell and the measurement result is reported to the uplink BWP of the SpCell (PCell or PSCell) or the SCell in which there is a PUCCH.

The UE operation for the active BWP (active Band Width Part) according to the disclosure is described below.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a BWP (for example, a downlink BWP) to an active BWP (or a BWP other than the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

Switching and activation to the indicated uplink or downlink BWP is performed. Alternatively, the uplink or downlink BWP is switched to a predetermined BWP (for example, an uplink or uplink first active BWP), and the BWP is activated.

A sounding reference signal (SRS) is transmitted to allow the gNB to measure a channel for the uplink in the activated BWP. For example, the SRS may be periodically transmitted.

If a PUCCH is configured in the activated BWP, the PUCCH is transmitted.

A BWP or cell deactivation timer starts or restarts. In another method, the BWP or cell deactivation timer may start or restart only when a BWP or cell hibernation timer is not configured. If the BWP or cell hibernation timer can be configured through the RRC message, the BWP or the cell may be hibernated when the timer expires. For example, the BWP or cell inactivity timer may start or restart only in the hibernated BWP or cell.

If there are suspended type 1 configuration transmission resources, stored type 1 transmission resources may be initialed as original and used. The type 1 configuration transmission resources are periodic (uplink or downlink) transmission resources preallocated through an RRC message, which can be used after being activated through the RRC message.

A PHR for the BWP is triggered.

The UE may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross-scheduling in the activated BWP.

The BWP inactivity timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If a link BWP hibernation timer is configured for the BWP, the BWP hibernation timer may start or restart for the BWP.

In the disclosure, various embodiments may be configured and operated by combining or expanding the first embodiment, the second embodiment, the third embodiment, or the fourth embodiment of operating state transition in units of BWPs and the operation according thereto. For example, another fifth embodiment of operating the state transition in units of BWPs and the operation according thereto is described below.

In the fifth embodiment, a dormant BWP is configured by an indicator or a BWP identifier when a plurality of BWPs are configured in the UE for each cell through the RRC message as illustrated in FIG. 6. The gNB may indicate switching of the BWP for the cell in an activated state to the dormant BWP through DCI of the PDCCH which is L1 signaling and perform no PDCCH monitoring and no data transmission/reception in the dormant BWP but transmits a channel measurement report therein, thereby reducing UE battery consumption and enabling rapid BWP activation. The gNB may transmit DCI of the PDCCH which is L1 signaling in the cell (self-scheduling) or transmit the same in the PCell (cross-carrier scheduling) so as to indicate BWP switching.

When data transmission/reception for the activated cell switched to the dormant BWP is needed, the gNB may transmit a MAC CE including an indicator indicating activation of the cell to the UE, indicate switching of the dormant BWP for the cell in the activated state to a BWP (or an active BWP) which is not the dormant BWP among a plurality of BWPs configured through the RRC message, monitor a PDCCH again in the switched BWP, and start data transmission/reception.

If the gNB transmits a MAC CE including an indicator indicating deactivation of the cell to the UE, the UE may deactivate an uplink or downlink BWP of the specific cell and perform the deactivation operations proposed in the disclosure. In the fifth embodiment of the disclosure, the BWP is not operated or used in the cell in the inactive state. Further, in the fifth embodiment of the disclosure, if switching the BWP to the dormant BWP is an indication of switching a downlink BWP, switching the dormant BWP to the active BWP may act as a cell activation indicator of the MAC CE. Detailed operations for the cell state and the BWP switching operation may be implemented on the basis of the operation proposed in the first embodiment, the second embodiment, or the third embodiment of the disclosure.

As described above, various embodiments may be configured and operated by combining or expanding the first embodiment, the second embodiment, the third embodiment, the fourth embodiment, or the fifth embodiment of the disclosure FIG. 17 illustrates MAC control information indicating state transition to the active state, the dormant state, or the inactive state proposed in the disclosure.

The active and inactive MAC CE proposed in the disclosure is an embodiment and may have the format illustrated in FIG. 17, and may be divided into a MAC CE format 1*q*-05 having the size of 1 byte supporting 7 SCells and a MAC CE format 1*q*-10 having the size of 4 bytes supporting 31 SCells. Further, the MAC CEs have the following characteristics.

In the case in which a dormant MAC CE is not received and only active and inactive MAC CEs are received, the UE operates as described below:
If each field of the active and inactive MAC CEs indicates each SCell identifier, a value corresponding to each field indicates whether the SCell is activated or deactivated. If a value of the indicator for the SCell indicated by the SCell identifier is 1, the SCell is activated when the state of the SCell is the inactive state. However, if the state of the SCell is a state other than the inactive state, the indicator value is ignored. If a value of the indicator for the SCell indicated by the SCell identifier is 0, the SCell is deactivated. That is, if the value of the indicator for the SCell is 0, the SCell may be deactivated regardless of the state of the SCell.

The dormant MAC CE proposed in the disclosure is an embodiment and may have the format illustrated in FIG. 17, and may be divided into a MAC CE format 1*q*-05 having the size of 1 byte supporting 7 SCells and a MAC CE format 1*q*-05 having the size of 4 bytes supporting 31 SCells. Further, the MAC CEs have the following characteristics.

In the case in which the active and inactive MAC CEs are not received and only the dormant MAC CE is received, the UE operates as described below:

If each field of the dormant MAC CE indicates an SCell identifier, a value corresponding to each field may indicate whether the SCell is activated or deactivated. If a value of an indicator for the SCell indicated by the SCell identifier is 1, the SCell is hibernated. That is, the SCell may be made to hibernate if the value of the indicator for the SCell is 1 regardless of the state of the SCell. If the value of the indicator for the SCell indicated by the SCell identifier is 0, the SCell is activated when the state of the SCell is the dormant state. However, if the state of the SCell is a state other than the dormant state, the indicator value is ignored.

In the case in which the active and inactive MAC CEs and the dormant MAC CE are simultaneously received by one MAC layer device, the UE operation is described below.

If each field of the active and inactive MAC CEs and the dormant MAC CE indicates an SCell identifier, a combination of values corresponding to the fields may indicate state transition of the SCell to the active, dormant, or inactive state. For the active and inactive MAC CEs and the dormant MAC CE, MAC CEs having the size of 1 byte or MAC CEs having the size of 4 bytes may be received together by one MAC layer device. If two types of MAC CEs are received together, the state transition of each SCell indicated by the MAC CE may be determined according to a combination of indication values of the MAC CEs as shown in the following table. However, the following table is only an embodiment of the disclosure.

TABLE 1

| Hibernation MAC control element Ci | Activation/Deactivation MAC control element Ci | SCell shall be |
|---|---|---|
| 0 | 0 | Deactivated |
| 0 | 1 | Activated |
| 1 | 0 | Reserved MAC control element combination |
| 1 | 1 | Dormant |

The active, inactive, and dormant states for each link may be indicated using an R field included in the format of the cell active and inactive MAC CEs or the cell dormant MAC CE proposed above. For example, when the R field is 0, it may indicate transition of the downlink of the cell to the activated, deactivated, or dormant state. When the R field is 1, it may indicate transition of the uplink of the cell to the activated, deactivated, or dormant state. In another method, the R field may be defined and used to indicate only the state transition of the downlink (or uplink). Further, the MAC CE including each cell identifier and each link indicator or state indicator may be defined as indicated by reference numeral 1q-15 to indicate state transition for each link of each cell.

In addition, a new MAC CE for supporting embodiments of the disclosure and expanding to various embodiments may be designed or the conventional MAC CE function may be expanded.

For example, the MAC CEs proposed and described in FIG. 17 of the disclosure may be applied, and the reserved bit (R bit) may be expanded as indicated by reference numeral 1q-05 or 1q-10 to expand or apply the function described with reference to FIG. 17 of the disclosure.

For example, when the reserved bit is configured as 0, a 1-bit indicator indicating an identifier of each cell (SCell) may be defined and used as follows.
  If the 1-bit indicator is configured as 0, state transition of the cell or BWP may be performed as follows.
    A cell or BWP in the inactive state is transitioned to the inactive state or is maintained
    A cell or BWP in the active state is transitioned to the inactive state
    A cell or BWP in the dormant state is transitioned to the inactive state
  If the 1-bit indicator is configured as 1, state transition of the cell or BWP may be performed as follows.
    A cell or BWP in the active state is transitioned to the active state or is maintained
    A cell or BWP in the inactive state is transitioned to the active state
    A cell or BWP in the dormant state is transitioned to the dormant state or is maintained
When the R bit is configured as 1, the 1-bit indicator indicating an identifier of each cell (SCell) may be defined and used as follows. In another method, a logical identifier may be newly defined and a new MAC CE may be defined and used as follows.
  If the 1-bit indicator is configured as 0, state transition of the cell or BWP may be performed as follows.
    A cell or BWP in the active state is transitioned to the active state or is maintained.
    A cell or BWP in the dormant state is transitioned to the active state
    A cell or BWP in the inactive state is transitioned to the inactive state or is maintained.
  If the 1-bit indicator is configured as 1, state transition of the cell or BWP may be performed as follows.
    A cell or BWP in the active state is transitioned to the dormant state
    A cell or BWP in the inactive state is transitioned to the dormant state
    A cell or BWP in the dormant state is transitioned to the dormant state or is maintained The MAC CE function described above by way of example may be variously expanded and designed to indicate state transition or switching of the cell or BWP and may be applied to the embodiments of the disclosure.

Figure 18:
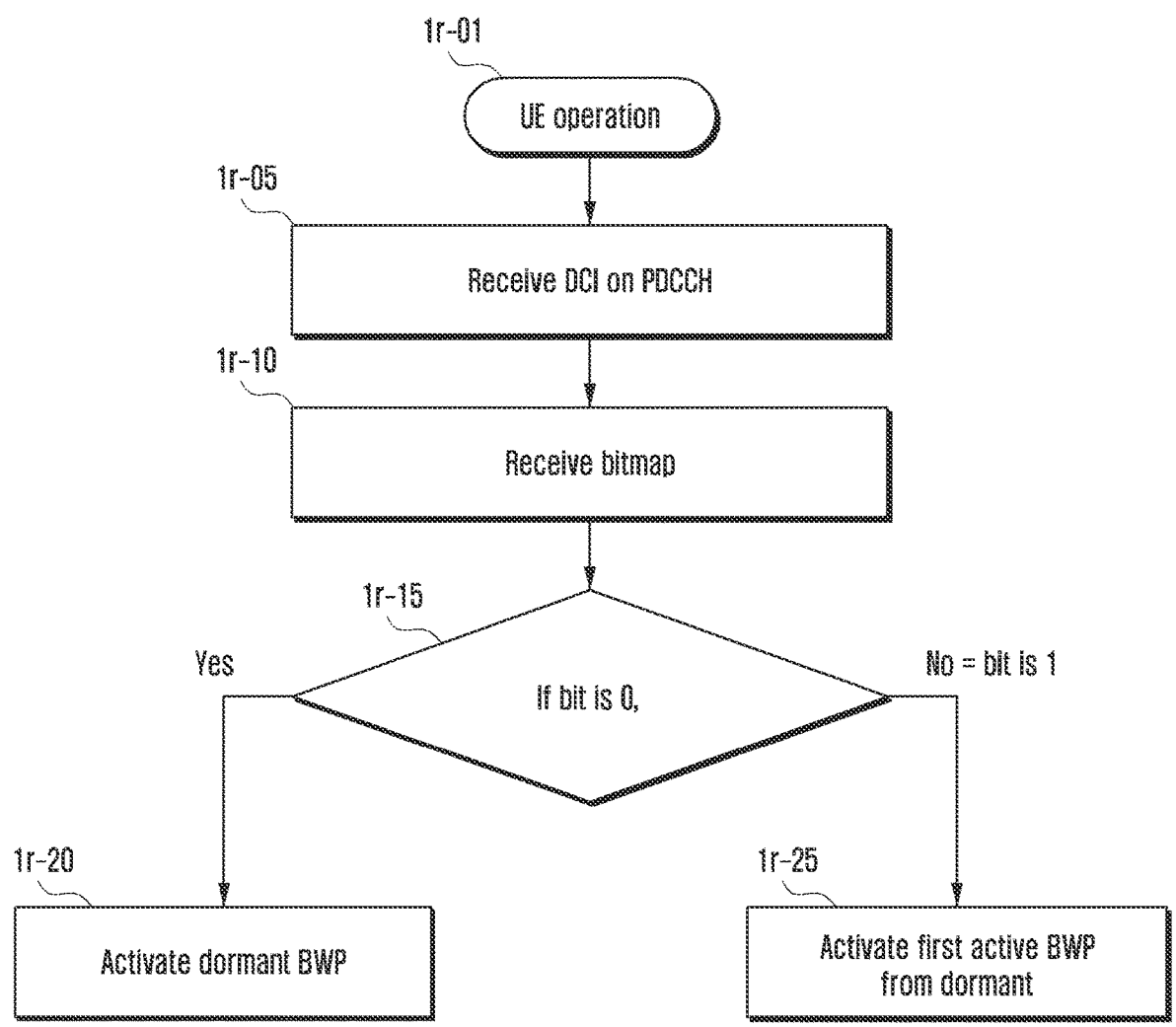
FIG. 18 illustrates the UE operation according to the first embodiment, the second embodiment, or the third embodiment proposed in the disclosure.

FIG. 18 illustrates the UE operation according to the first embodiment, the second embodiment, or the third embodiment proposed in the disclosure.

In the embodiments proposed in the disclosure, the UE may search for DCI of a PDCCH in a PCell or an SpCell in operation 1r-05 and identify a bitmap including an indication of switching or activation from a dormant BWP to a first active BWP from dormant proposed in the disclosure in the found DCI format in operation 1r-10.

The UE may identify each bit value in the bitmap in operation 1r-10. If the bit value of the bitmap is 0 in operation 1r-20, the bit value of 0 may indicate switching of each activated SCell corresponding to the bit, an SCell identifier, an activated SCell included in a first SCell group, or an activated SCell included in a second SCell group to a dormant BWP or activation of the dormant BWP (if the dormant BWP is configured or is included in the first SCell group or the second SCell group). In another method, when the bit value of the bitmap is 0, the bit value of 0 may indicate switching to the dormant BWP or activation of the dormant BWP if the dormant BWP is configured for each activated SCell corresponding to the bit, the activated SCell included in the first SCell group, or the activated SCell included in the second SCell group, if the dormant BWP is included in the first SCell group or the second SCell group, or if the activated BWP is not the dormant BWP (or if the activated BWP is a normal BWP). In another method, when the bit value of the bitmap is 0, the bit value of 0 may indicate switching of each activated SCell corresponding to the bit (having the dormant BWP configured therein or included in the first SCell group or the second SCell group), an SCell identifier, the activated SCell included in the first SCell group, or the activated SCell included in the second SCell group to the dormant BWP or activation of the dormant BWP. In another method, when the bit value of the bitmap is 0, the bit value of 0 may indicate switching of each activated SCell corresponding to the bit, the SCell identifier, the activated SCell included in the first SCell group, or the activated SCell included in the second SCell group to the dormant BWP or activation of the dormant BWP. If the bit of the bitmap indicates the SCell in which no dormant BWP is configured or the SCell identifier, the UE may ignore the bit, or not read or apply the bit.

The UE may identify each bit value in the bitmap in operation 1r-10. If the bit value of the bitmap is 1 in operation 1r-25, the bit value of 1 may indicate switching of each activated SCell corresponding to the bit, an activated SCell included in a first SCell group, or an activated SCell included in a second SCell group to a normal BWP (for example, a first active BWP that is activated from a dormant state) or activation of the normal BWP (for example, a first active BWP that is activated from a dormant state). In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit, the activated SCell included in the first SCell group, or the activated SCell included in the second SCell group is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP that is activated from the dormant state) for each activated SCell corresponding to the bit, the activated SCell included in the first SCell group, or the activated SCell included in the second SCell group, switching or activation to the normal BWP (for example, the first active BWP that is activated from the dormant state), or maintenance, continuous use, application, or activation of the current active BWP. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit, the activated SCell included in the first SCell group, or the activated SCell included in the second SCell group is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated.

Hereinafter, the disclosure proposes a procedure of reporting a power headroom.

In the disclosure, a first embodiment of reporting the power headroom is described below.

In the first embodiment of the disclosure, a power headroom report procedure is used to provide the following information to a base station (serving gNB) serving the UE. The power headroom may indicate difference between a maximum transmission power (or a calculated or nominal maximum transmission power (nominal UE maximum transmit power)) which the UE can transmit in each activated serving cell (PCell, SCell, PSCell, or SpCell) and a power measured for uplink data transmission (UL-SCH) or Sounding Reference Signal (SRS) transmission or difference between a maximum transmission power which the UE can transmit and a power measured for PUCCH transmission and uplink data transmission in an SpCell (PCell or PSCell) of another MAC layer device (for example, LTE MAC or E-UTRA MAC). The power headroom may configure a power headroom value in MAC control information according to a power headroom report procedure and transmit the MAC control information through uplink transmission resources to report the same to the base station.

A first type power headroom is the difference between a maximum transmission power (or a calculated or nominal maximum transmission power (nominal UE maximum transmit power)) which the UE can transmit for the serving cell (PCell, SCell, PSCell, or SpCell) and a power measured for uplink data transmission (UL-SCH), and may be reported.

A second type power headroom is the difference between a maximum transmission power (or a calculated or nominal maximum transmission power (nominal UE maximum transmit power)) which the UE can transmit and a power measured for PUCCH transmission or uplink data transmission (UL-SCH) in the SpCell (PCell or PSCell) of another MAC layer device (for example, LTE MAC or E-UTRA MAC when dual connectivity is configured), and may be reported.

A third type power headroom is the difference between a maximum transmission power (or a calculated or nominal maximum transmission power (nominal UE maximum transmit power)) which the UE can transmit for each activated serving cell (PCell, SCell, PSCell, or SpCell) and a power measured for Sounding Reference Signal (SRS) transmission, and may be reported.

The UE may receive a configuration of configuration information for reporting the power headroom by the RRC message (for example, RRCReconfiguration) and the RRC layer device may control the power headroom report procedure by the following parameters.

When a timer value (phr-PeriodicTimer) for periodically reporting a power headroom, for example, a periodic power headroom report timer expires, the headroom report procedure may be triggered.

A timer value (phr-ProhibitTimer) for limiting the power headroom report: for example, the headroom report procedure is not triggered when the power headroom report limit timer is running A threshold value (phr-Tx-PowerFactorChange) for triggering a power headroom report;

An indicator (phr-Type2OtherCell) indicating a second type power headroom report considering another cell or MAC layer device;

An indicator (phr-ModeOtherCG) indicating a power headroom report considering another cell group;

An indicator (multiplePHR) indicating a plurality of power headroom reports.

The parameters may be configured through the RRC message (for example, RRCReconfiguration) as illustrated in FIG. 6 of the disclosure.

The power headroom report procedure may be triggered when one event is generated or one condition is satisfied among the following conditions.

The power headroom report procedure is triggered when a power headroom limit timer (phr-ProhibitTimer) expires or has expired and a path loss for at least one activated serving cell of a MAC layer device is changed by a threshold value (phr-Tx-PowerFactorChange) dB configured in the RRC message. The path loss may be used as a path loss reference value when the MAC layer device has (or receives) uplink transmission resources for new transmission after the last transmitted power headroom by the MAC layer device.

The power headroom report procedure may be triggered when a periodic power headroom report timer expires.

The power headroom report procedure may be triggered when a power headroom report function is configured or reconfigured by the higher-layer device (for example, the RRC layer device). The configuration or the reconfiguration may not be used to deactivate the power headroom report function.

The power headroom report procedure may be triggered when a cell in which an uplink of a MAC layer device is configured is activated.

The power headroom report procedure may be triggered when a PSCell is added, newly added, or modified (or when dual connectivity is configured, or a PSCell of the SCG is newly added or modified).

The power headroom report procedure may be triggered when a power headroom limit timer (phr-ProhibitTimer) expires or has expired, the MAC layer device has (or receives) uplink transmission resources for new transmission, and the following condition is achieved or satisfied for an activated serving cell in which an uplink of a MAC layer device is configured.

The power headroom report procedure may be triggered when the condition is satisfied, that is, when required power backoff due to power management (for example, in order to reduce interference of another frequency or in order to prevent a harmful influence to human body) for the cell is changed by a configured threshold value (phr-Tx-PowerFactorChange) dB configured by the RRC message after the last transmitted power headroom when there are PUCCH transmission or uplink transmission resources allocated for transmission in the cell, the MAC layer device has PUCCH transmission or uplink resources for transmission.

Hereinafter, the disclosure proposes an operation of the MAC layer device when one or a plurality of events are generated or one or a plurality of conditions are satisfied among the proposed conditions and the power headroom report procedure is triggered.

If the MAC layer device has or receives an uplink allocated for new transmission, the MAC layer device operates as follows.

1> If the uplink transmission resources are first uplink transmission resources allocated for new transmission after the last MAC reset procedure,
  2> a periodic power headroom report timer for periodically reporting a power headroom starts.
1> If it is determined (or decided) that the power headroom report procedure has been triggered and has not canceled, and
1> if the allocated uplink transmission resources include MAC control information (MAC CE or MAC control element) for reporting a power headroom configured to be transmitted by the MAC layer device and a sub header thereof (for example, MAC sub header) as the result of a logical channel prioritization (LCP) procedure (for example, a procedure of allocating uplink transmission resources to data or MAC control information) or transmit the same,
  2> if an indication (multiplePHR) indicating a plurality of power headroom reports is configured as (or configured to report) TRUE,
    3> for each activated serving cell connected to a MAC layer device or configured in a MAC layer device and an uplink is configured therein,
      4> a value of the first type power headroom or the third type power headroom for an uplink carrier (or frequency) corresponding to the cell is acquired (or calculated).
      4> if the MAC layer device or the serving cell has or receives uplink transmission resources allocated for transmission for the serving cell,
      4> alternatively, when another MAC layer device is configured or another MAC layer device has or receives uplink transmission resources allocated for transmission for the serving cell and an indicator (phr-ModeOtherCG) indicating a power headroom report considering another cell group is configured as Real (or configured to report a real value) by a higher layer device (RRC layer device),
        5> a maximum transmission power value (or a power value required for calculating a power headroom) corresponding to the serving cell is acquired from a physical layer device.
    3> if an indicator (phr-Type2OtherCell) indicating a second type power headroom report considering another cell or MAC layer device is configured as (or configured to report) TRUE;
      4> if another MAC layer device is an E-UTRA MAC layer device,
        5> a value for reporting the second type power headroom for the SpCell of another MAC layer device is acquired (or calculated).
        5> if an indicator (phr-ModeOtherCG) indicating a power headroom report considering another cell group is configured as Real (or configured to report a real value) by a higher layer device (RRC layer device),
          6> a maximum transmission power value (or a power value required for calculating a power headroom) for the SpCell of another MAC layer device (E-UTRA MAC layer device) is acquired from a physical layer device.
    3> a multiplexing and assembly procedure (multiplexing and assembly procedure of the MAC layer device) is indicated to generate and transmit MAC control information reporting a plurality of power headrooms on the basis of the values reported from the physical layer device.
  2> if an indicator (multiplePHR) indicating a plurality of power headroom reports is not configured as (or not configured to report) TRUE, one power headroom report is indicated, or one power headroom report format is used,
- 3> a first type power headroom value for an uplink carrier (or frequency) of the serving cell (or PCell) is acquired (or calculated) from the physical layer device.
- 3> a maximum transmission power value (or a power value required for calculating a power headroom) corresponding to the serving cell is acquired from the physical layer device.
- 3> a multiplexing and assembly procedure (multiplexing and assembly procedure of the MAC layer device) is indicated to generate and transmit MAC control information reporting one power headroom on the basis of the values reported from the physical layer device.
- 2> a timer for periodically reporting a power headroom starts or restarts.
- 2> a timer for limiting a power headroom report starts or restarts.
- 2> all triggered power headrooms or power headroom report procedures are canceled.

Since the power headroom report procedure proposed in the disclosure reports the power headroom to the gNB for each cell by the UE, the gNB may control or manage uplink transmission power of the UE. However, in the case of the cell (SCell) in which the dormant BWP proposed in the disclosure is configured or the serving cell, if the current or activated BWP (or downlink BWP) of the activated serving cell is the dormant BWP or is activated to a BWP indicated by a dormant BWP identifier, an unnecessary power headroom report is performed since uplink data transmission or PUCCH transmission is impossible in the dormant BWP even though the power headroom is reported for the cell.

Accordingly, in order to reduce an unnecessary processing load of the UE and prevent transmission resource waste due to the unnecessary power headroom report, the disclosure proposes a procedure in which the UE first identifies whether the cell is activated or deactivated and then identifies whether an activated BWP (for example, downlink BWP) of the activated cell is the dormant BWP (or a BWP having a dormant BWP identifier configured by the RRC message) or is not the dormant BWP (or is not a BWP having a dormant BWP identifier configured by the RRC message). In another method, the UE may perform a procedure of first identifying whether the cell is activated or deactivated and then identifying whether an activated BWP (for example, downlink BWP) of the activated cell is a dormant BWP (or a BWP having a dormant BWP identifier configured by the RRC message) or is not the dormant BWP (or is not a BWP having a dormant BWP identifier configured by the RRC message) with respect to the activated cell in which a dormant BWP is configured (for example, if a dormant BWP identifier is configured for the cell by the RRC message), and may omit (or may not perform) the procedure of identifying the activated BWP with respect to the activated cell in which the dormant BWP is not configured.

In the case of the cell (SCell) in which the dormant BWP is configured or the serving cell in the proposed procedure, if the current or activated BWP (or downlink BWP) of the activated serving cell is the dormant BWP or is activated to a BWP indicated by a dormant BWP identifier, the power headroom report procedure is not triggered and the power headroom is not reported even through the power headroom report procedure is triggered by another cell. In another method, in the case of the cell (SCell) in which the dormant BWP is configured or the serving cell, the power headroom report procedure may be triggered only when the current or activated BWP (or downlink BWP) of the activated serving cell is not the dormant BWP or is not activated to the BWP indicated by the dormant BWP identifier, or the power headroom may be reported only when the current or activated BWP (or downlink BWP) of the activated serving cell is not the dormant BWP or is not activated to the BWP indicated by the dormant BWP identifier even though the power headroom report procedure is triggered by another cell. Accordingly, the procedure proposed in the disclosure may allow the UE to reduce the unnecessary processing load and prevent transmission resource waste due to the unnecessary power headroom report. The above-proposed detailed embodiment is described through a second embodiment considering the dormant BWP.

In the second embodiment considering the dormant BWP, the power headroom report procedure is used to provide the following information to the gNB serving the UE (serving gNB) in the disclosure. The power headroom may indicate difference between a maximum transmission power (or a calculated or nominal maximum transmission power (nominal UE maximum transmit power)) which the UE can transmit in each activated serving cell (PCell, SCell, PSCell, or SpCell) and a power measured for uplink data transmission (UL-SCH) or Sounding Reference Signal (SRS) transmission or difference between a maximum transmission power which the UE can transmit and a power measured for PUCCH transmission and uplink data transmission in an SpCell (PCell or PSCell) of another MAC layer device (for example, LTE MAC or E-UTRA MAC). The power headroom may configure a power headroom value in MAC control information according to a power headroom report procedure and transmit the MAC control information through uplink transmission resources to report the same to the base station.

- A first type power headroom is the difference between a maximum transmission power (or a calculated or nominal maximum transmission power (nominal UE maximum transmit power)) which the UE can transmit for the serving cell (PCell, SCell, PSCell, or SpCell) and a power measured for uplink data transmission (UL-SCH), and may be reported.
- A second type power headroom is the difference between a maximum transmission power (or a calculated or nominal maximum transmission power (nominal UE maximum transmit power)) which the UE can transmit and a power measured for PUCCH transmission or uplink data transmission (UL-SCH) in the SpCell (PCell or PSCell) of another MAC layer device (for example, LTE MAC or E-UTRA MAC when dual connectivity is configured), and may be reported.
- A third type power headroom is the difference between a maximum transmission power (or a calculated or nominal maximum transmission power (nominal UE maximum transmit power)) which the UE can transmit for each activated serving cell (PCell, SCell, PSCell, or SpCell) and a power measured for Sounding Reference Signal (SRS) transmission, and may be reported.

The second embodiment of the power headroom report procedure considering the dormant BWP proposed in the disclosure is described below.

The UE may receive a configuration of configuration information for reporting the power headroom by the RRC message (for example, RRCReconfiguration) and the RRC layer device may control the power headroom report procedure by the following parameters in the second embodiment of the disclosure.

When a timer value (phr-PeriodicTimer) for periodically reporting a power headroom, for example, a periodic power headroom report timer expires, the headroom report procedure may be triggered.

A timer value (phr-ProhibitTimer) for limiting the power headroom report: for example, the headroom report procedure is not triggered when the power headroom report limit timer is running A threshold value (phr-Tx-PowerFactorChange) for triggering a power headroom report;

An indicator (phr-Type2OtherCell) indicating a second type power headroom report considering another cell or MAC layer device;

An indicator (phr-ModeOtherCG) indicating a power headroom report considering another cell group;

An indicator (multiplePHR) indicating a plurality of power headroom reports.

The parameters may be configured through the RRC message (for example, RRCReconfiguration) as illustrated in FIG. 6 of the disclosure.

In the second embodiment of the power headroom report procedure considering the dormant BWP proposed in the disclosure, the power headroom report procedure may be triggered when one event is generated or one condition is satisfied among the following conditions.

The power headroom report procedure is triggered when the power headroom limit timer (phr-ProhibitTimer) expires or had expired, a BWP (or downlink BWP) of an activated serving cell of a MAC layer device is activated, or a path loss is changed by a configured threshold value (phr-Tx-PowerFactorChange) dB configured by the RRC message for at least one activated serving cell in which the activated BWP (or downlink BWP) is not the dormant BWP or an activated BWP (or downlink BWP) of the activated serving cell or the current BWP (or activated current downlink BWP) is not the dormant BWP. The path loss may be used as a path loss reference value when the MAC layer device has (or receives) uplink transmission resources for new transmission after the last transmitted power headroom by the MAC layer device.

The power headroom report procedure may be triggered when a periodic power headroom report timer expires.

The power headroom report procedure may be triggered when a power headroom report function is configured or reconfigured by the higher-layer device (for example, the RRC layer device). The configuration or the reconfiguration may not be used to deactivate the power headroom report function.

The power headroom report procedure may be triggered when a cell in which an uplink of a MAC layer device is configured is activated and a first active downlink BWP (or first active downlink BWP identifier (firstActiveDownlinkBWP-Id)) configured in the cell is not configured as the dormant BWP.

The power headroom report procedure may be triggered when a PSCell is added, newly added, or modified (or when dual connectivity is configured, or a PSCell of the SCG is newly added or modified).

In another method, the power headroom report procedure may be triggered when the power headroom report procedure may be triggered when the PSCell is added, newly added, or modified (or when dual connectivity is configured and a PSCell of an SCG is newly added or modified) and the first active downlink BWP (or first active downlink BWP identifier (firstActiveDownlinkBWP-Id) configured in the cell is not configured as the dormant BWP.

The power headroom report procedure may be triggered when a power headroom limit timer (phr-ProhibitTimer) expires or has expired, the MAC layer device has (or receives) uplink transmission resources for new transmission, and the following condition is achieved or satisfied for an activated serving cell in which an uplink of a MAC layer device is configured.

The power headroom report procedure may be triggered when the condition is satisfied, that is, when required power backoff due to power management (for example, in order to reduce interference of another frequency or in order to prevent a harmful influence to human body) for the cell is changed by a configured threshold value (phr-Tx-PowerFactorChange) dB configured by the RRC message after the last transmitted power headroom when there are PUCCH transmission or uplink transmission resources allocated for transmission in the cell, the MAC layer device has PUCCH transmission or uplink resources for transmission.

The power headroom report procedure may be triggered when an uplink BWP (UL BWP) is activated (or activation to first active uplink BWP is performed) or a MAC layer device switches or activate a downlink BWP (or an activated BWP or a current BWP (or downlink BWP)) of an activated SCell in which an uplink is configured from the dormant BWP to a normal BWP (or a BWP which is not the dormant BWP (non-dormant BWP)) or to a BWP (firstActiveNonDormantDownlinkBWP-Id or a BWP indicated by an identifier of the BWP which is not the dormant BWP) which is not the dormant BWP first activated from the dormant state configured by the RRC message.

The power headroom report procedure may be triggered when a MAC layer device activates a downlink BWP (or an activated BWP or a current BWP (or downlink BWP)) of an activated SCell in which an uplink is configured to a BWP indicated by an identifier (firstOutsideActiveTimeBWP-Id or firstWithinActiveTimeBWP-Id) of a BWP first activated from the dormant state configured by the RRC message. As described above, activating the BWP may be indicated by the PDCCH DCI.

Hereinafter, the disclosure proposes an operation of the MAC layer device when one or a plurality of events are generated or one or a plurality of conditions are satisfied among the proposed conditions and the power headroom report procedure is triggered.

If the MAC layer device has or receives an uplink allocated for new transmission, the MAC layer device operates as follows.

1> If the uplink transmission resources are first uplink transmission resources allocated for new transmission after the last MAC reset procedure,
2> a periodic power headroom report timer for periodically reporting a power headroom starts.
1> If it is determined (or decided) that the power headroom report procedure has been triggered and has not canceled, and
1> if the allocated uplink transmission resources include MAC control information (MAC CE or MAC control element) for reporting a power headroom configured to be transmitted by the MAC layer device and a sub header thereof (for example, MAC sub header) as the result of a logical channel prioritization (LCP) procedure (for example, a procedure of allocating uplink transmission resources to data or MAC control information) or transmit the same, 2> if an indication (multiplePHR) indicating a plurality of power headroom reports is configured as (or configured to report) TRUE,
   3> for each activated serving cell connected to a MAC layer device or configured in a MAC layer device and an uplink is configured therein,
   3> if the BWP (or downlink BWP) of the activated serving cell is activated, the activated BWP (or downlink BWP) is not the dormant BWP, or the activated BWP (or downlink BWP) of the activated serving cell or the current BWP (or activated current downlink BWP) is not the dormant BWP,
      4> a value of the first type power headroom or the third type power headroom for an uplink carrier (or frequency) corresponding to the cell is acquired (or calculated).
      4> if the MAC layer device or the serving cell has or receives uplink transmission resources allocated for transmission for the serving cell,
      4> alternatively, when another MAC layer device is configured or another MAC layer device has or receives uplink transmission resources allocated for transmission for the serving cell and an indicator (phr-ModeOtherCG) indicating a power headroom report considering another cell group is configured as Real (or configured to report a real value) by a higher layer device (RRC layer device),
         5> a maximum transmission power value (or a power value required for calculating a power headroom) corresponding to the serving cell is acquired from a physical layer device.
   3> if an indicator (phr-Type2OtherCell) indicating a second type power headroom report considering another cell or MAC layer device is configured as (or configured to report) TRUE;
      4> if another MAC layer device is an E-UTRA MAC layer device,
         5> a value for reporting the second type power headroom for the SpCell of another MAC layer device is acquired (or calculated).
         5> if an indicator (phr-ModeOtherCG) indicating a power headroom report considering another cell group is configured as Real (or configured to report a real value) by a higher layer device (RRC layer device),
            6> a maximum transmission power value (or a power value required for calculating a power headroom) for the SpCell of another MAC layer device (E-UTRA MAC layer device) is acquired from a physical layer device.
   3> a multiplexing and assembly procedure (Multiplexing and Assembly procedure of the MAC layer device) is indicated to generate and transmit MAC control information reporting a plurality of power headrooms on the basis of the values reported from the physical layer device.

2> if an indicator (multiplePHR) indicating a plurality of power headroom reports is not configured as (or not configured to report) TRUE, one power headroom report is indicated, or one power headroom report format is used,
   3> a first type power headroom value for an uplink carrier (or frequency) of the serving cell (or PCell) is acquired (or calculated) from the physical layer device.
   3> a maximum transmission power value (or a power value required for calculating a power headroom) for the serving cell (or PCell) is acquired from the physical layer device.
   3> a multiplexing and assembly procedure (multiplexing and assembly procedure of the MAC layer device) is indicated to generate and transmit MAC control information reporting one power headroom on the basis of the values reported from the physical layer device.

2> a timer for periodically reporting a power headroom starts or restarts.

2> a timer for limiting a power headroom report starts or restarts.

2> all triggered power headrooms or power headroom report procedures are canceled.

Another embodiment of the second embodiment of the headroom report procedure proposed in the disclosure is described below.

5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);

Type 3 power headroom: the difference between the nominal UE maximum transmit power and the estimated power for SRS transmission per activated Serving Cell.

RRC controls Power Headroom reporting by configuring the following parameters:
phr-PeriodicTimer;
phr-ProhibitTimer;
phr-Tx-PowerFactorChange;
phr-Type2OtherCell;
phr-ModeOtherCG;
multiplePHR.

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity of which the active BWP (or the active DL BWP or the current DL BWP) is not a dormant BWP, which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

phr-PeriodicTimer expires;
upon configuration or reconfiguration of the power headroom reporting functionality by upper layers, which is not used to disable the function;

activation of an SCell of any MAC entity with configured uplink and if its firstActiveDownlinkBWP-Id is not set to dormant BWP;

addition of the PSCell (i.e. PSCell is newly added or changed);

addition of the PSCell (i.e. PSCell is newly added or changed) and if its firstActiveDownlinkBWP-Id is not set to dormant BWP;

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPRc as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

Activation or Switching of the active BWP (or DL (downlink) BWP) of an SCell of any MAC entity with configured uplink from the dormant BWP to non-dormant BWP (firstActiveNonDormantDownlinkBWP-Id);

activation of the DL BWP indicated by firstOutsideActiveTimeBWP-Id or by firstWithinActiveTimeBWP-Id (as specified in TS 38.331 [5] and TS 38.213 [6]) of an SCell of any MAC entity with configured uplink NOTE 2: The MAC entity should avoid triggering a PHR when the required power backoff due to power management decreases only temporarily (e.g. for up to a few tens of milliseconds) and it should avoid reflecting such temporary decrease in the values of PCMAX,f,c/PH when a PHR is triggered by other triggering conditions.

NOTE 3: If a HARQ process is configured with cg-RetransmissionTimer and if the PHR is already included in a MAC PDU for transmission by this HARQ process, but not yet transmitted by lower layers, it is up to UE implementation how to handle the PHR content.

If the MAC entity has UL resources allocated for a new transmission the MAC entity shall:

1> if it is the first UL resource allocated for a new transmission since the last MAC reset:

2> start phr-PeriodicTimer;

1> if the Power Headroom reporting procedure determines that at least one PHR has been triggered and not cancelled; and 1> if the allocated UL resources can accommodate the MAC CE for PHR which the MAC entity is configured to transmit, plus its subheader, as a result of LCP as defined in clause 5.4.3.1:

2> if multiplePHR with value true is configured:

3> for each activated Serving Cell with configured uplink associated with any MAC entity of which the active BWP (or the active DL BWP or the current DL BWP) is not a dormant BWP (and its active BWP (or its active DL BWP or its current DL BWP) is not a dormant BWP):

4> obtain the value of the Type 1 or Type 3 power headroom for the corresponding uplink carrier as specified in clause 7.7 of TS 38.213 [6];

4> if this MAC entity has UL resources allocated for transmission on this Serving Cell; or 4> if the other MAC entity, if configured, has UL resources allocated for transmission on this Serving Cell and phr-ModeOtherCG is set to real by upper layers:

5> obtain the value for the corresponding PCMAX,f,c field from the physical layer.

3> if phr-Type2OtherCell with value true is configured:

5> obtain the value of the Type 2 power headroom for the SpCell of the other MAC entity (i.e. E-UTRA MAC entity);

5> if phr-ModeOtherCG is set to real by upper layers:

6> obtain the value for the corresponding PCMAX,f,c field for the SpCell of the other MAC entity (i.e. E-UTRA MAC entity) from the physical layer.

3> instruct the Multiplexing and Assembly procedure to generate and transmit the Multiple Entry PHR MAC CE as defined in clause 6.1.3.9 based on the values reported by the physical layer.

2> else (i.e. Single Entry PHR format is used):

3> obtain the value of the Type 1 power headroom from the physical layer for the corresponding uplink carrier of the PCell;

3> obtain the value for the corresponding PCMAX,f,c field from the physical layer;

3> instruct the Multiplexing and Assembly procedure to generate and transmit the Single Entry PHR MAC CE as defined in clause 6.1.3.8 based on the values reported by the physical layer.

2> start or restart phr-PeriodicTimer;

2> start or restart phr-ProhibitTimer;

2> cancel all triggered PHR(s).

A third embodiment of the power headroom report procedure considering the dormant BWP proposed in the disclosure is described below.

The UE may receive a configuration of configuration information for reporting the power headroom by the RRC message (for example, RRCReconfiguration) and the RRC layer device may control the power headroom report procedure by the following parameters in the third embodiment of the disclosure.

When a timer value (phr-PeriodicTimer) for periodically reporting a power headroom, for example, a periodic power headroom report timer expires, the headroom report procedure may be triggered.

A timer value (phr-ProhibitTimer) for liming the power headroom report: for example, the headroom report procedure is not triggered when the power headroom report limit timer is running A threshold value (phr-Tx-PowerFactorChange) for triggering a power headroom report;

An indicator (phr-Type2OtherCell) indicating a second type power headroom report considering another cell or MAC layer device;

An indicator (phr-ModeOtherCG) indicating a power headroom report considering another cell group;

An indicator (multiplePHR) indicating a plurality of power headroom reports.

The parameters may be configured through the RRC message (for example, RRCReconfiguration) as illustrated in FIG. 6 of the disclosure.

In the third embodiment of the power headroom report procedure considering the dormant BWP proposed in the disclosure, the power headroom report procedure may be triggered when one event is generated or one condition is satisfied among the following conditions.

The power headroom report procedure is triggered when the power headroom limit timer (phr-ProhibitTimer) expires or had expired, a BWP (or downlink BWP) of an activated serving cell of a MAC layer device is activated, or a path loss is changed by a configured threshold value (phr-Tx-PowerFactorChange) dB configured by the RRC message for at least one activated serving cell in which the activated BWP (or downlink BWP) is not the dormant BWP or an activated BWP (or downlink BWP) of the activated serving cell or the current BWP (or activated current downlink BWP) is not the dormant BWP. The path loss may be used as a path loss reference value when the MAC layer device has (or receives) uplink transmission resources for new transmission after the last transmitted power headroom by the MAC layer device.

The power headroom report procedure may be triggered when a periodic power headroom report timer expires.

The power headroom report procedure may be triggered when a power headroom report function is configured or reconfigured by the higher-layer device (for example, the RRC layer device). The configuration or the reconfiguration may not be used to deactivate the power headroom report function.

The power headroom report procedure may be triggered when a cell in which an uplink of a MAC layer device is configured is activated and a first active downlink BWP (or first active downlink BWP identifier (firstActiveDownlinkBWP-Id)) configured in the cell is not configured as the dormant BWP.

The power headroom report procedure may be triggered when a PSCell is added, newly added, or modified (or when dual connectivity is configured, or a PSCell of the SCG is newly added or modified).

In another method, the power headroom report procedure may be triggered when the power headroom report procedure may be triggered when the PSCell is added, newly added, or modified (or when dual connectivity is configured and a PSCell of an SCG is newly added or modified) and the first active downlink BWP (or first active downlink BWP identifier (firstActiveDownlinkBWP-Id) configured in the cell is not configured as the dormant BWP.

The power headroom report procedure may be triggered when a power headroom limit timer (phr-ProhibitTimer) expires or has expired, the MAC layer device has (or receives) uplink transmission resources for new transmission, and the following condition is achieved or satisfied for an activated serving cell in which an uplink of a MAC layer device is configured.

The power headroom report procedure may be triggered when the condition is satisfied, that is, when required power backoff due to power management (for example, in order to reduce interference of another frequency or in order to prevent a harmful influence to human body) for the cell is changed by a configured threshold value (phr-Tx-PowerFactorChange) dB configured by the RRC message after the last transmitted power headroom when there are PUCCH transmission or uplink transmission resources allocated for transmission in the cell, the MAC layer device has PUCCH transmission or uplink resources for transmission.

The power headroom report procedure may be triggered when an uplink BWP (UL BWP) is activated (or activation to first active uplink BWP is performed) or a MAC layer device switches or activate a downlink BWP (or an activated BWP or a current BWP (or downlink BWP)) of an activated SCell in which an uplink is configured from the dormant BWP to a normal BWP (or a BWP which is not the dormant BWP (non-dormant BWP)) or to a BWP (firstActiveNonDormantDownlinkBWP-Id or a BWP indicated by an identifier of the BWP which is not the dormant BWP) which is not the dormant BWP first activated from the dormant state configured by the RRC message.

The power headroom report procedure may be triggered when a MAC layer device activates a downlink BWP (or an activated BWP or a current BWP (or downlink BWP)) of an activated SCell in which an uplink is configured to a BWP indicated by an identifier (firstOutsideActiveTimeBWP-Id or firstWithinActiveTimeBWP-Id) of a BWP first activated from the dormant state configured by the RRC message. As described above, activating the BWP may be indicated by the PDCCH DCI.

Hereinafter, the disclosure proposes an operation of the MAC layer device when one or a plurality of events are generated or one or a plurality of conditions are satisfied among the proposed conditions and the power headroom report procedure is triggered.

If the MAC layer device has or receives an uplink allocated for new transmission, the MAC layer device operates as follows.

1> If the uplink transmission resources are first uplink transmission resources allocated for new transmission after the last MAC reset procedure,
  2> a periodic power headroom report timer for periodically reporting a power headroom starts.
1> If it is determined (or decided) that the power headroom report procedure has been triggered and has not canceled, and
1> if the allocated uplink transmission resources include MAC control information (MAC CE or MAC control element) for reporting a power headroom configured to be transmitted by the MAC layer device and a sub header thereof (for example, MAC sub header) as the result of a logical channel prioritization (LCP) procedure (for example, a procedure of allocating uplink transmission resources to data or MAC control information) or transmit the same,
  2> if an indication (multiplePHR) indicating a plurality of power headroom reports is configured as (or configured to report) TRUE,
    3> for each activated serving cell connected to a MAC layer device or configured in a MAC layer device and an uplink is configured therein,
      4> a value of the first type power headroom or the third type power headroom for an uplink carrier (or frequency) corresponding to the cell is acquired (or calculated).
      4> if the MAC layer device or the serving cell has or receives uplink transmission resources allocated for transmission for the serving cell,
      4> alternatively, when another MAC layer device is configured or another MAC layer device has or receives uplink transmission resources allocated for transmission for the serving cell and an indicator (phr-ModeOtherCG) indicating a power headroom report considering another cell group is configured as Real (or configured to report a real value) by a higher layer device (RRC layer device),
        5> a maximum transmission power value (or a power value required for calculating a power headroom) corresponding to the serving cell is acquired from a physical layer device.
    3> if an indicator (phr-Type2OtherCell) indicating a second type power headroom report considering another cell or MAC layer device is configured as (or configured to report) TRUE;

4> if another MAC layer device is an E-UTRA MAC layer device,
  5> a value for reporting the second type power headroom for the SpCell of another MAC layer device is acquired (or calculated).
  5> if an indicator (phr-ModeOtherCG) indicating a power headroom report considering another cell group is configured as Real (or configured to report a real value) by a higher layer device (RRC layer device),
    6> a maximum transmission power value (or a power value required for calculating a power headroom) for the SpCell of another MAC layer device (E-UTRA MAC layer device) is acquired from a physical layer device.
  3> a multiplexing and assembly procedure (Multiplexing and Assembly procedure of the MAC layer device) is indicated to generate and transmit MAC control information reporting a plurality of power headrooms on the basis of the values reported from the physical layer device.
2> if an indicator (multiplePHR) indicating a plurality of power headroom reports is not configured as (or not configured to report) TRUE, one power headroom report is indicated, or one power headroom report format is used,
  3> a first type power headroom value for an uplink carrier (or frequency) of the serving cell (or PCell) is acquired (or calculated) from the physical layer device.
  3> a maximum transmission power value (or a power value required for calculating a power headroom) corresponding to the serving cell is acquired from the physical layer device.
  3> a multiplexing and assembly procedure (multiplexing and assembly procedure of the MAC layer device) is indicated to generate and transmit MAC control information reporting one power headroom on the basis of the values reported from the physical layer device.
2> a timer for periodically reporting a power headroom starts or restarts.
2> a timer for limiting a power headroom report starts or restarts.
2> all triggered power headrooms or power headroom report procedures are canceled.

Another embodiment of the second embodiment of the headroom report procedure proposed in the disclosure is described below.

5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);

Type 3 power headroom: the difference between the nominal UE maximum transmit power and the estimated power for SRS transmission per activated Serving Cell.

RRC controls Power Headroom reporting by configuring the following parameters:

phr-PeriodicTimer;
phr-ProhibitTimer;
phr-Tx-PowerFactorChange;
phr-Type2OtherCell;
phr-ModeOtherCG;
multiplePHR.

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity of which the active BWP (or the active DL BWP or the current DL BWP) is not a dormant BWP, which is used as a pathloss reference since the last transmission of a PHR in this MAC entity when the MAC entity has UL resources for new transmission;

NOTE 1: measured at present time on the current pathloss reference and the pathloss measured at the transmission time of the last transmission of PHR on the pathloss reference in use at that time, irrespective of whether the pathloss reference has changed in between.

phr-PeriodicTimer expires;

upon configuration or reconfiguration of the power headroom reporting functionality by upper layers, which is not used to disable the function;

activation of an SCell of any MAC entity with configured uplink and if its firstActiveDownlinkBWP-Id is not set to dormant BWP;

addition of the PSCell (i.e. PSCell is newly added or changed);

addition of the PSCell (i.e. PSCell is newly added or changed) and if its firstActiveDownlinkBWP-Id is not set to dormant BWP;

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPRc as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

Activation or Switching of the active BWP (or DL (downlink) BWP) of an SCell of any MAC entity with configured uplink from the dormant BWP to non-dormant BWP (firstActiveNonDormantDownlinkBWP-Id);

activation of the DL BWP indicated by firstOutsideActiveTimeBWP-Id or by firstWithinActiveTimeBWP-Id (as specified in TS 38.331 [5] and TS 38.213 [6]) of an SCell of any MAC entity with configured uplink NOTE 2: The MAC entity should avoid triggering a PHR when the required power backoff due to power management decreases only temporarily (e.g. for up to a few tens of milliseconds) and it should avoid reflecting such temporary decrease in the values of PCMAX,f,c/PH when a PHR is triggered by other triggering conditions.

NOTE 3: If a HARQ process is configured with cg-RetransmissionTimer and if the PHR is already included in a MAC PDU for transmission by this HARQ process, but not yet transmitted by lower layers, it is up to UE implementation how to handle the PHR content.

If the MAC entity has UL resources allocated for a new transmission the MAC entity shall:

1> if it is the first UL resource allocated for a new transmission since the last MAC reset:
2> start phr-PeriodicTimer;
1> if the Power Headroom reporting procedure determines that at least one PHR has been triggered and not cancelled; and
1> if the allocated UL resources can accommodate the MAC CE for PHR which the MAC entity is configured to transmit, plus its subheader, as a result of LCP as defined in clause 5.4.3.1:
2> if multiplePHR with value true is configured:
3> for each activated Serving Cell with configured uplink associated with any MAC entity:
4> obtain the value of the Type 1 or Type 3 power headroom for the corresponding uplink carrier as specified in clause 7.7 of TS 38.213 [6];
4> if this MAC entity has UL resources allocated for transmission on this Serving Cell; or
4> if the other MAC entity, if configured, has UL resources allocated for transmission on this Serving Cell and phr-ModeOtherCG is set to real by upper layers:
5> obtain the value for the corresponding PCMAX,f,c field from the physical layer.
3> if phr-Type2OtherCell with value true is configured:
5> obtain the value of the Type 2 power headroom for the SpCell of the other MAC entity (i.e. E-UTRA MAC entity);
5> if phr-ModeOtherCG is set to real by upper layers:
6> obtain the value for the corresponding PCMAX,f,c field for the SpCell of the other MAC entity (i.e. E-UTRA MAC entity) from the physical layer.
3> instruct the Multiplexing and Assembly procedure to generate and transmit the Multiple Entry PHR MAC CE as defined in clause 6.1.3.9 based on the values reported by the physical layer.
2> else (i.e. Single Entry PHR format is used):
3> obtain the value of the Type 1 power headroom from the physical layer for the corresponding uplink carrier of the PCell;
3> obtain the value for the corresponding PCMAX,f,c field from the physical layer;
3> instruct the Multiplexing and Assembly procedure to generate and transmit the Single Entry PHR MAC CE as defined in clause 6.1.3.8 based on the values reported by the physical layer.
2> start or restart phr-PeriodicTimer;
2> start or restart phr-ProhibitTimer;
2> cancel all triggered PHR(s).

The first embodiment, the second embodiment, or the third embodiment of the power headroom report procedure proposed in the disclosure may be expanded to another embodiment and may be combined, applied, and expanded.

The overall operation of the first embodiment, the second embodiment, or the third embodiment of the power headroom report procedure proposed in the disclosure is described below.

The UE may receive the RRCReconfiguration message as illustrated in FIG. 6.

The dormant BWP and the normal BWP may be configured for each cell in the RRC message.

Configuration information or parameters for the power headroom may be configured in the RRC message.

If the event for triggering the power headroom procedure proposed in the disclosure is generated or the condition is satisfied, the UE may identify whether the BWP (or current or activated downlink BWP) for the serving cell is the dormant BWP. When the BWP (downlink BWP) is not the dormant BWP, the power headroom report procedure may be triggered.

If the event for triggering the power headroom procedure proposed in the disclosure is generated or the condition is satisfied, and if the SCell is activated, the UE may identify whether the first active downlink BWP configured by the RRC message for the serving cell is the dormant BWP. When the first active downlink BWP (downlink BWP) is not the dormant BWP, the power headroom report procedure may be triggered.

The power headroom report procedure may be triggered when an uplink BWP (UL BWP) is activated (or a first active uplink BWP is activate) or a MAC layer device switches or activate a downlink BWP (or an activated BWP or a current BWP (or downlink BWP)) of an activated SCell in which an uplink is configured from the dormant BWP to a normal BWP (or a BWP which is not the dormant BWP (non-dormant BWP)) or to a BWP (firstActiveNonDormantDownlinkBWP-Id or a BWP indicated by an identifier of the BWP which is not the dormant BWP) which is not the dormant BWP first activated from the dormant state configured by the RRC message.

When the power headroom report procedure is triggered, the power headroom may be calculated for each activated serving cell (PCell, SCell, or PSCell) according to the power headroom configuration information configured in the RRC message and the proposed procedure or the first type power headroom or the third type power headroom may be calculated or generated, and MAC control information may be configured and inserted into uplink transmission resources to be transmitted.

Hereinafter, the disclosure proposes a fourth embodiment of transmitting a PHR only when a sounding reference signal (SRS) or a CRS-RS is configured in the uplink BWP (or uplink dormant BWP) of the activated SCell in the case in which the downlink BWP of the activated SCell is switched or activated to the dormant BWP, thereby reducing unnecessary UE processing load.

In the fourth embodiment of the power headroom report procedure considering the dormant BWP proposed in the disclosure, the power headroom report procedure may be triggered when one event is generated or one condition is satisfied among the following conditions.

The power headroom report procedure is triggered when the power headroom limit timer (phr-ProhibitTimer) expires or has expired, a BWP (or downlink BWP) of an activated serving cell of a MAC layer device is activated, an activated BWP (or downlink BWP) is not the dormant BWP, an activated BWP (or downlink BWP) of an activated serving cell or a current BWP (or activated current downlink BWP) is not the dormant BWP, the first SRS configuration information or the second SRS configuration information is configured (or if the activated BWP (or downlink BWP) of the activated serving cell or the current BWP (or the activated current downlink BWP) is the dormant BWP and the first SRS configuration information or the second SRS configuration information is configured), or a path loss is changed by a configured threshold value (phr-Tx-PowerFactorChange) dB configured by the RRC message for at least one activated serving cell. The path loss may be used as a path loss reference value when the MAC layer device has (or receives) uplink transmission resources for new transmission after the last transmitted power headroom by the MAC layer device The power headroom report procedure may be triggered when a periodic power headroom report timer expires.

The power headroom report procedure may be triggered when a power headroom report function is configured or reconfigured by the higher-layer device (for example, the RRC layer device). The configuration or the reconfiguration may not be used to deactivate the power headroom report function.

The power headroom report procedure may be triggered when a cell in which an uplink of a MAC layer device is configured is activated and a first active downlink BWP (or first active downlink BWP identifier (firstActiveDownlinkBWP-Id)) configured in the cell is not configured as the dormant BWP or the first SRS configuration information or the second SRS configuration information is configured. In another method, the power headroom report procedure may be triggered when a first active downlink BWP (or first active downlink BWP identifier (firstActiveDownlinkBWP-Id)) configured in the cell is configured as the dormant BWP and the first SRS configuration information or the second SRS configuration information is configured.

The power headroom report procedure may be triggered when a PSCell is added, newly added, or modified (or when dual connectivity is configured, or a PSCell of the SCG is newly added or modified).

In another method, the power headroom report procedure may be triggered when the power headroom report procedure may be triggered when the PSCell is added, newly added, or modified (or when dual connectivity is configured and a PSCell of an SCG is newly added or modified) and the first active downlink BWP (or first active downlink BWP identifier (firstActiveDownlinkBWP-Id) configured in the cell is not configured as the dormant BWP.

The power headroom report procedure may be triggered when a power headroom limit timer (phr-ProhibitTimer) expires or has expired, the MAC layer device has (or receives) uplink transmission resources for new transmission, and the following condition is achieved or satisfied for an activated serving cell in which an uplink of a MAC layer device is configured.

The power headroom report procedure may be triggered when the condition is satisfied, that is, when required power backoff due to power management (for example, in order to reduce interference of another frequency or in order to prevent a harmful influence to human body) for the cell is changed by a configured threshold value (phr-Tx-PowerFactorChange) dB configured by the RRC message after the last transmitted power headroom when there are PUCCH transmission or uplink transmission resources allocated for transmission in the cell, the MAC layer device has PUCCH transmission or uplink resources for transmission.

The power headroom report procedure may be triggered when an uplink BWP (UL BWP) is activated (or activation to a first active uplink BWP is performed), a MAC layer device switches or activates a downlink BWP (or an activated BWP or a current BWP (or downlink BWP)) of an activated SCell in which an uplink is configured from a dormant BWP to a normal BWP (or a BWP which is not the dormant BWP (non-dormant BWP)) or to a BWP (a BWP indicated by firstActiveNonDormantDownlinkBWP-Id, firstOutsideActiveTimeBWP-Id, firstWithinActiveTimeBWP-Id, or an identifier of the BWP which is not the dormant BWP) which is not the dormant BWP first activated from the dormant state configured by the RRC message, or first SRS configuration information or second SRS configuration information is configured (or if the activated BWP (or downlink BWP) or the current BWP (or activated current downlink BWP) of the activated serving cell is the dormant BWP and the first SRS configuration information or the second SRS configuration information is configured).

The power headroom report procedure may be triggered when a MAC layer device activates a downlink BWP (or an activated BWP or a current BWP (or downlink BWP)) of an activated SCell in which an uplink is configured to a BWP indicated by an identifier (firstOutsideActiveTimeBWP-Id or firstWithinActiveTimeBWP-Id) of a BWP first activated from the dormant state configured by the RRC message. As described above, activating the BWP may be indicated by the PDCCH DCI.

Hereinafter, the disclosure proposes an operation of the MAC layer device when one or a plurality of events are generated or one or a plurality of conditions are satisfied among the proposed conditions and the power headroom report procedure is triggered.

If the MAC layer device has or receives an uplink allocated for new transmission, the MAC layer device operates as follows.

1> If the uplink transmission resources are first uplink transmission resources allocated for new transmission after the last MAC reset procedure,
2> a periodic power headroom report timer for periodically reporting a power headroom starts.
1> If it is determined (or decided) that the power headroom report procedure has been triggered and has not canceled, and
1> if the allocated uplink transmission resources include MAC control information (MAC CE or MAC control element) for reporting a power headroom configured to be transmitted by the MAC layer device and a sub header thereof (for example, MAC sub header) as the result of a logical channel prioritization (LCP) procedure (for example, a procedure of allocating uplink transmission resources to data or MAC control information) or transmit the same,
2> if an indication (multiplePHR) indicating a plurality of power headroom reports is configured as (or configured to report) TRUE,
3> if the BWP (or downlink BWP) of the activated serving cell is activated, the activated BWP (or downlink BWP) is not the dormant BWP, the activated BWP (or downlink BWP) of the activated serving cell or the current BWP (or activated current downlink BWP) is not the dormant BWP, or the first SRS configuration information or the second SRS configuration information is configured (or if the activated BWP (or downlink BWP) of the activated serving cell or the current BWP (or activated current downlink BWP) is the dormant BWP and the first SRS configuration information or the second SRS configuration is configured), 4> a value of the first type power headroom or the third type power headroom for an uplink carrier (or frequency) corresponding to the cell is acquired (or calculated).
4> if the MAC layer device or the serving cell has or receives uplink transmission resources allocated for transmission for the serving cell,
4> alternatively, when another MAC layer device is configured or another MAC layer device has or receives uplink transmission resources allocated for transmission for the serving cell and an indicator (phr-ModeOtherCG) indicating a power headroom report considering another cell group is configured as Real (or configured to report a real value) by a higher layer device (RRC layer device),
5> a maximum transmission power value (or a power value required for calculating a power headroom) corresponding to the serving cell is acquired from a physical layer device.
3> if an indicator (phr-Type2OtherCell) indicating a second type power headroom report considering another cell or MAC layer device is configured as (or configured to report) TRUE;
4> if another MAC layer device is an E-UTRA MAC layer device,
5> a value for reporting the second type power headroom for the SpCell of another MAC layer device is acquired (or calculated).
5> if an indicator (phr-ModeOtherCG) indicating a power headroom report considering another cell group is configured as Real (or configured to report a real value) by a higher layer device (RRC layer device),
6> a maximum transmission power value (or a power value required for calculating a power headroom) for the SpCell of another MAC layer device (E-UTRA MAC layer device) is acquired from a physical layer device.
3> a multiplexing and assembly procedure (Multiplexing and Assembly procedure of the MAC layer device) is indicated to generate and transmit MAC control information reporting a plurality of power headrooms on the basis of the values reported from the physical layer device.
2> if an indicator (multiplePHR) indicating a plurality of power headroom reports is not configured as (or not configured to report) TRUE, one power headroom report is indicated, or one power headroom report format is used,
3> a first type power headroom value for an uplink carrier (or frequency) of the serving cell (or PCell) is acquired (or calculated) from the physical layer device.
3> a maximum transmission power value (or a power value required for calculating a power headroom) corresponding to the serving cell is acquired from the physical layer device.
3> a multiplexing and assembly procedure (multiplexing and assembly procedure of the MAC layer device) is indicated to generate and transmit MAC control information reporting one power headroom on the basis of the values reported from the physical layer device.
2> a timer for periodically reporting a power headroom starts or restarts.
2> a timer for limiting a power headroom report starts or restarts.
2> all triggered power headrooms or power headroom report procedures are canceled.

Another embodiment of the fourth embodiment of the headroom report procedure proposed in the disclosure is described below.

5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);

Type 3 power headroom: the difference between the nominal UE maximum transmit power and the estimated power for SRS transmission per activated Serving Cell.

RRC controls Power Headroom reporting by configuring the following parameters:
phr-PeriodicTimer;
phr-ProhibitTimer;
phr-Tx-PowerFactorChange;
phr-Type2OtherCell;
phr-ModeOtherCG;
multiplePHR.

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity of which the active DL BWP is not dormant BWP which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

phr-PeriodicTimer expires;

upon configuration or reconfiguration of the power headroom reporting functionality by upper layers, which is not used to disable the function;

activation of an SCell of any MAC entity with configured uplink of which firstActiveDownlinkBWP-Id is not set to dormant BWP;

activation of the DL BWP indicated by firstOutsideActiveTimeBWP-Id or by firstWithinActiveTimeBWP-Id (as specified in TS 38.331 [5] and TS 38.213 [6]) of an SCell of any MAC entity with configured uplink addition of the PSCell (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPRc as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

NOTE 2: The MAC entity should avoid triggering a PHR when the required power backoff due to power management decreases only temporarily (e.g. for up to a few tens of milliseconds) and it should avoid reflecting such temporary decrease in the values of PCMAX,f,c/PH when a PHR is triggered by other triggering conditions.

NOTE 3: If a HARQ process is configured with cg-RetransmissionTimer and if the PHR is already included in a MAC PDU for transmission by this HARQ process, but not yet transmitted by lower layers, it is up to UE implementation how to handle the PHR content.

If the MAC entity has UL resources allocated for a new transmission the MAC entity shall:

1> if it is the first UL resource allocated for a new transmission since the last MAC reset:
2> start phr-PeriodicTimer;
1> if the Power Headroom reporting procedure determines that at least one PHR has been triggered and not cancelled; and
1> if the allocated UL resources can accommodate the MAC CE for PHR which the MAC entity is configured to transmit, plus its subheader, as a result of LCP as defined in clause 5.4.3.1:
2> if multiplePHR with value true is configured:
3> for each activated Serving Cell with configured uplink associated with any MAC entity of which the active DL BWP is not dormant BWP:
4> obtain the value of the Type 1 or Type 3 power headroom for the corresponding uplink carrier as specified in clause 7.7 of TS 38.213 [6];
4> if this MAC entity has UL resources allocated for transmission on this Serving Cell; or
4> if the other MAC entity, if configured, has UL resources allocated for transmission on this Serving Cell and phr-ModeOtherCG is set to real by upper layers:
5> obtain the value for the corresponding PCMAX,f,c field from the physical layer.
3> if phr-Type2OtherCell with value true is configured:
4> if the other MAC entity is E-UTRA MAC entity:
5> obtain the value of the Type 2 power headroom for the SpCell of the other MAC entity (i.e. E-UTRA MAC entity);
5> if phr-ModeOtherCG is set to real by upper layers:
6> obtain the value for the corresponding PCMAX,f,c field for the SpCell of the other MAC entity (i.e. E-UTRA MAC entity) from the physical layer.
3> instruct the Multiplexing and Assembly procedure to generate and transmit the Multiple Entry PHR MAC CE as defined in clause 6.1.3.9 based on the values reported by the physical layer.
2> else (i.e. Single Entry PHR format is used):
3> obtain the value of the Type 1 power headroom from the physical layer for the corresponding uplink carrier of the PCell;
3> obtain the value for the corresponding PCMAX,f,c field from the physical layer;
3> instruct the Multiplexing and Assembly procedure to generate and transmit the Single Entry PHR MAC CE as defined in clause 6.1.3.8 based on the values reported by the physical layer.
2> start or restart phr-PeriodicTimer;
2> start or restart phr-ProhibitTimer;
2> cancel all triggered PHR(s).

The first embodiment, the second embodiment, the third embodiment, or the fourth embodiment of the power headroom report procedure proposed in the disclosure may be expanded to another embodiment, and may be combined, applied, and expanded.

The overall operation of the first embodiment, the second embodiment, the third embodiment, or the fourth embodiment of the power headroom report procedure proposed in the disclosure is described below.

The UE may receive the RRCReconfiguration message as illustrated in FIG. 6.
The dormant BWP and the normal BWP may be configured for each cell in the RRC message.
Configuration information or parameters for the power headroom may be configured in the RRC message.
If the event for triggering the power headroom procedure proposed in the disclosure is generated or the condition is satisfied,
the UE may identify whether the BWP (or current or activated downlink BWP) for the serving cell is the dormant BWP. When the BWP (downlink BWP) is not the dormant BWP, the power headroom report procedure may be triggered.
If the event for triggering the power headroom procedure proposed in the disclosure is generated or the condition is satisfied, and if the SCell is activated,
the UE may identify whether the first active downlink BWP configured by the RRC message for the serving cell is the dormant BWP. When the first active downlink BWP (downlink BWP) is not the dormant BWP, the power headroom report procedure may be triggered Alternatively, the power headroom report procedure may be triggered when a MAC layer device activates a downlink BWP (or an activated BWP or a current BWP (or downlink BWP)) of an activated SCell in which an uplink is configured to a BWP indicated by an identifier (firstOutsideActiveTimeBWP-Id or firstWithinActiveTimeBWP-Id) of a first active BWP from dormant configured by the RRC message. Activating the BWP as described above may be indicated by the PDCCH DCI according to the methods proposed in the disclosure.

Figure 19:
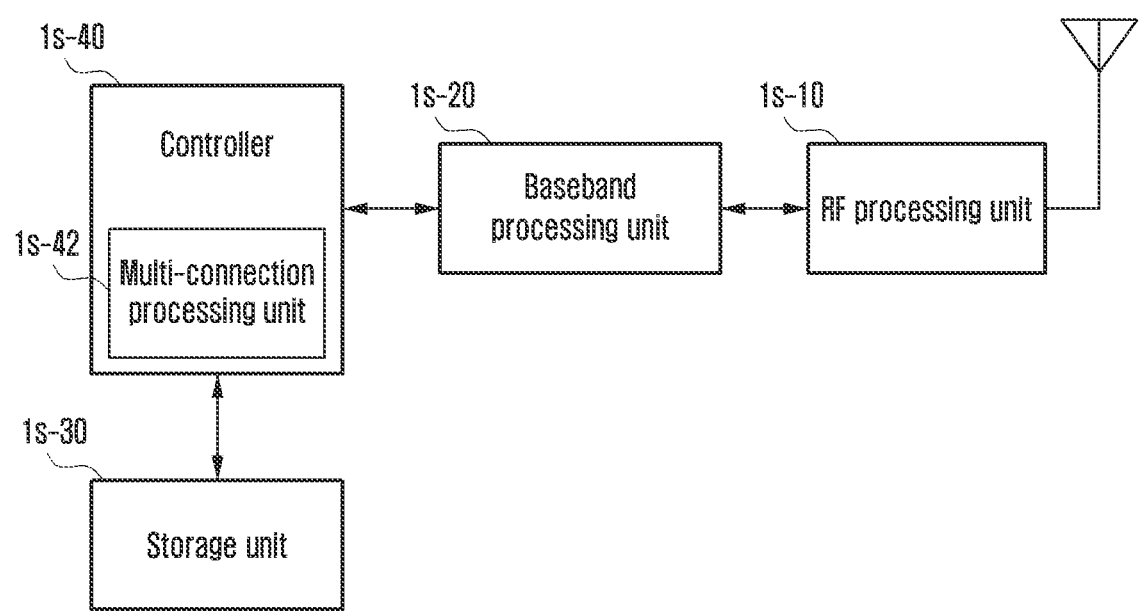
FIG. 19 illustrates a structure of the UE to which an embodiment of the disclosure can be applied.

FIG. 19 illustrates a structure of the UE to which an embodiment of the disclosure can be applied.

Referring to FIG. 19, the UE includes a radio frequency (RF) processing unit 1s-10, a baseband processing unit 1s-20, a storage unit 1s-30, and a controller 1s-40.

The RF processing unit 1s-10 performs a function of transmitting and receiving a signal through a wireless channel, such as band conversion and amplification of a signal. That is, the RF processing unit 1s-10 up-converts a baseband signal provided from the baseband processing unit 1s-20 into an RF band signal, transmits the RF band signal through an antenna, and then down-converts the RF band signal received through the antenna into a baseband signal. For example, the RF processing unit 1s-10 may include a transmission filter, a reception filter, an amplifier, a mixer, an oscillator, a digital-to-analog convertor (DAC), an analog-to-digital convertor (ADC), and the like. Although FIG. 19 illustrates only one antenna, the UE may include a plurality of antennas. The RF processing unit 1s-10 may include a plurality of RF chains. The RF processing unit 1s-10 may perform beamforming. For the beamforming, the RF processing unit 1s-10 may control the phase and size of each signal transmitted/received through a plurality of antennas or antenna elements. The RF processing unit may perform MIMO and receive a plurality of layers when performing the MIMO operation. The RF processing unit 1s-10 may appropriately configure a plurality of antennas or antenna elements according to the control of the controller to perform reception beam sweeping or control a reception beam direction and a beam width such that the reception beam cooperate with a transmission beam.

The baseband processing unit 1s-20 performs a function for conversion between a baseband signal and a bitstream according to a physical layer standard of the system. For example, in data transmission, the baseband processing unit 1s-20 generates complex symbols by encoding and modulating a transmission bitstream. Further, in data reception, the baseband processing unit 1s-20 reconstructs a reception bitstream by demodulating and decoding a baseband signal provided from the RF processing unit 1s-10. For example, in an orthogonal frequency division multiplexing (OFDM) scheme, when data is transmitted, the baseband processing unit 1s-20 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processing unit 1s-20 divides the baseband signal provided from the RF processor 1s-10 in units of OFDM symbols, reconstructs the signals mapped to the subcarriers through a fast Fourier transform (FFT) operation, and then reconstructs a reception bitstream through demodulation and decoding.

The baseband processing unit 1s-20 and the RF processing unit 1s-10 may transmit and receive signals as described above. Accordingly, the baseband processing unit 1s-20 and the RF processing unit 1s-10 may be referred to as a transmitter, a receiver, a transceiver, or a communication unit. At least one of the baseband processing unit 1s-20 and the RF processing unit 1s-10 may include a plurality of communication modules for supporting a plurality of different radio access technologies. At least one of the baseband processing unit 1s-20 and the RF processing unit 1s-10 may include different communication modules to support signals in different frequency bands. For example, the different radio access technologies may include an LTE network and an NR network. Further, the different frequency bands may include a super high frequency (SHF) (for example, 2.5 GHz and 5 Ghz) band and a millimeter (mm) wave (for example, 60 GHz) band.

The storage unit 1s-30 stores a basic program for the operation of the UE, an application program, and data such as configuration information. The storage unit 1s-30 provides stored data according to a request from the controller 1s-40.

The controller 1s-40 controls the overall operation of the UE. For example, the controller 1s-40 transmits and receives a signal through the baseband processing unit 1s-20 and the RF processing unit 1s-10. Further, the controller 1s-40 records data in the storage unit 1s-30 and reads the data. To this end, the controller 1s-40 may include at least one processor. For example, the controller 1s-40 may include a communications processor (CP) that performs control for communication, and an application processor (AP) that controls higher layers such as an application layer.

Figure 20:
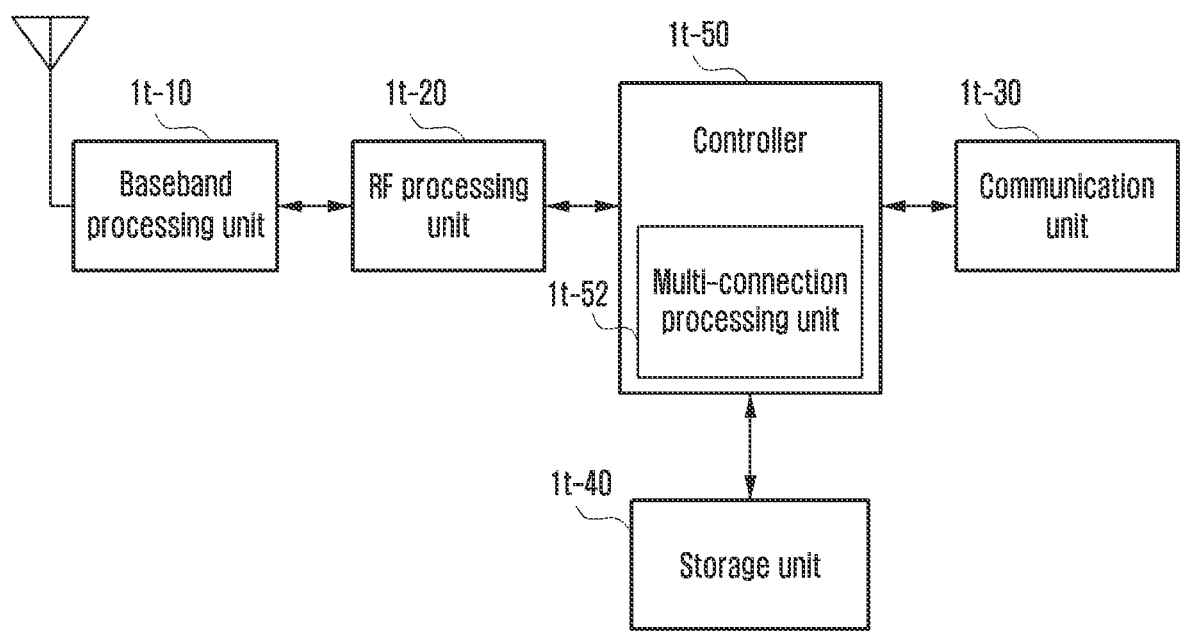
FIG. 20 is a block diagram of a TRP in a wireless communication system to which an embodiment of the disclosure can be applied.

FIG. 20 is a block diagram of a TRP in a wireless communication system to which an embodiment of the disclosure can be applied.

As illustrated in FIG. 20, the TRP (for example, base station) includes an RF processing unit 1t-10, a baseband processing unit 1t-20, a backhaul communication unit 1t-30, a storage unit 1t-40, and a controller 1t-50.

The RF processor 1t-10 performs a function for transmitting and receiving a signal through a wireless channel, such as band conversion and amplification of a signal. That is, the RF processing unit 1t-10 up-converts a baseband signal provided from the baseband processing unit 1t-20 into an RF band signal and then transmits the converted signal through an antenna, and down-converts an RF band signal received through the antenna into a baseband signal. For example, the RF processing unit 1t-10 may include a transmission filter, a reception filter, an amplifier, a mixer, an oscillator, a DAC, and an ADC. In FIG. 20, although only one antenna is illustrated, the TRP (for example, a first access node) may include a plurality of antennas. In addition, the RF processing unit 1t-10 may include a plurality of RF chains. The RF processing unit 1t-10 may perform beamforming. For the beamforming, the RF processing unit 1t-10 may control a phase and a size of each of the signals transmitted and received through a plurality of antennas or antenna elements. The RF processing unit may perform a downlink MIMO operation by transmitting one or more layers.

The baseband processing unit 1t-20 performs a function of performing conversion between a baseband signal and a bitstream according to a physical-layer standard of the first radio access technology. For example, when data is transmitted, the baseband processing unit 1t-20 generates complex symbols by encoding and modulating a transmission bitstream. Further, when data is received, the baseband processing unit 1t-20 reconstructs a reception bitstream by demodulating and decoding a baseband signal provided from the RF processing unit 1t-10. For example, in an OFDM scheme, when data is transmitted, the baseband processing unit 1t-20 may generate complex symbols by encoding and modulating the transmission bitstream, map the complex symbols to subcarriers, and then configure OFDM symbols through an IFFT operation and CP insertion. In addition, when data is received, the baseband processing unit 1t-20 divides a baseband signal provided from the RF processing unit 1t-10 in units of OFDM symbols, recovers signals mapped with sub-carriers through an FFT operation, and then recovers a reception bit string through demodulation and decoding. The baseband processing unit 1t-20 and the RF processing unit 1t-10 transmit and receive a signal as described above. Accordingly, the baseband processing unit 1t-20 and the RF processing unit 1t-10 may be referred to as a transmitter, a receiver, a transceiver, a communication unit, or a wireless communication unit.

The communication unit 1t-30 provides an interface for communicating with other nodes within the network.

The storage unit 1t-40 stores data such as a basic program, an application, and setting information for the operation of the MeNB. Particularly, the storage unit 1t-40 may store information on a bearer allocated to the accessed UE and a measurement result reported from the accessed UE. Further, the storage unit 1t-40 may store information which is a reference for determining whether to allow or interrupt multiple accesses to the UE. The storage unit 1t-40 provides stored data according to a request from the controller 1t-50.

The controller 1t-50 controls the overall operation of the MeNB. For example, the controller 1t-50 transmits and receives a signal through the baseband processor 1t-20 and the RF processor 1t-10 or through the backhaul communication unit 1t-30. Further, the controller 1t-50 records data in the storage unit 1t-40 and reads the data. To this end, the controller 1t-50 may include at least one processor.

The embodiments of the disclosure described and shown in the specification and the drawings are merely specific examples that have been presented to easily explain the technical contents of the disclosure and help understanding of the disclosure, and are not intended to limit the scope of the disclosure. It will be apparent to those skilled in the art that, in addition to the embodiments set forth herein, other variants based on the technical idea of the disclosure may be implemented.

The invention claimed is:

1. A method performed by a terminal in a wireless communication system, the method comprising:
receiving, from a base station, a message including information for configuring a plurality of serving cells for the terminal;
identifying whether a predetermined event for triggering a power headroom report (PHR) is occurred;
in case that the predetermined event is occurred, obtaining a power headroom (PH) value for an uplink carrier corresponding to an activated serving cell of the plurality of serving cells; and
transmitting, to the base station, the PHR including the obtained PH value,
wherein an activated downlink bandwidth part (BWP) of the activated serving cell is not a dormant BWP.

2. The method of claim 1,
wherein the predetermined event includes an expiration of a prohibition timer for the PHR and a change of path loss for at least one activated serving cells being more than a threshold value, and
wherein an activated downlink BWP of the at least one serving cell is not the dormant BWP.

3. The method of claim 1,
wherein the predetermined event includes an activation of one serving cell of the plurality of serving cells,
wherein information on an identifier (ID) of a first active downlink BWP to be used based on the activation of the one serving cell is configured for the one serving cell by the message, and
wherein the ID of the first active downlink BWP for the one serving cell is not set to the dormant BWP.

4. The method of claim 1, wherein the predetermined event includes a switching from the dormant BWP to a non-dormant BWP for one serving cell of the plurality of serving cells.

5. The method of claim 1,
wherein the message further includes configuration information on the PHR, and
wherein the configuration information includes information indicating that the PHR is to be reported by using a multiple entry PHR medium access control (MAC) control elements (CEs).

6. The method of claim 1,
wherein the message includes configuration information on a secondary cell (SCell) among the plurality of serving cells, and
wherein the configuration information on the SCell includes configuration information on the dormant BWP.

7. A terminal in a wireless communication system, the terminal comprising:
a transceiver; and
a controller configured to:
control the transceiver to receive, from a base station, a message including information for configuring a plurality of serving cells for the terminal,
identify whether a predetermined event for triggering a power headroom report (PHR) is occurred,
in case that the predetermined event is occurred, obtain a power headroom (PH) value for an uplink carrier corresponding to an activated serving cell of the plurality of serving cells, and
control the transceiver to transmit, to the base station, the PHR including the obtained PH value,
wherein an activated downlink bandwidth part (BWP) of the activated serving cell is not a dormant BWP.

8. The terminal of claim 7,
wherein the predetermined event includes an expiration of a prohibition timer for the PHR and a change of path loss for at least one activated serving cells being more than a threshold value, and
wherein an activated downlink BWP of the at least one serving cell is not the dormant BWP.

9. The terminal of claim 7,
wherein the predetermined event includes an activation of one serving cell of the plurality of serving cells,
wherein information on an identifier (ID) of a first active downlink BWP to be used based on the activation of the one serving cell is configured for the one serving cell by the message, and
wherein the ID of the first active downlink BWP for the one serving cell is not set to the dormant BWP.

10. The terminal of claim 7, wherein the predetermined event includes a switching from the dormant BWP to a non-dormant BWP for one serving cell of the plurality of serving cells.

11. The terminal of claim 7,
wherein the message further includes configuration information on the PHR, and
wherein the configuration information includes information indicating that the PHR is to be reported by using a multiple entry PHR medium access control (MAC) control elements (CEs).

12. The terminal of claim 7,
wherein the message includes configuration information on a secondary cell (SCell) among the plurality of serving cells, and
wherein the configuration information on the SCell includes configuration information on the dormant BWP.

13. A method performed by a base station in a wireless communication system, the method comprising:
transmitting, to a terminal, a message including information for configuring a plurality of serving cells for the terminal and configuration information on a power headroom report (PHR); and
receiving, from the terminal, the PHR including a power headroom (HR) value for an uplink carrier corresponding to an activated serving cell of the plurality of serving cells, based on the message,
wherein an activated downlink bandwidth part (BWP) of the activated serving cell is not a dormant BWP.

14. The method of claim 13,
wherein the PHR is triggered based on an expiration of a prohibition timer for the PHR and a change of path loss for at least one activated serving cells being more than a threshold value, and
wherein an activated downlink BWP of the at least one serving cell is not the dormant BWP.

15. The method of claim 13,
wherein the PHR is triggered based on an activation of one serving cell of the plurality of serving cells,
wherein information on an identifier (ID) of a first active downlink BWP to be used based on the activation of the one serving cell is configured for the one serving cell by the message, and wherein the ID of the first active downlink BWP for the one serving cell is not set to the dormant BWP.

* * * * *